US005539450A

United States Patent [19]
Handelman

[11] Patent Number: 5,539,450
[45] Date of Patent: Jul. 23, 1996

[54] METHODS AND SYSTEMS FOR PROVIDING ADDITIONAL SERVICE APPLICATIONS IN PAY TELEVISION

[75] Inventor: Doron Handelman, Givataim, Israel

[73] Assignee: News Datacom Limited, England

[21] Appl. No.: 80,344

[22] Filed: Jun. 21, 1993

[30] Foreign Application Priority Data

Apr. 16, 1993 [IL] Israel ......................................... 105432

[51] Int. Cl.$^6$ .................................................... H04N 7/10
[52] U.S. Cl. ........................... 348/12; 348/13; 364/401 R; 364/402
[58] Field of Search .................................. 358/84, 85, 86; 455/2, 3.1, 3.2, 4.1, 4.2, 5.1, 6.1, 6.2; 235/379, 380, 381, 382, 383; 364/410–412, 401, 406, 400; 348/6, 7, 8, 10, 12, 13; 380/10, 20; H04N 7/00, 7/10, 7/173, 7/16

[56] References Cited

U.S. PATENT DOCUMENTS

| | | |
|---|---|---|
| 3,845,277 | 10/1974 | Voss et al. . |
| 4,323,770 | 4/1982 | Dieulot et al. . |
| 4,450,477 | 5/1984 | Lovett . |
| 4,450,481 | 5/1984 | Dickinson . |
| 4,451,701 | 5/1984 | Bendig . |
| 4,455,570 | 6/1984 | Saeki et al. . |
| 4,467,424 | 8/1984 | Hedges et al. . |
| 4,494,197 | 1/1985 | Troy et al. . |
| 4,558,464 | 12/1985 | O'Brien, Jr. . |
| 4,602,279 | 7/1986 | Freeman . |
| 4,654,482 | 3/1987 | DeAngelis . |
| 4,669,730 | 6/1987 | Small . |
| 4,689,619 | 8/1987 | O'Brien, Jr. . |
| 4,764,666 | 8/1988 | Bergeron . |
| 4,789,863 | 12/1988 | Bush .......................................... 348/3 |
| 4,797,913 | 1/1989 | Kaplan et al. . |
| 4,856,787 | 8/1989 | Itkis . |
| 4,864,110 | 9/1989 | Guillou . |
| 4,875,164 | 10/1989 | Monfort . |
| 4,882,473 | 11/1989 | Bergeron et al. . |
| 4,893,248 | 1/1990 | Pitts et al. . |
| 4,907,273 | 3/1990 | Wiedemer ................................. 380/16 |
| 4,926,255 | 5/1990 | Von Kohorn . |
| 4,926,256 | 5/1990 | Nanba . |

(List continued on next page.)

FOREIGN PATENT DOCUMENTS

| | | | |
|---|---|---|---|
| 0103438 | 3/1984 | European Pat. Off. ................. | 358/86 |
| 0059083 | 3/1988 | Japan . | |
| 2194369 | 3/1988 | United Kingdom . | |
| 2207838 | 2/1989 | United Kingdom . | |

OTHER PUBLICATIONS

Bank, David "Bell Atlantic Chief Sees Interactive Multimedia Market Developing Profiling Rapidly" San Jose Mercury News—Friday Dec. 3, 1993 Morning Final Section: Bussiness p.: C1.

Hudson, Richard L. "'Smart Card' as Fare for Info Highway" Wall Street Journal Apr. 18, 1994.

"An Evolutionary Approach to the Development of Two--Way Cable Technology Communication" by James B. Wright, et al., Jan. 1977.

"Lotteries and Smart Cards," by Cliff Dutton, et al., SCAT '89 Conference Proceedings: Smart Card Apps., pp. 165–171.

"Application of Card Technology to the Casino Environment" by Walter H. Wellman, SCAT '89, pp. 172–182.

"VideoGuard Secure Pay–TV Access Control" dated Dec. 1989, published by News Datacom in London, England, p. 2, p. 4.

Primary Examiner—David E. Harvey
Attorney, Agent, or Firm—Poms, Smith, Lande & Rose

[57] ABSTRACT

A pay television gaming system including a pay television network having a multiplicity of subscriber units each including a television, receiving apparatus for receiving gaming inputs from the multiplicity of subscriber units, transmitting apparatus for transmitting to the multiplicity of subscriber units information relating to gaming results and accounting apparatus for settling gaming debts and winnings via the pay television network. Other services, such as shopping may be provided.

25 Claims, 55 Drawing Sheets

U.S. PATENT DOCUMENTS

| | | |
|---|---|---|
| 4,928,168 | 5/1990 | Iwashita . |
| 4,947,028 | 8/1990 | Gorog . |
| 4,958,381 | 9/1990 | Toyoshima . |
| 4,959,783 | 9/1990 | Scott et al. . |
| 4,962,531 | 10/1990 | Sipman et al. . |
| 4,968,873 | 11/1990 | Dethloff et al. . |
| 4,969,183 | 11/1990 | Reese . |
| 4,975,951 | 12/1990 | Bennett .................................... 380/20 |
| 4,978,839 | 12/1990 | Chen et al. . |
| 4,980,542 | 12/1990 | Jackson et al. . |
| 4,996,705 | 2/1991 | Entenmann et al. . |
| 5,034,807 | 7/1991 | Von Kohorn . |
| 5,036,389 | 7/1991 | Morales . |
| 5,036,461 | 7/1991 | Elliott et al. . |
| 5,038,022 | 8/1991 | Lucero . |
| 5,051,822 | 9/1991 | Rhoades . |
| 5,065,235 | 11/1991 | Iijima . |
| 5,068,894 | 11/1991 | Hoppe . |
| 5,077,607 | 12/1991 | Johnson et al. . |
| 5,081,680 | 1/1992 | Bennett . |
| 5,105,268 | 4/1992 | Yamanouchi et al. . |
| 5,111,030 | 5/1992 | Brasington et al. . |
| 5,128,523 | 7/1992 | Diehl et al. . |
| 5,162,638 | 11/1992 | Diehl et al. . |
| 5,172,413 | 12/1992 | Bradley et al. . |
| 5,173,589 | 12/1992 | Diehl et al. . |
| 5,175,416 | 12/1992 | Mansvelt et al. . |
| 5,181,107 | 1/1993 | Rhoades . |
| 5,191,410 | 3/1993 | McCalley et al. . |

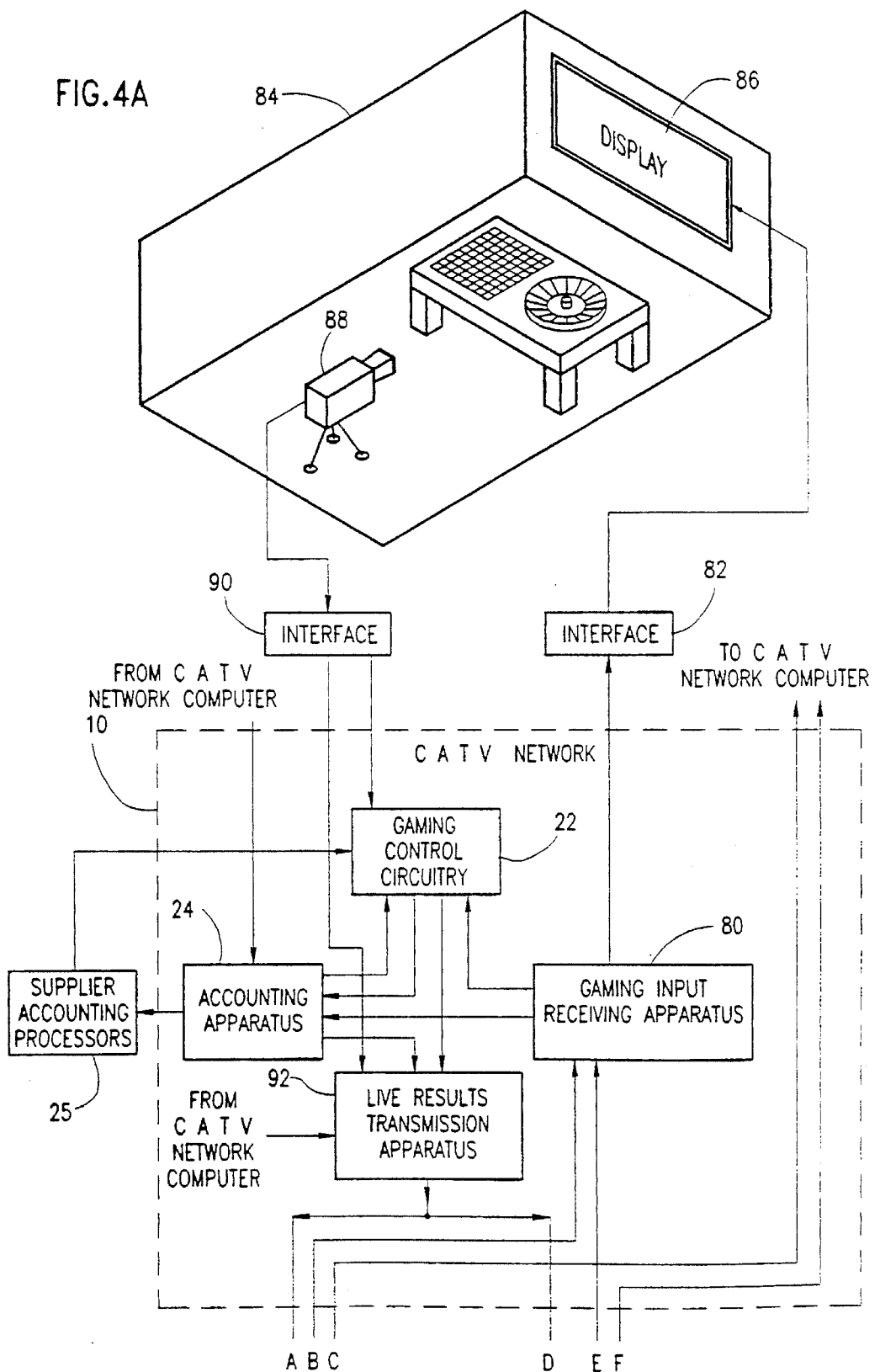

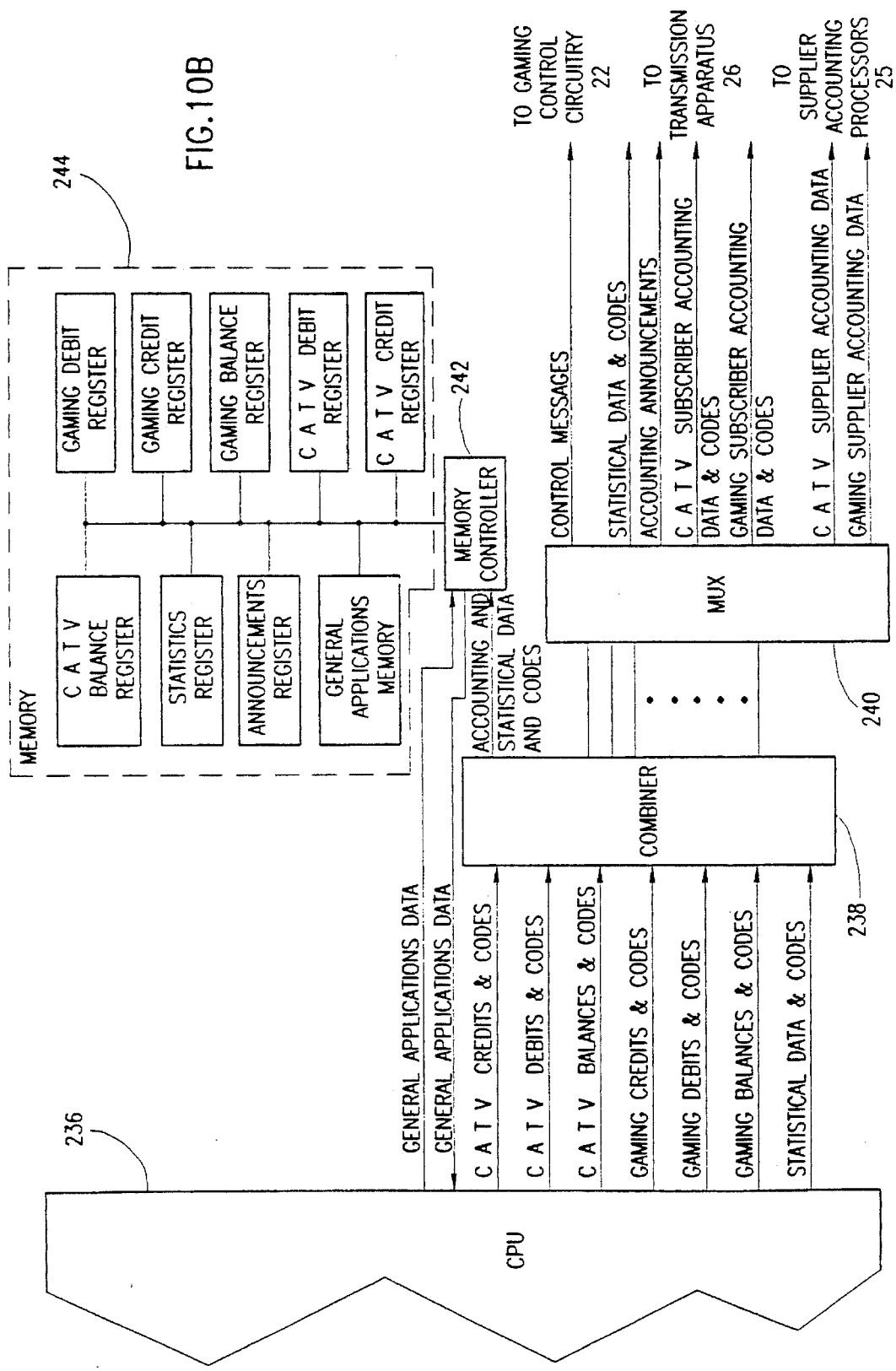

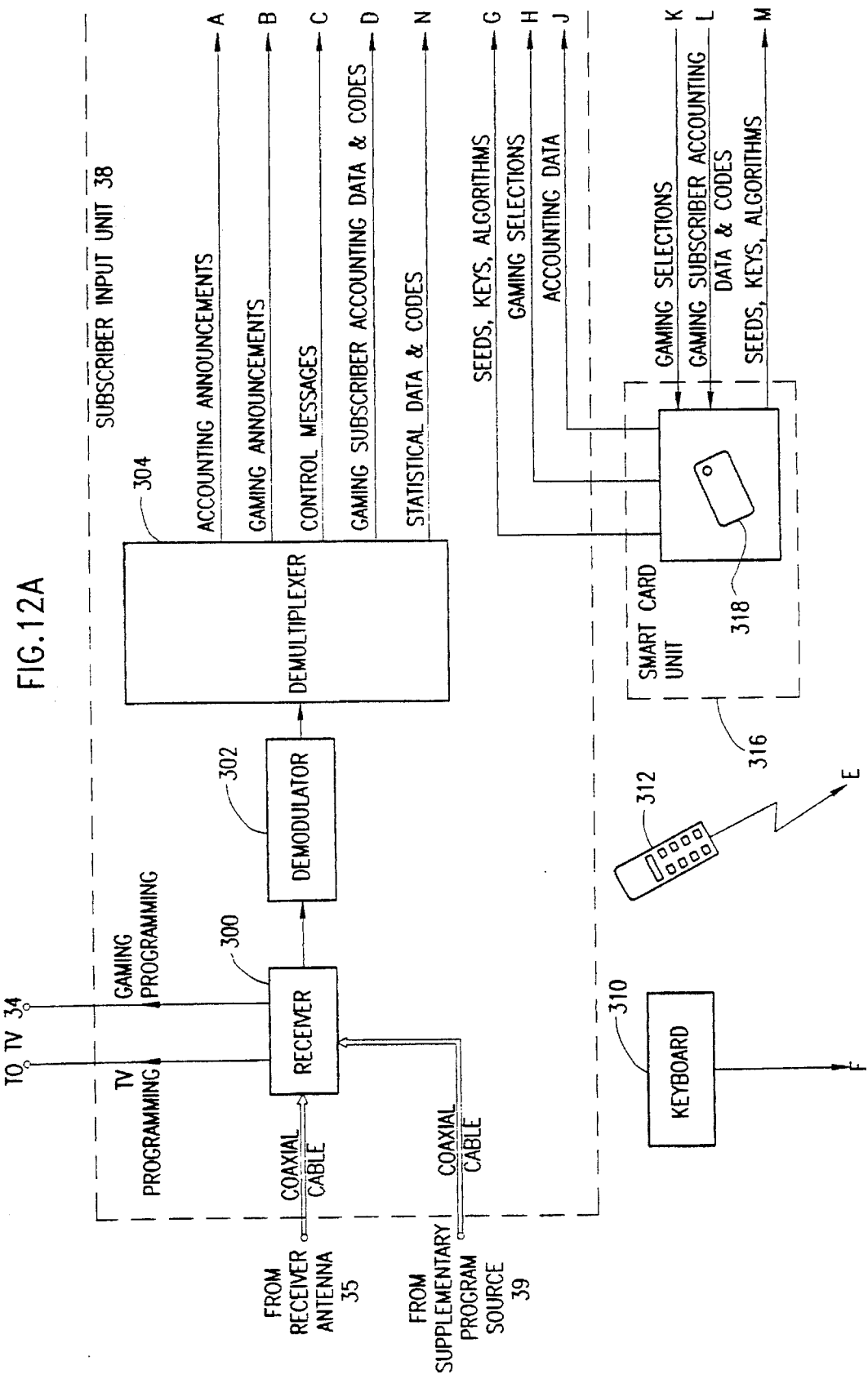

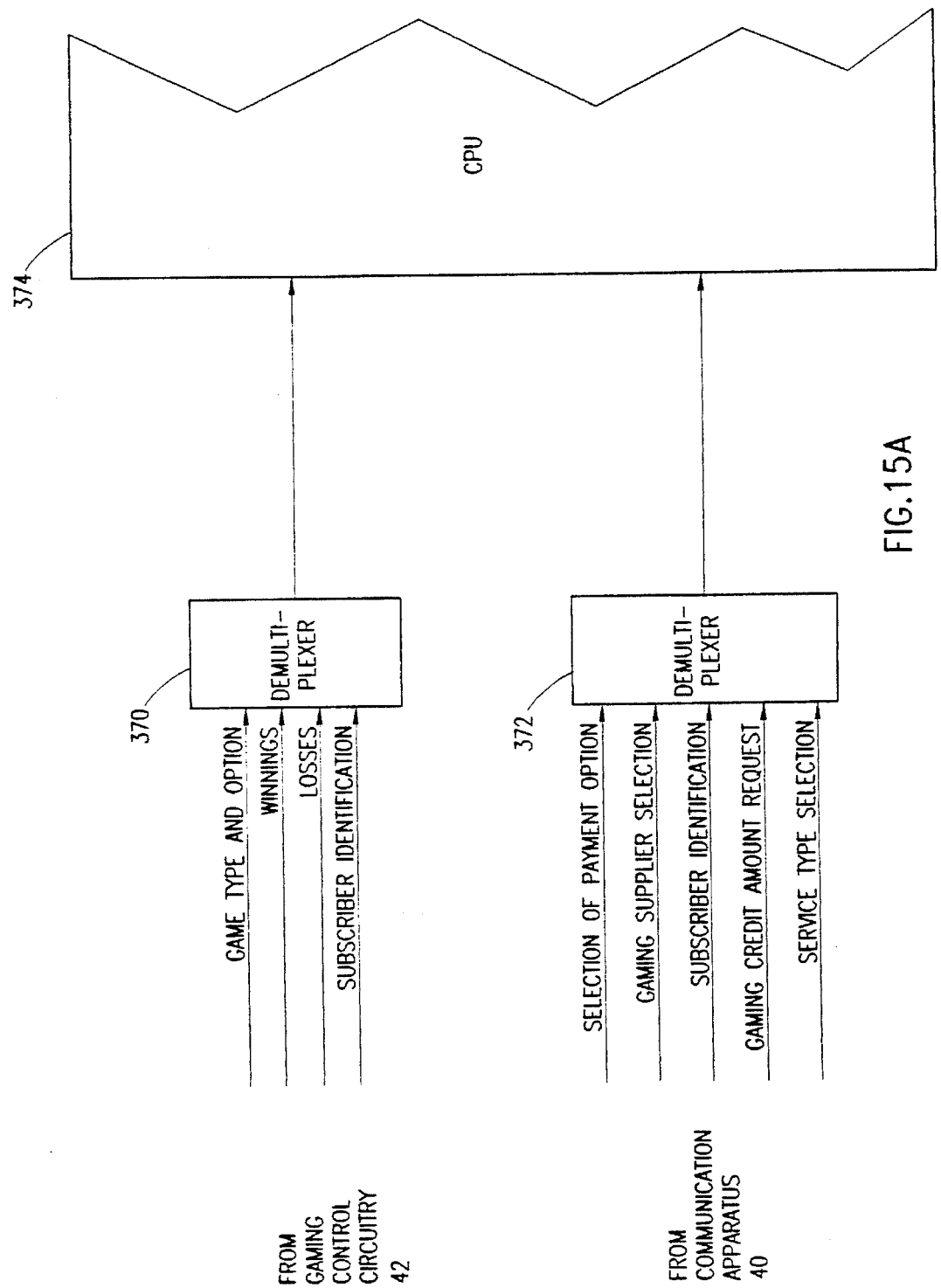

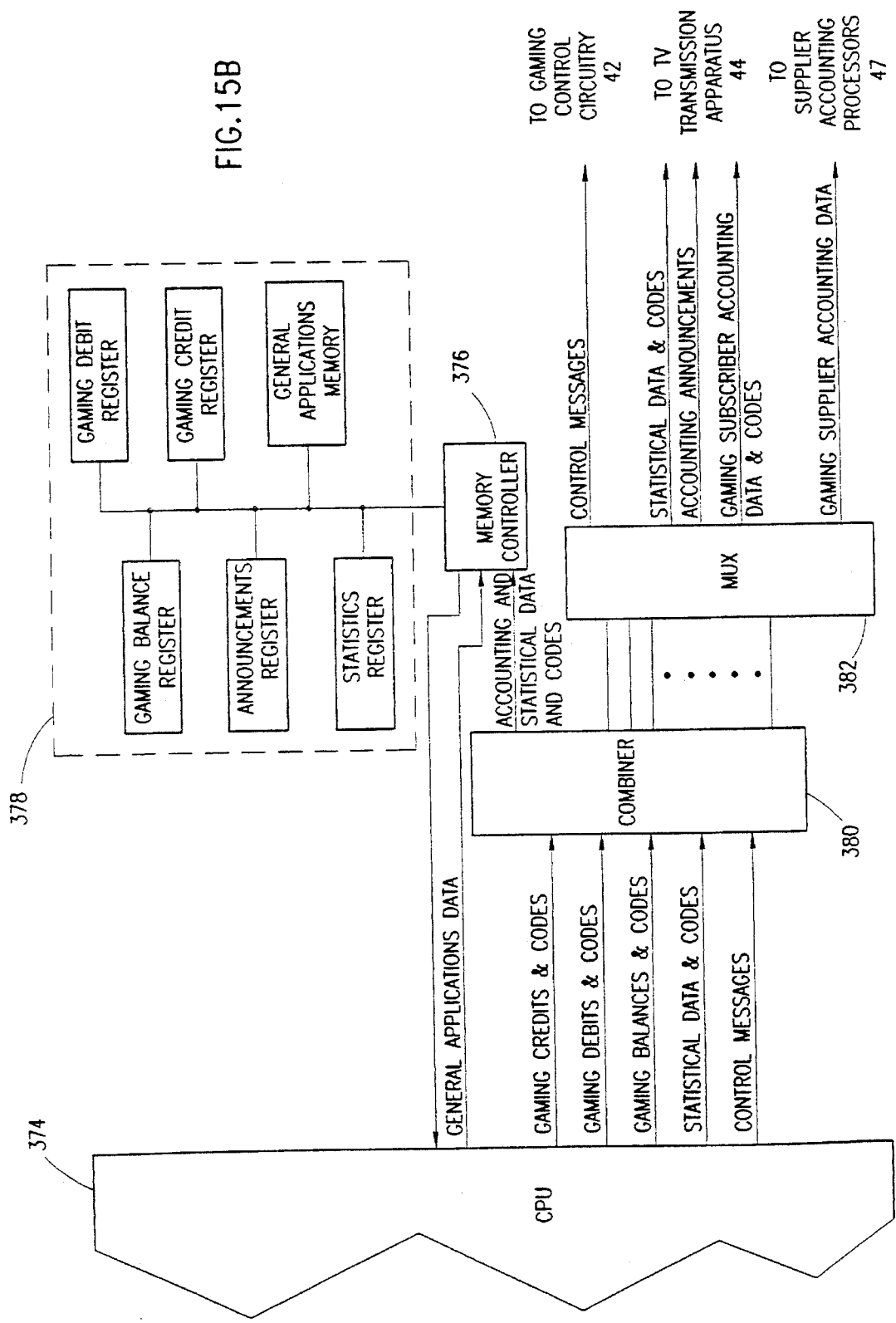

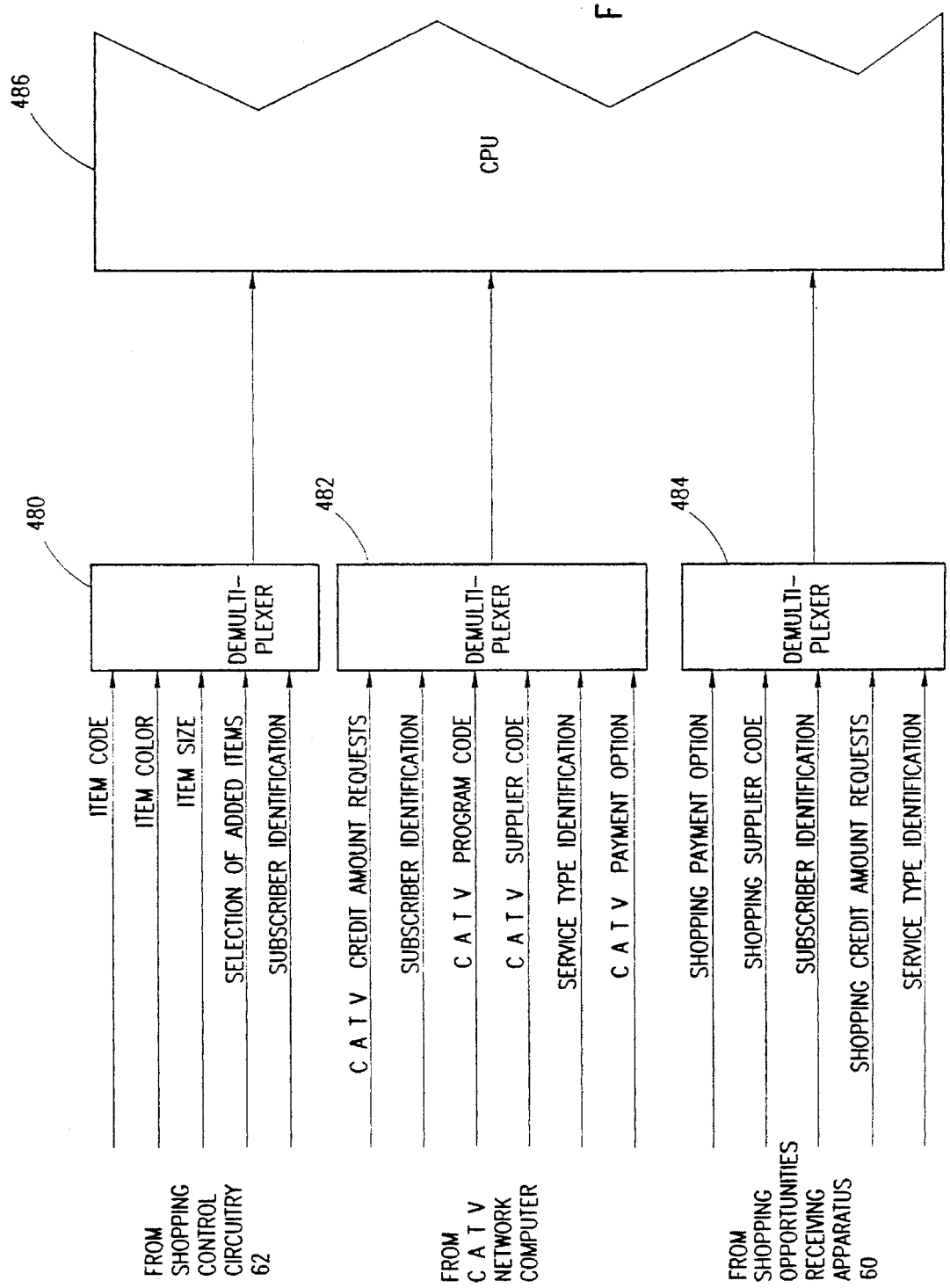

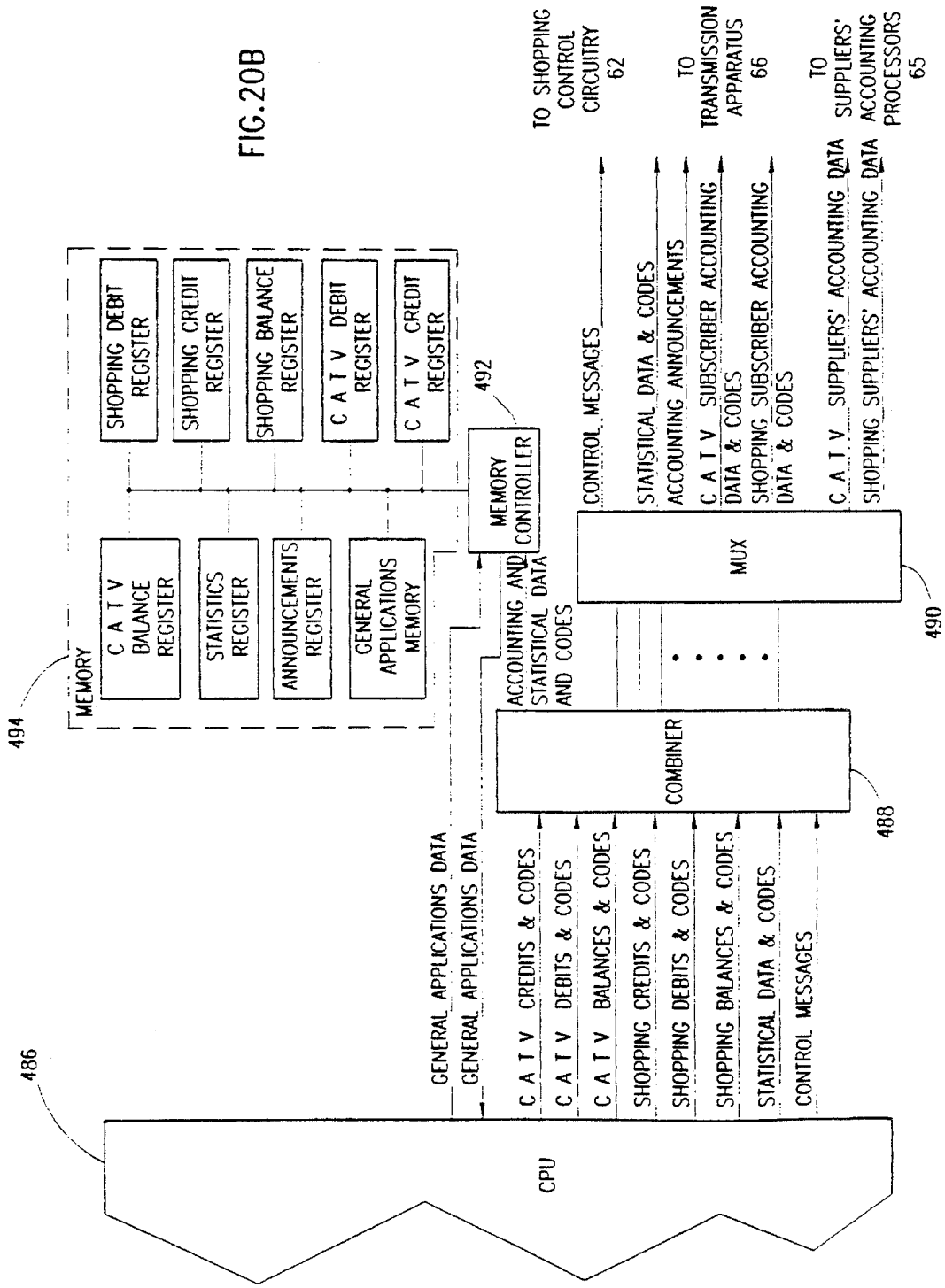

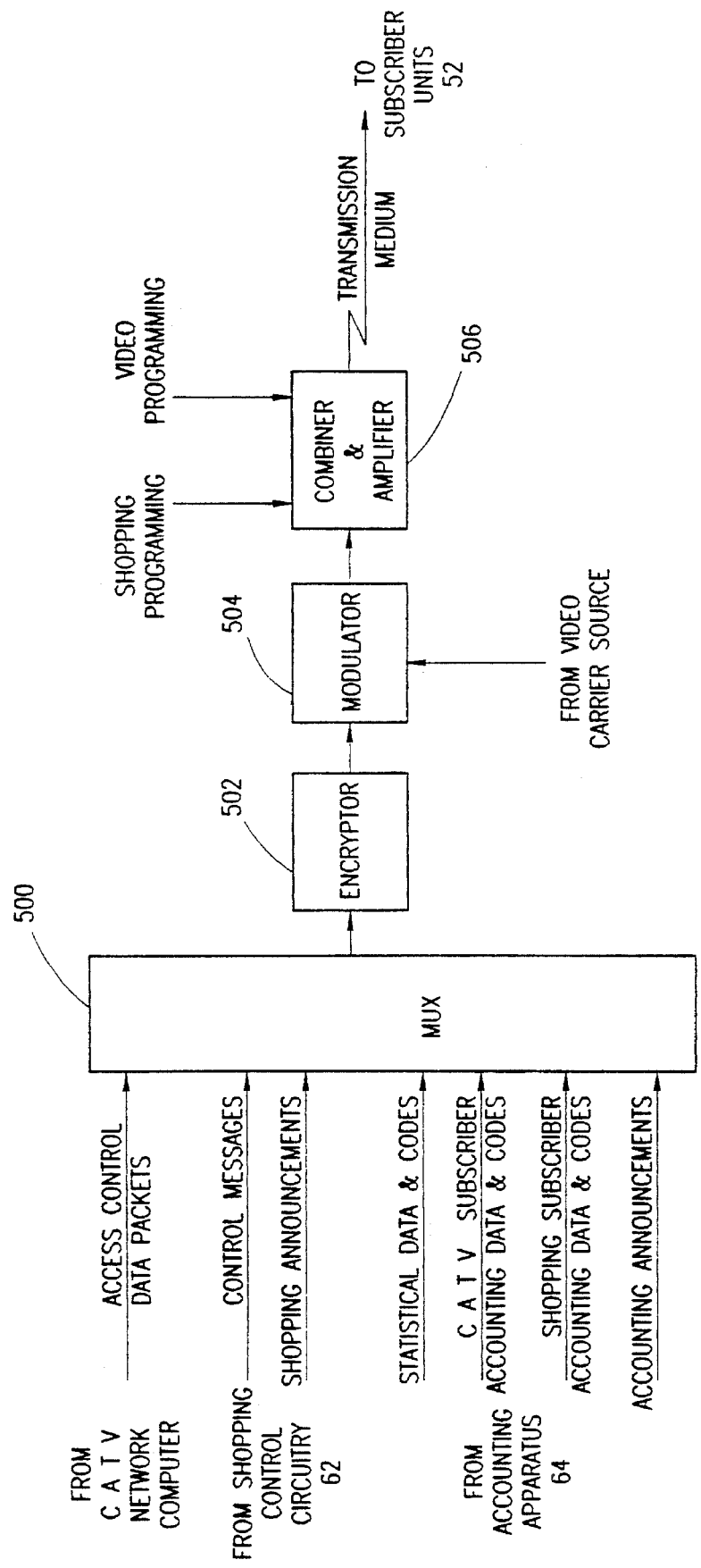

CATV

| ACCOUNTING CODE | SERVICE TYPE | SUPPLIER IDENTIFICATION NO. | PROGRAM NO. | SUBSCRIBER IDENTIFICATION NO. | PAYMENT OPTION | AMOUNT | CREDIT DESTINATION |
|---|---|---|---|---|---|---|---|
| 1 | 1 | x x | x x | x x x x x x | x x | x x x x x | x x |

GAMING

| ACCOUNTING CODE | SERVICE TYPE | SUPPLIER IDENTIFICATION NO. | GAME NO. | SUBSCRIBER IDENTIFICATION NO. | PAYMENT OPTION | AMOUNT | CREDIT DESTINATION |
|---|---|---|---|---|---|---|---|
| 1 | 2 | x x | x x | x x x x x x | x x | x x x x x | x x |

SHOPPING

| ACCOUNTING CODE | SERVICE TYPE | SUPPLIER IDENTIFICATION NO. | SUBSCRIBER IDENTIFICATION NO. | PAYMENT OPTION | AMOUNT | CREDIT DESTINATION |
|---|---|---|---|---|---|---|
| 1 | 3 | x x | x x x x x x | x x | x x x x x | x x |

CREDIT IDENTIFICATION CODES

DEBIT IDENTIFICATION CODES

CATV

| ACCOUNTING CODE | SERVICE TYPE | SUPPLIER IDENTIFICATION NO. | PROGRAM NO. | SUBSCRIBER IDENTIFICATION NO. | PAYMENT OPTION | AMOUNT | DEBIT DESTINATION |
|---|---|---|---|---|---|---|---|
| 2 | 1 | XX | XX | XXXXXXX | XX | XXXXXX | XX |

GAMING

| ACCOUNTING CODE | SERVICE TYPE | SUPPLIER IDENTIFICATION NO. | GAME NO. | NO. OF OPTION IN A GAME | SUBSCRIBER IDENTIFICATION NO. | PAYMENT OPTION | AMOUNT | DEBIT DESTINATION |
|---|---|---|---|---|---|---|---|---|
| 2 | 2 | XX | XX | X | XXXXXXX | XX | XXXXXX | XX |

SHOPPING

| ACCOUNTING CODE | SERVICE TYPE | SUPPLIER IDENTIFICATION NO. | ITEM CODE | ITEM COLOR | ITEM SIZE | ADDED ITEMS | SUBSCRIBER IDENTIFICATION NO. | PAYMENT OPTION | AMOUNT | DEBIT DESTINATION |
|---|---|---|---|---|---|---|---|---|---|---|
| 2 | 3 | XX | XX | XX | XX | XXXXXXXX | XXXXXXX | XX | XXXXXX | XX |

CATV

| ACCOUNTING CODE | SERVICE TYPE | SUPPLIER IDENTIFICATION NO. | SUBSCRIBER IDENTIFICATION NO. | PAYMENT OPTION | AMOUNT | BALANCE DESTINATION |
|---|---|---|---|---|---|---|
| 3 | 1 | x x | x x x x x x | x x | x x x x x x | x x |

GAMING

| ACCOUNTING CODE | SERVICE TYPE | SUPPLIER IDENTIFICATION NO. | SUBSCRIBER IDENTIFICATION NO. | PAYMENT OPTION | AMOUNT | BALANCE DESTINATION |
|---|---|---|---|---|---|---|
| 3 | 2 | x x | x x x x x x | x x | x x x x x x | x x |

SHOPPING

| ACCOUNTING CODE | SERVICE TYPE | SUPPLIER IDENTIFICATION NO. | SUBSCRIBER IDENTIFICATION NO. | PAYMENT OPTION | AMOUNT | BALANCE DESTINATION |
|---|---|---|---|---|---|---|
| 3 | 3 | x x | x x x x x x | x x | x x x x x x | x x |

} BALANCE IDENTIFICATION CODES

YOUR CREDIT : $ 325.49

TIME TO END
OF SALE/AUCTION : 00 : 52 : 21

1. JEANS LEVI'S 501

WAIST: [32]   LENGTH [28]

COLOR: [BLUE] [BROWN] [GREEN]

NO. OF UNITS: [2]

SUPPLIER: JEANS INC.

SALE PRICE: $ 24.99

PURCHASE APPROVED ?: [YES] [NO]

MOVE ARROWS FOR SELECTIONS

| F1 | F2 | F | F9 | F10 | F11 |
|----|----|----|----|----|----|
| ENTER | ERASE NO. | NEXT SCREEN | HELP | QUIT | STATISTICS |

METHODS AND SYSTEMS FOR PROVIDING ADDITIONAL SERVICE APPLICATIONS IN PAY TELEVISION

FIELD OF THE INVENTION

The present invention relates to pay television systems generally and more particularly to non program applications thereof.

BACKGROUND OF THE INVENTION

There are known in the patent literature various proposals for gambling systems employing telecommunications.

U.S. Pat. No. 4,602,279 describes a method for providing targeted profile interactive pay television displays.

U.S. Pat. No. 4,654,482 describes a home merchandise ordering telecommunications terminal which employs a bar-code reader and a merchandise catalog.

U.S. Pat. No. 4,669,730 describes an automated sweepstakes-type game which is designed to be used on banking system computer terminals such as ATM or POS terminals.

U.S. Pat. No. 4,797,913 describes a direct telephone dial ordering service system in which a calling customer can order products and/or services from a given vendor without voice intervention using a telephone as a subscriber interface device.

U.S. Pat. No. 4,856,787 describes a concurrent game network in which a master game terminal is connected in a computer network with a plurality of slave game terminals. The terminals include touch screen display.

U.S. Pat. Nos. 4,882,473 and 4,764,666 describe an on-line wagering system with programmable game entry cards and operator security cards which employs a smart card in a special purpose terminal which is located at a gaming station. The terminals in the various gaming stations are interconnected by conventional data links. The smart cards are personalized for each participant and for operators. This system is also described in an article entitled "Lotteries and Smart Cards, by Cliff Dutton et al, SCAT '89, Conference Proceedings: Smart Card Applications and Technology, pp 165–171.

An article entitled "Application of Card Technology to the Casino Environment" by Walter H. Wellman, SCAT '89, Conference Proceedings: Smart Card Applications and Technology, pp 172–182, describes the use of smart cards in gaming.

U.S. Pat. No. 4,996,705 describes the use of telecommunications systems for lotteries and describes a telephone-based system employing an operator who speaks with the customer.

None of the above-mentioned prior art patents relate to pay television systems.

In an article entitled "An Evolutionary Approach to the Development of Two-Way Cable Technology Communications" by James B. Wright et al, IEEE Transactions on Cable Television, Vol pay television-2, No. 1, January 1977, the development of two-way pay television systems is proposed for various applications, including shopping.

In a publication entitled "VideoGuard Secure Pay-TV Access Control" dated December, 1989, published by News Datacom in London, England, at page 2, a possible application of smart cards in TV merchandising is mentioned. At page 4 it is stated that "Smart cards can be used as debit cards to purchase merchandise."

U.S. Pat. No. 4,451,701 describes a viewdata system and apparatus which utilizes, without modification, a conventional television receiver for providing interactive communication between a host computer and a consumer.

The following U.S. patents are representative of the art found in the U.S. patent literature: U.S. Pat. Nos. 4,467,424; 5,036,461; 4,875,164; 5,173,589; 4,893,248; 4,959,783; 4,494,197; 4,323,770; 5,175,416; 5,038,022; 4,969,183; 5,181,107; 5,034,807; 4,689,619; 5,077,607; 4,958,381; 4,450,477; 4,928,168; 4,926,256; 4,455,570; 4,926,255; 5,172,413; 4,864,110; 4,962,531; 5,068,894; 5,036,389; 4,968,873; 5,128,523; 5,162,638; 5,081,680; 5,191,410; 5,111,030; 4,558,464; 5,065,235; 3,845,277; 4,980,542; 5,105,268; 4,978,839.

SUMMARY OF THE INVENTION

The present invention seeks to provide pay television systems having significant non-program features. The term "pay television" is used throughout the specification and claims in a broad sense to include cable television, satellite television, and pay television generally. The invention also extends to television gaming and shopping systems generally.

There is thus provided in accordance with a preferred embodiment of the present invention a pay television gaming system including a pay television network having a multiplicity of subscriber units each including a television, apparatus for receiving gaming inputs from the multiplicity of subscriber units; apparatus for transmitting to the multiplicity of subscriber units information relating to gaming results; and accounting apparatus for settling gaming debts and winnings via the pay television network.

There is additionally provided in accordance with a preferred embodiment of the present invention a television gaming system including a television network and a multiplicity of subscriber units each including a television, communication apparatus for receiving gaming inputs from the multiplicity of subscriber units; apparatus for transmitting to the multiplicity of subscriber units information relating to gaming results; and accounting apparatus for settling gaming debts and winnings via the communication apparatus.

There is also provided in accordance with a preferred embodiment of the present invention a pay television shopping system including a pay television network including a central control station and a multiplicity of subscriber units each including a television; apparatus for transmitting via the pay television network to the multiplicity of subscriber units information relating to shopping opportunities; apparatus for receiving shopping inputs from the multiplicity of subscriber units; and accounting apparatus for settling shopping debts via the pay television network.

There is also provided in accordance with a preferred embodiment of the present invention a pay television gaming system including a pay television network having a central control station and a multiplicity of subscriber units each including a television; apparatus for receiving gaming inputs from the multiplicity of subscriber units; apparatus for transmitting live to the multiplicity of subscriber units information relating to gaming results; and accounting apparatus for settling gaming debts and winnings.

There is additionally provided in accordance with a preferred embodiment of the present invention a pay television gaming system including a pay television network having a multiplicity of subscriber units each including a television; apparatus for receiving gaming inputs from the multiplicity of subscriber units; apparatus for transmitting to the multiplicity of subscriber units information relating to gaming results; and programmable apparatus for limiting gambling activity via the pay television network.

There is also provided in accordance with a preferred embodiment of the present invention a pay television gaming system including a pay television network having a central control station and a multiplicity of subscriber units each including a television; apparatus for receiving gaming inputs from the multiplicity of subscriber units; apparatus for transmitting to the multiplicity of subscriber units information relating to gaming results; and accounting apparatus connected directly to general purpose credit card charging and crediting facilities for settling gaming debts and winnings via the pay television network and the credit card facilities.

There is also provided in accordance with a preferred embodiment of the present invention a pay television shopping system including a pay television network including a central control station and a multiplicity of subscriber units each including a television; apparatus for transmitting via the pay television network to the multiplicity of subscriber units information relating to shopping opportunities; apparatus for receiving shopping inputs from the multiplicity of subscriber units; and accounting apparatus connected directly to general purpose credit card charging and crediting facilities for settling shopping debts via the pay television network and the credit card facilities, Preferably the accounting apparatus maintains separate accounts for pay television program charges and for non-program charges.

There is also provided in accordance with a preferred embodiment of the present invention a pay television gaming method including the steps of: providing a pay television network having a central control station and a multiplicity of subscriber units each including a television; receiving gaming inputs from the multiplicity of subscriber units; transmitting to the multiplicity of subscriber units information relating to gaming results; settling gaming debts and winnings via the pay television network.

There is additionally provided in accordance with a preferred embodiment of the present invention a television gaming method including the steps of: providing a television network having a central control station and a multiplicity of subscriber units each including a television; receiving gaming inputs from the multiplicity of subscriber units; transmitting to the multiplicity of subscriber units information relating to gaming results; and settling gaming debts and winnings via communications apparatus.

There is also provided in accordance with a preferred embodiment of the present invention a pay television shopping method including the steps of: providing a pay television network including a central control station and a multiplicity of subscriber units each including a television; transmitting via the pay television network to the multiplicity of subscriber units information relating to shopping opportunities; receiving shopping inputs from the multiplicity of subscriber units; and settling shopping debts via the pay television network.

There is also provided in accordance with a preferred embodiment of the present invention a pay television gaming method including the steps of: providing a pay television network having a central control station and a multiplicity of subscriber units each including a television; receiving gaming inputs from the multiplicity of subscriber units; transmitting live to the multiplicity of subscriber units information relating to gaming results; and settling gaming debts and winnings.

There is additionally provided in accordance with a preferred embodiment of the present invention a pay television gaming method including the steps of: providing a pay television network having a multiplicity of subscriber units each including a television; receiving gaming inputs from the multiplicity of subscriber units; transmitting to the multiplicity of subscriber units information relating to gaming results; and limiting gambling activity via the pay television network.

There is also provided in accordance with a preferred embodiment of the present invention a pay television gaming method including the steps of: providing a pay television network having a central control station and a multiplicity of subscriber units each including a television; receiving gaming inputs from the multiplicity of subscriber units; transmitting to the multiplicity of subscriber units information relating to gaming results; and interconnecting directly to general purpose credit card charging and crediting facilities for settling gaming debts and winnings via the pay television network and the credit card facilities.

There is also provided in accordance with a preferred embodiment of the present invention a pay television shopping method including the steps of: providing a pay television network including a central control station and a multiplicity of subscriber units each including a television; transmitting via the pay television network to the multiplicity of subscriber units information relating to shopping opportunities; receiving shopping inputs from the multiplicity of subscriber units; and interconnecting directly to general purpose credit card charging and crediting facilities for settling shopping debts via the pay television network and the credit card facilities.

In accordance with a preferred embodiment of the present invention, the apparatus and method of the present invention may be operable without requiring any voice interaction between the subscriber and an operator.

In gaming applications, the television network may additionally provide gaming statistics to subscribers.

In one embodiment of the invention, gaming programs may be received by the subscribers from a source other than a television network, such as a computer or video cassette.

BRIEF DESCRIPTION OF THE DRAWINGS

The present invention will be understood and appreciated more fully from the following detailed description, taken in conjunction with the drawings in which:

FIGS. 4A and 4B together constitute a generalized block diagram illustration of a part of a pay television television system constructed and operative in accordance with a further preferred embodiment of the present invention;

FIGS. 10A and 10B together constitute a simplified block diagram illustration of accounting apparatus forming part of the apparatus of FIG. 1;

FIGS. 12A and 12B together constitute a simplified block diagram illustration of part of the apparatus of FIG. 2;

FIGS. 15A and 15B together constitute a simplified block diagram illustration of accounting apparatus forming part of the apparatus of FIG. 2;

FIGS. 20A and 20B together constitute a simplified block diagram illustration of accounting apparatus forming part of the apparatus of FIG. 3;

FIG. 21 is a simplified block diagram illustration of transmission apparatus forming part of the apparatus of FIG. 3;

FIGS. 23, 24, 25 and 26 together constitute an illustration of the configuration of typical codes for information utilized in the systems of the present invention;

FIGS. 33, 34 and 35 illustrate typical screen displays appearing in the course of operation of the apparatus of FIGS. 1, 3 and 4 respectively.

DETAILED DESCRIPTION OF PREFERRED EMBODIMENTS

Figure 1:
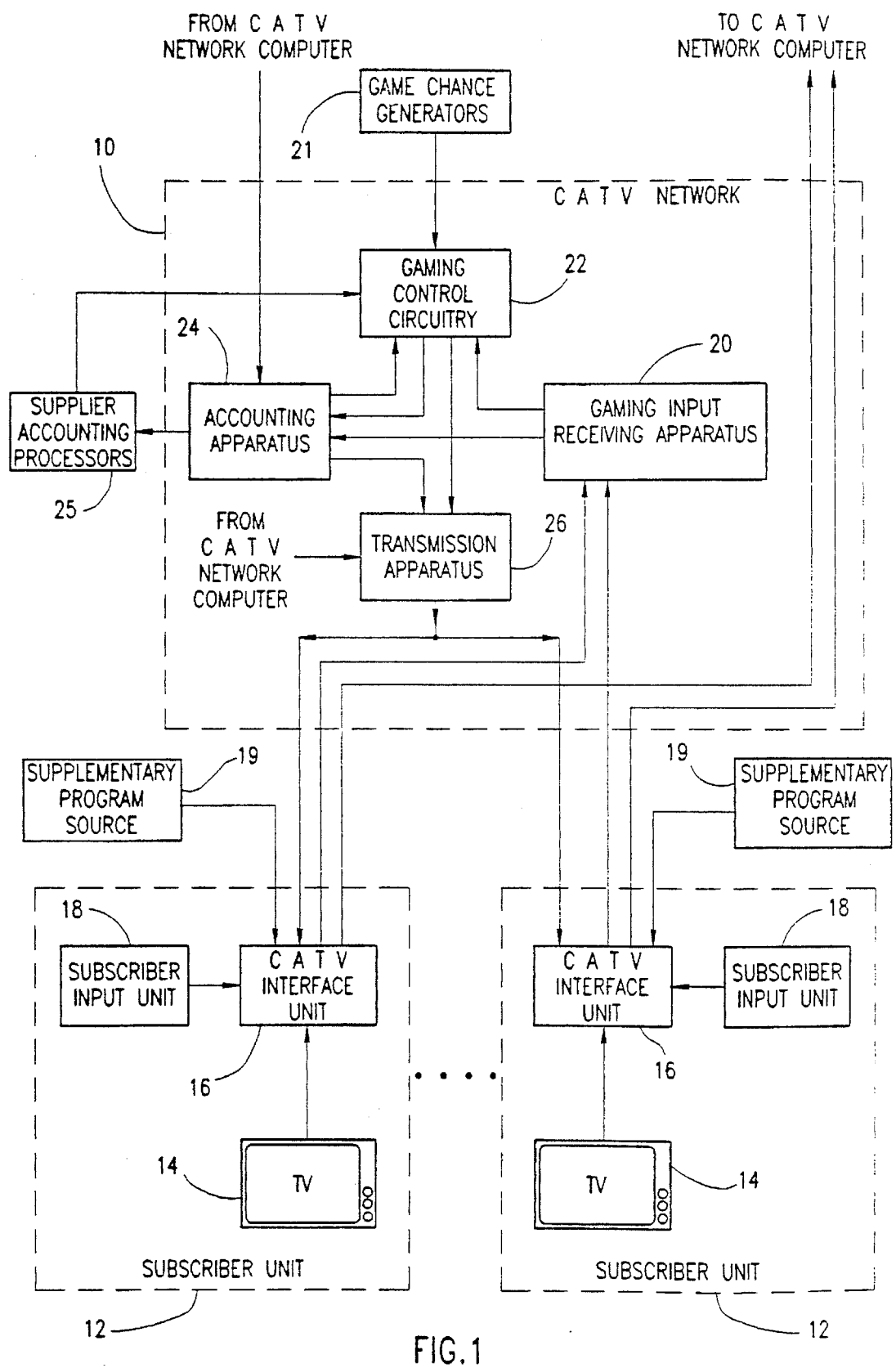
FIG. 1 is a generalized block diagram illustration of a pay television television gaming system constructed and operative in accordance with a preferred embodiment of the present invention.

Reference is now made to FIG. 1, which is a generalized block diagram illustration of a pay television television gaming system constructed and operative in accordance with a preferred embodiment of the present invention.

The pay television gaming system includes or is used with a pay television network 10 typically including program input apparatus (not shown) coupled by any suitable connection, e.g. cables and microwave, with a multiplicity of subscriber units 12. The pay television network envisioned in the present invention may provide communication in either a single direction, i.e. to the subscriber, or alternatively in both directions, i.e. both to and from the subscriber. Where the pay television network provides communication only in a single direction, the communication from the subscriber may be handled by telephone or by any other suitable communications medium.

Preferably, each of the multiplicity of subscriber units includes a television 14, a pay television interface unit 16 and an associated subscriber input unit 18. The pay television interface unit 16 may include a conventional decoder which is commercially available from multiple vendors. Preferably, however, the interface unit 16 is a special purpose unit, whose functionality is described hereinbelow with reference to FIGS. 7A–7C.

The subscriber input unit 18 may include a conventional pay television remote control unit. Alternatively it may include a keyboard or other alphanumeric input device which is associated with the interface unit 16.

In accordance with a preferred embodiment of the invention, the pay television network 10 provides one or more gaming programs which may be selected by subscribers and in connection with which subscribers may enter gaming inputs, such as bets in a card game or roulette. Alternatively, the gaming program may be received by subscribers not via the pay television network 10 but rather from a supplementary program source 19, such as a video cassette or a computer, via interface 16.

In accordance with a preferred embodiment of the present invention apparatus 20 is provided for receiving gaming inputs from the multiplicity of subscriber units 12. This apparatus may be implemented as part of the computer system of the pay television network 10 or alternatively may be separate computer apparatus associated therewith. Apparatus 20 may receive data from subscriber units 12 via the pay television network or via a telephone link via a modem (not shown) at the subscriber side. The functionality and structure of the apparatus for receiving gaming inputs will be described in detail hereinafter in connection with FIG. 8.

Gaming is administered by gaming control circuitry 22, which interfaces with apparatus 20 and with transmission apparatus 26, which transmits the gaming program and results to subscribers along the pay television network. The functionality and structure of the gaming control circuitry 22 will be described in detail hereinafter in connection with FIGS. 9A and 9B. Gaming control circuitry 22 also receives inputs from game chance generators 21 and from supplier accounting processors 25.

In accordance with a preferred embodiment of the present invention, accounting apparatus 24 interfaces with gaming control circuitry 22 for administering financial transactions related to the gaming between the subscribers and the pay television network. The accounting apparatus 24 may be operated as part of the pay television network accounting system, and may debit and credit, losses and winnings as the case may be to the subscribers' pay television accounts. Alternatively and preferably, separate accounts for pay television programs and gaming are maintained. The functionality and structure of the accounting apparatus 24 will be described in detail hereinafter in connection with FIGS. 10A and 10B.

The accounting apparatus 24 may interface directly with transmission apparatus 26 for providing information to subscribers regarding their winnings, losses, and account balances via the pay television system. The functionality and structure of the transmission apparatus 26 will be described in detail hereinafter in connection with FIG. 11. Preferably the accounting apparatus 24 maintains separate accounts for pay television program charges and for non-program charges.

Figure 2:
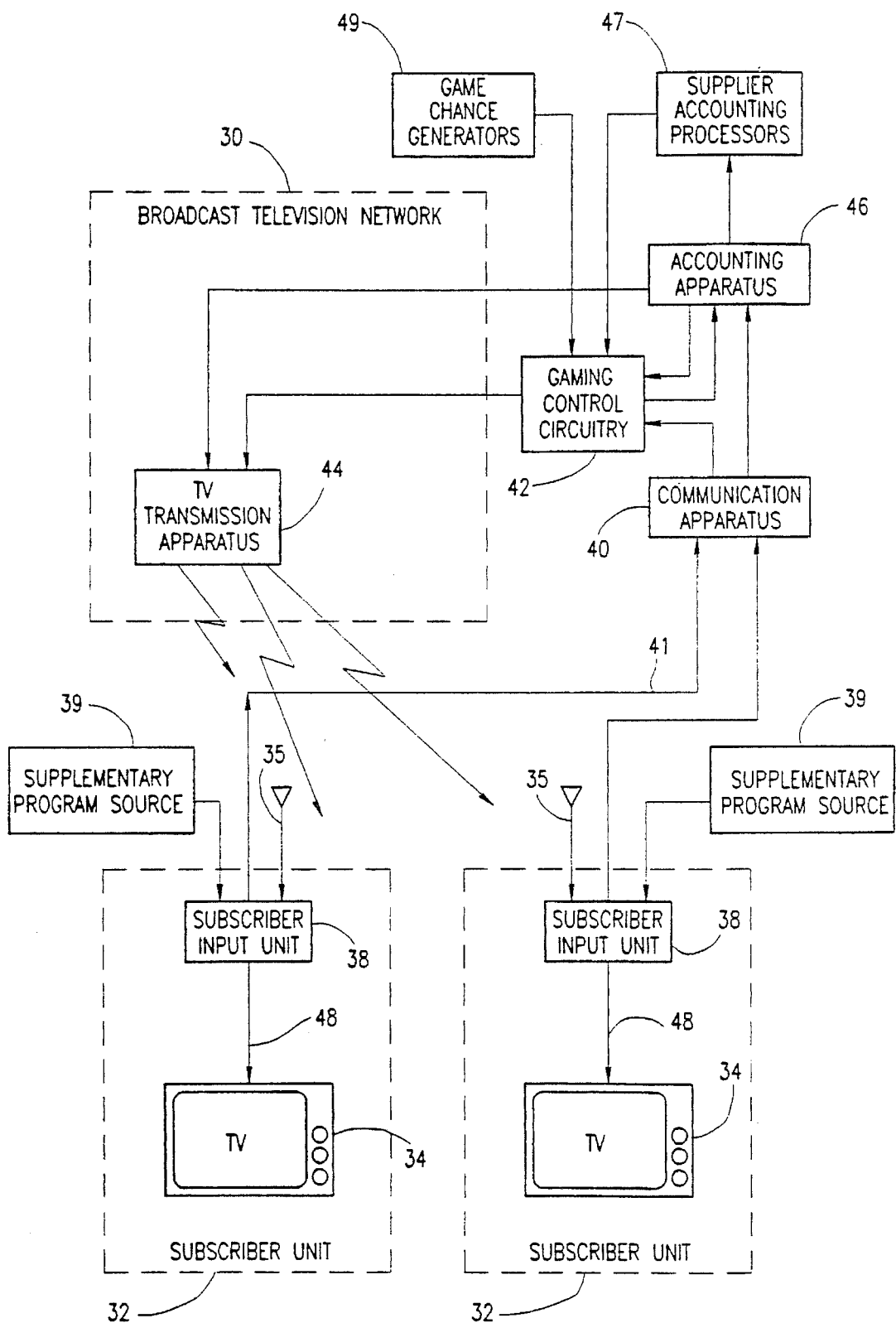
FIG. 2 is a generalized block diagram illustration of a broadcast television gaming system constructed and operative in accordance with a preferred embodiment of the present invention.

Reference is now made to FIG. 2, which is a generalized block diagram illustration of a broadcast television gaming system constructed and operative in accordance with a preferred embodiment of the present invention.

The broadcast television gaming system includes or is used with a broadcast television networks 30 typically including program input apparatus (not shown) and reaching a multiplicity of subscriber units 32.

Preferably, each of the multiplicity of subscriber units includes a television 34 including an antenna 35 and an associated subscriber input unit 38. The subscriber input unit 38 is preferably a conventional or special purpose unit, whose functionality is described hereinbelow with reference to FIGS. 12A and 12B. It may include a keyboard or other alphanumeric input device. The subscriber input unit 38 may also serve as a report television controller.

The subscriber input unit 38 is preferably associated with wired or wireless communication apparatus 40, via a telephone line or any other suitable communication link 41. Subscriber input unit 38 may also receive programs from a supplementary program source 39.

In accordance with a preferred embodiment of the invention, the broadcast television network 30 provides one or more gaming programs which may be selected by subscribers and in connection with which subscribers may enter gaming inputs, such as bets in a card game or roulette, via the subscriber input unit 38.

In accordance with a preferred embodiment of the present invention communication apparatus 40 is operative for receiving gaming inputs from the multiplicity of subscriber units 32.

The functionality and structure of apparatus 40 will be described in detail hereinafter in connection with FIG. 13.

Gaming is administered by gaming control circuitry 42, which interfaces with apparatus 40 and with TV transmission apparatus 44, which transmits the gaming program and results to subscribers along the broadcast television network. Gaming control circuitry 42 also receives inputs from supplier accounting processors 47 and from supplier game chance generators 49, such as suitably programmed computers.

In accordance with a preferred embodiment of the present invention, accounting apparatus 46 interfaces with gaming control circuitry 42 for administering financial transactions related to the gaming between the subscribers and the broadcast television network. The accounting apparatus may debit and credit, losses and winnings as the case may be to the subscribers' accounts.

The accounting apparatus 46 may interface directly with communication apparatus 40 for providing information to subscribers regarding their winnings and losses, via the broadcast television system. Accounting apparatus 46 may also interface directly with transmission apparatus 44 for providing information to subscribers regarding their winnings, losses and account balances, via the television broadcast network 30. This information may be received by the subscriber in oral form, or alternatively in visual form by means of a display associated with the subscriber input unit 38 or alternatively displayed on the television 34 by means of a suitable display output link 48 between the subscriber input unit 38 and the television 34.

Accounting apparatus 46 may also interface directly with supplier accounting processors 47 to provide accounting data related to suppliers.

Figure 3:
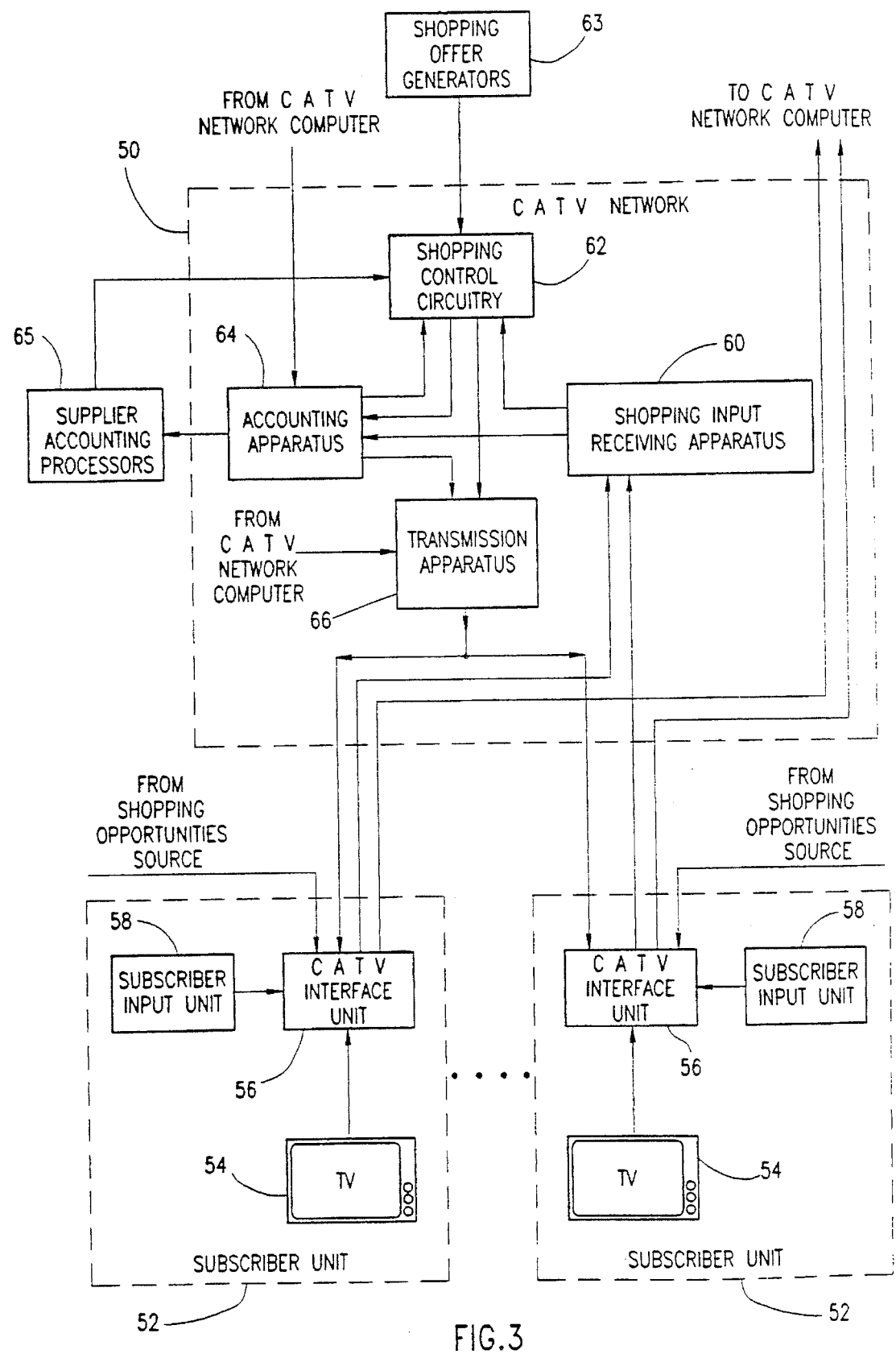
FIG. 3 is a generalized block diagram illustration of a pay television television shopping system constructed and operative in accordance with a preferred embodiment of the present invention.

Reference is now made to FIG. 3, which is a generalized block diagram illustration of a pay television television shopping system constructed and operative in accordance with a preferred embodiment of the present invention.

The pay television shopping system includes or is used with a pay television network 50 typically including program input and transmission apparatus (not shown) and being coupled by any suitable connection, e.g. cables and microwave, with a multiplicity of subscriber units 52.

Preferably, each of the multiplicity of subscriber units includes a television 54, a pay television interface unit 56 and an associated subscriber input unit 58. The pay television interface unit 56 may be a conventional decoder which is commercially available from multiple vendors. Preferably, however, the interface unit 56 is a special purpose unit, whose functionality is described hereinbelow with reference to FIGS. 17A–17C.

The subscriber input unit 58 may be a conventional pay television remote control unit. Alternatively, it may include a keyboard or other alphanumeric input device which is associated with the interface unit 56.

In accordance with a preferred embodiment of the invention, the pay television network 50 provides one or more shopping programs which may be selected by subscribers and in connection with which subscribers may enter shopping inputs, such as selection of the type of goods, color and size. Alternatively, shopping opportunities may be provided by shopping offer generators 63.

In accordance with a preferred embodiment of the present invention apparatus 60 is provided for receiving shopping inputs from the multiplicity of subscriber units 52. This apparatus may be implemented as part of the computer system of the pay television network 50 or, alternatively, may be separate computer apparatus associated therewith. The functionality and structure of the apparatus for receiving shopping inputs 60 will be described in detail hereinafter in connection with FIG. 18.

Shopping is administered by shopping control circuitry 62, which interfaces with apparatus 60 and with transmission apparatus 66. One possible type of shopping program is an auction, wherein the bidding and results are transmitted to subscribers along the pay television network. Shopping control circuitry 62 also interfaces with shopping offer generators 63 and supplier accounting processors 65 to receive offers for shopping and shopping announcements.

In accordance with a preferred embodiment of the present invention, accounting apparatus 64 interfaces with shopping control circuitry 62 for administering financial transactions related to the shopping between the subscribers and the pay television network. The accounting apparatus 64 may be operated as part of the pay television network accounting system, and may debit and credit, losses and winnings as the case may be to the subscribers' pay television accounts. Alternatively and preferably, separate accounts for pay television programs and shopping are maintained.

The accounting apparatus 64 may interface directly with transmission apparatus 66 for providing information to subscribers regarding their winnings, losses, and account balances via the pay television system. Preferably the accounting apparatus 64 maintains separate accounts for pay television program charges and for non-program charges.

Figure 4B:
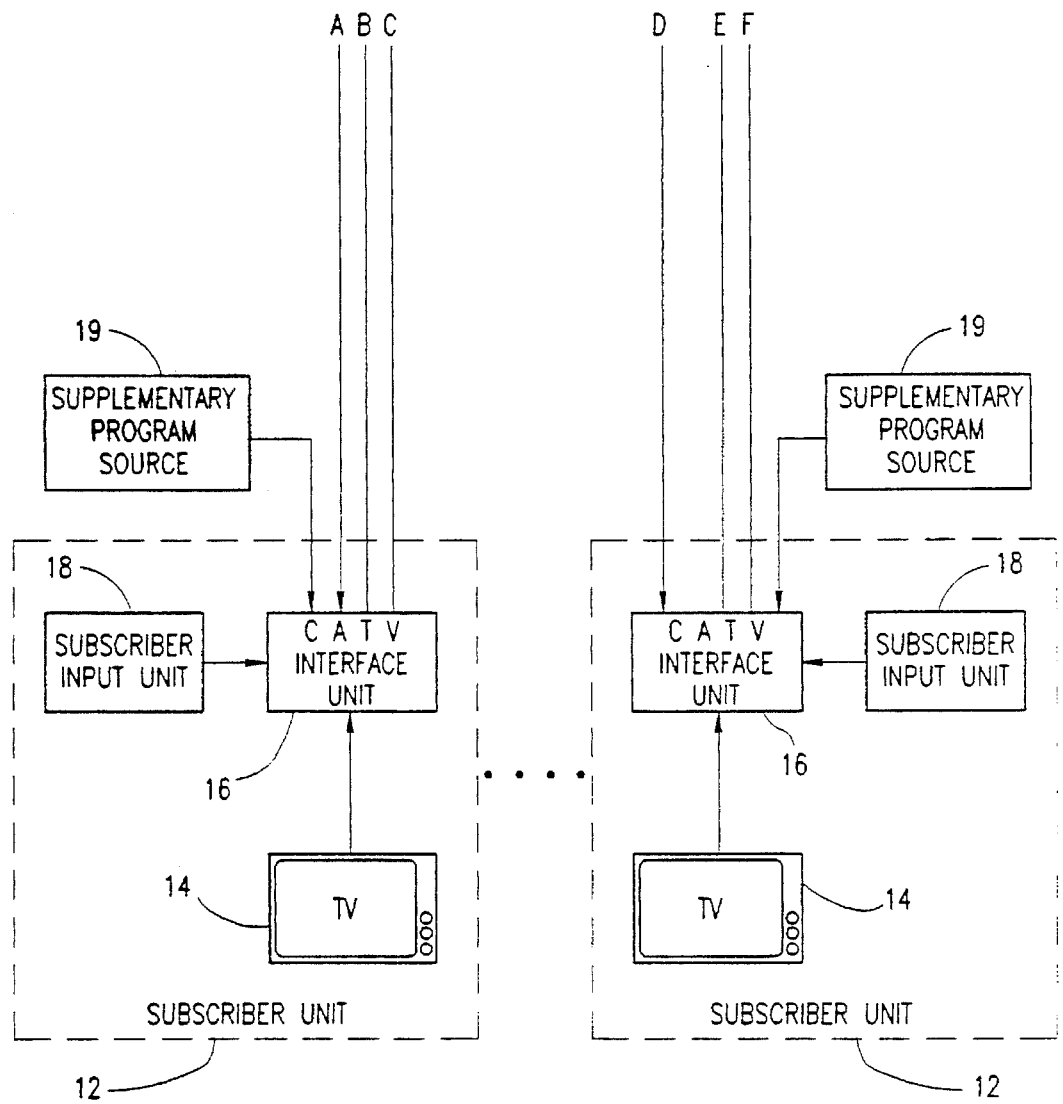

Reference is now made to FIGS. 4A and 4B which together illustrate in generalized block diagram form apparatus for providing interactive live pay television programming for an auction or gaming. The apparatus of FIGS. 4A and 4B may be used in conjunction with the systems illustrated in either of FIGS. 1 and 3.

Gaming or shopping input apparatus 80, which may be apparatus 20 or 60 in FIGS. 1 and 3, respectively provides, via a suitable interface 82, subscriber inputs to a studio 84, such as an auction or gaming hall. Depending on the particular activity being carried on, the subscriber inputs may be displayed visually on a display 86 in the studio or alternatively may be utilized in any other suitable manner.

The gaming or auction is carried out live before a television camera 88, using the subscriber inputs as bids in an auction or bets in gaming, as appropriate. The camera 88 captures the essential activity based on the subscriber inputs and transmits a live image of this activity via suitable interface circuitry 90 to results transmission apparatus 92 and thence to subscriber units 12. Results of a game are also input, via interface 90, to gaming control circuitry 22.

Results transmission apparatus 92 is operative to add to the transmission in overlay or in any other manner, as desired, gaming or auction results.

Figure 5:
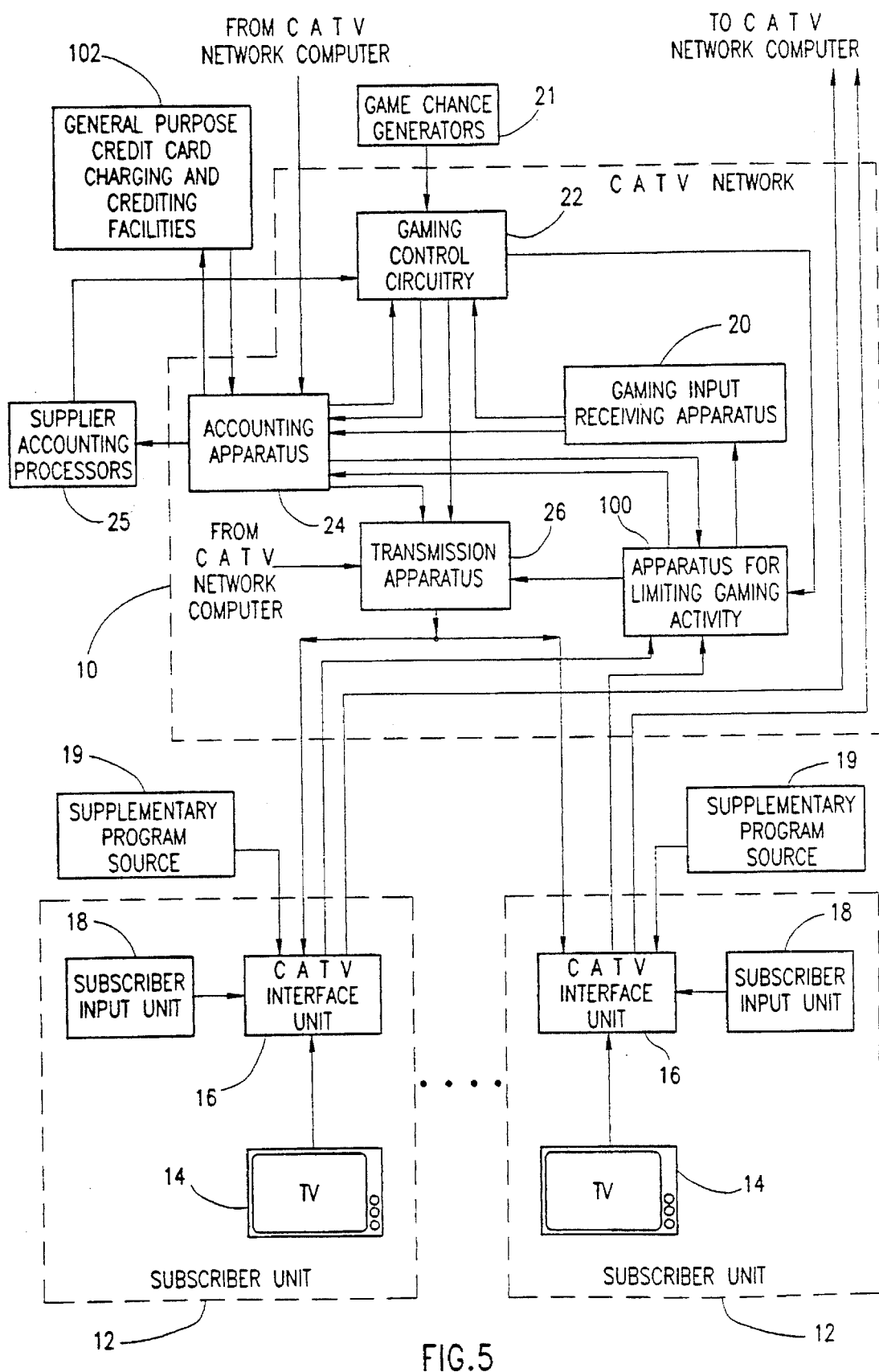
FIG. 5 is a generalized block diagram illustration of a pay television television gaming system constructed and operative in accordance with a yet another preferred embodiment of the present invention.

Reference is now made to FIG. 5 which illustrates a pay television television gaming system of the type shown in FIG. 1 with certain modifications which will now be described. Most of the elements of FIG. 5 may be identical to those in the apparatus of FIG. 1 and are indicated by identical reference numerals.

The system of FIG. 5 also includes apparatus 100 for limiting gaming activity. This apparatus, which is described in more detail in FIG. 22, may be operative to prohibit or limit gaming activity in response to control inputs received, from any suitable source, such as subscriber units 12, gaming control circuitry 22 and accounting apparatus 24.

The inputs from the subscriber units 12 may be intended to prevent gaming from being available to a subscriber entirely or at certain hours, or above certain monetary limits.

The inputs from the gaming control circuitry 22 may limit gaming to certain frequencies or monetary limits and the inputs from accounting apparatus 24 may limit the amount of losses or wins that the subscriber is allowed to accrue.

The system of FIG. 5 also includes a general purpose conventional credit card interface 102, which is coupled to accounting apparatus 24 and which may interact with major credit card networks in a conventional manner and permit charging and crediting to subscriber credit cards for gaming losses and winnings.

Figure 6:
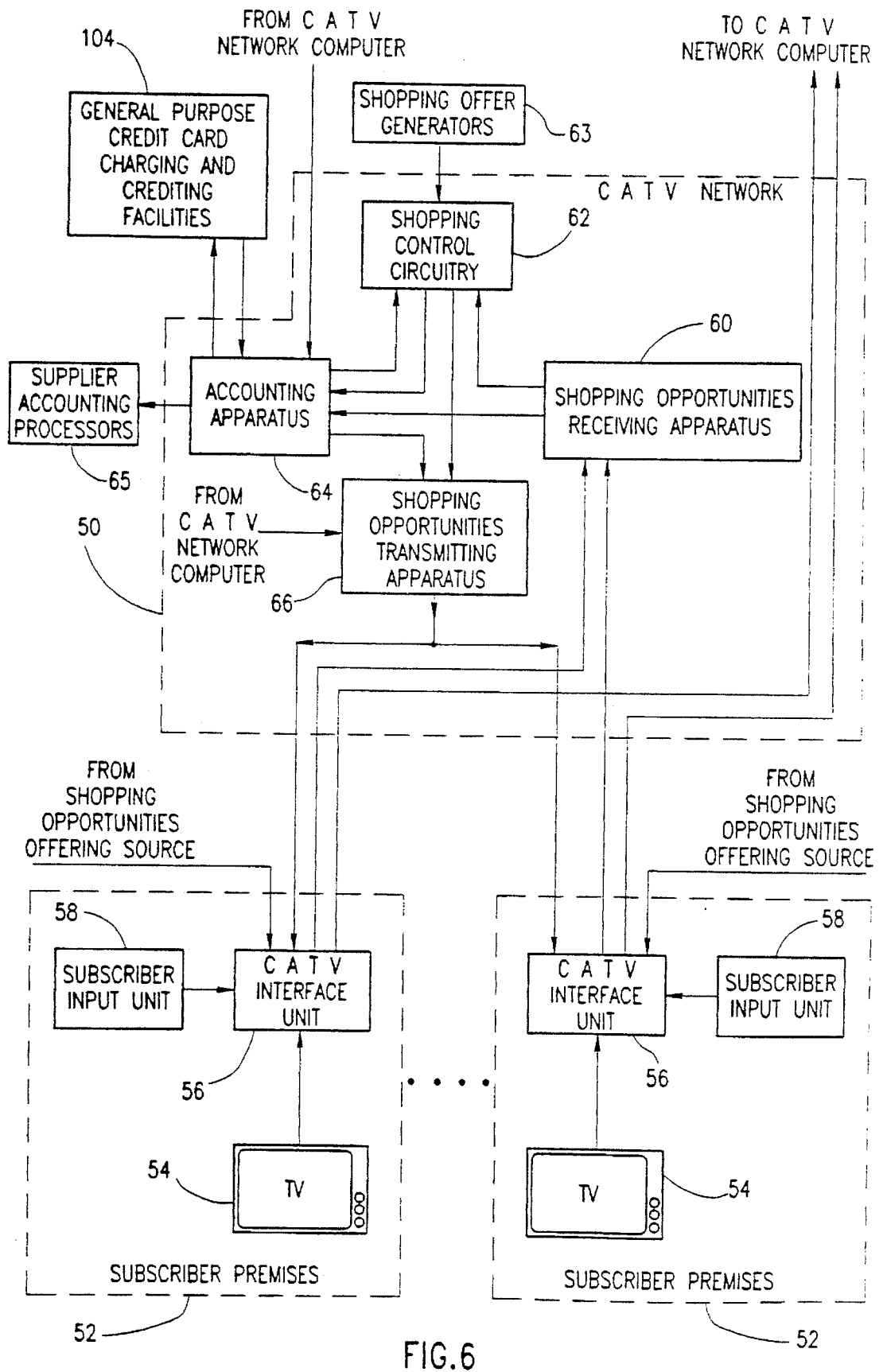
FIG. 6 is a generalized block diagram illustration of a pay television television shopping system constructed and operative in accordance with a preferred embodiment of the present invention.

Reference is now made to FIG. 6 which illustrates a pay television television shopping system of the type shown in FIG. 3 with a modification which will now be described. Most of the elements of FIG. 6 may be identical to those in the apparatus of FIG. 3 and are indicated by identical reference numerals.

The system of FIG. 6 also includes a general purpose conventional credit card interface 104, coupled to accounting apparatus 64, and which may interact with major credit card networks in a conventional manner and permit charging and crediting to subscriber credit cards for shopping expenses.

Figure 7A:
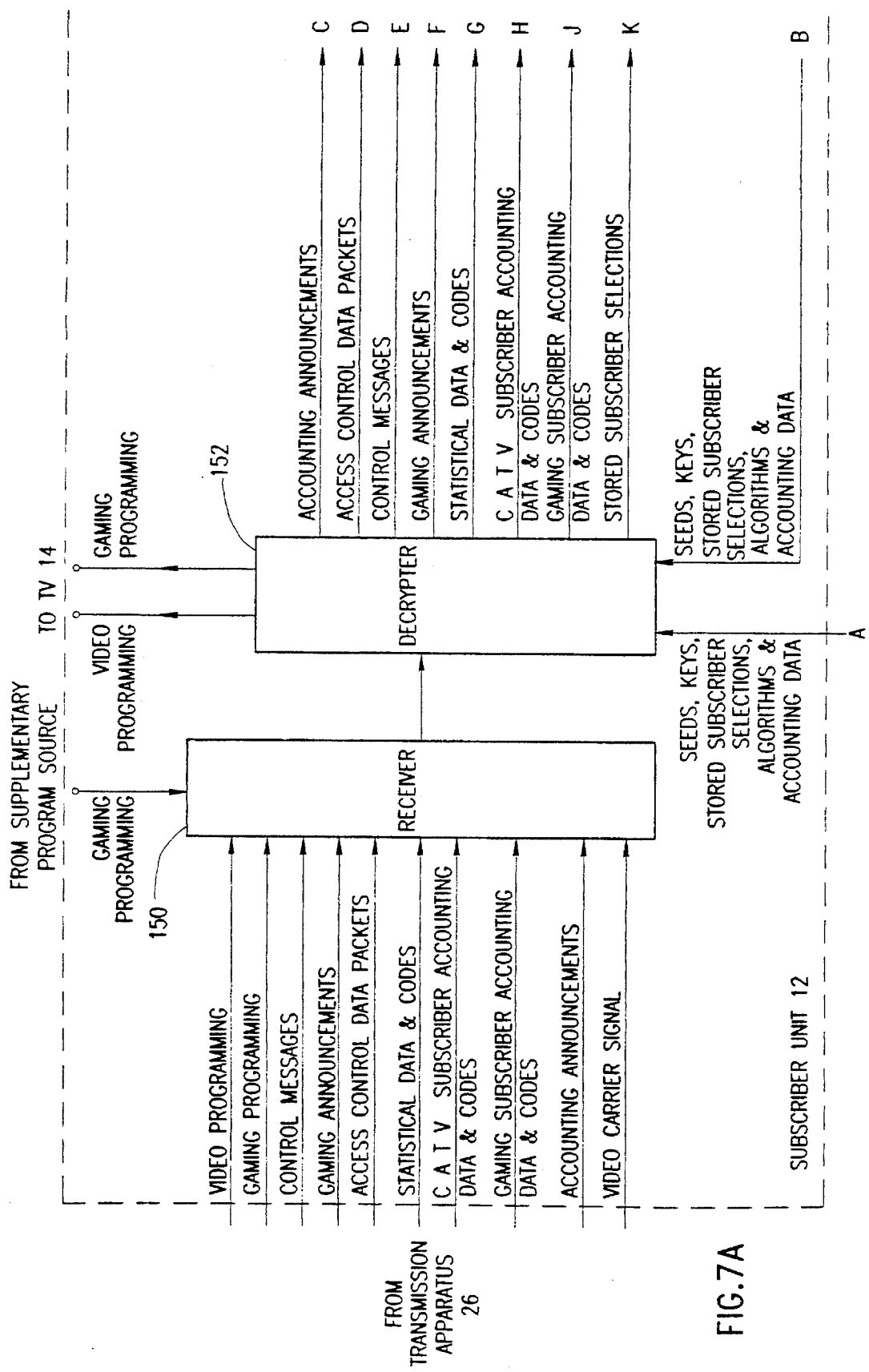
FIGS. 7A, 7B and 7C together constitute a simplified block diagram illustration of part of the apparatus of FIG. 1.
Figure 7B:
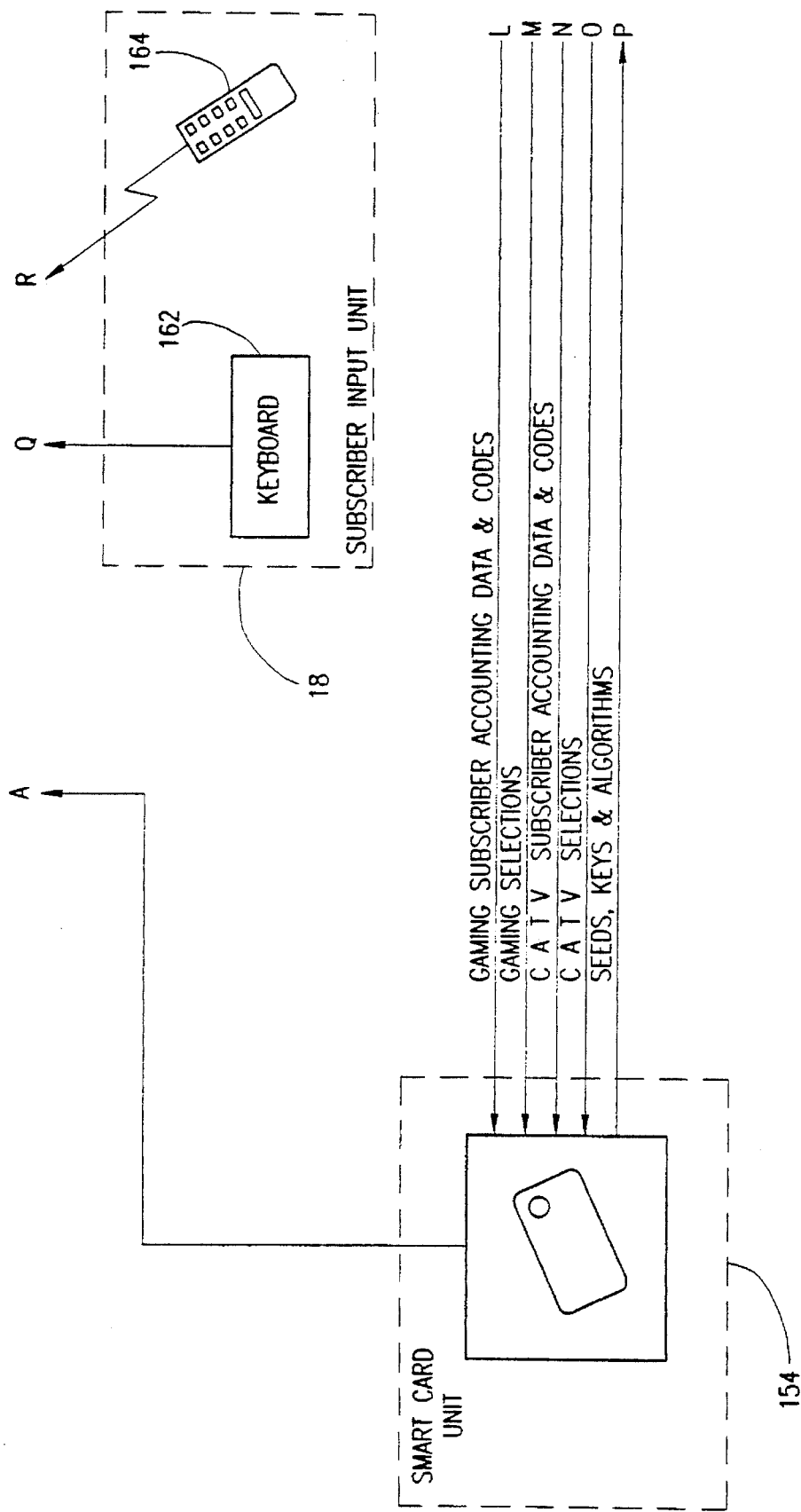
Figure 7C:
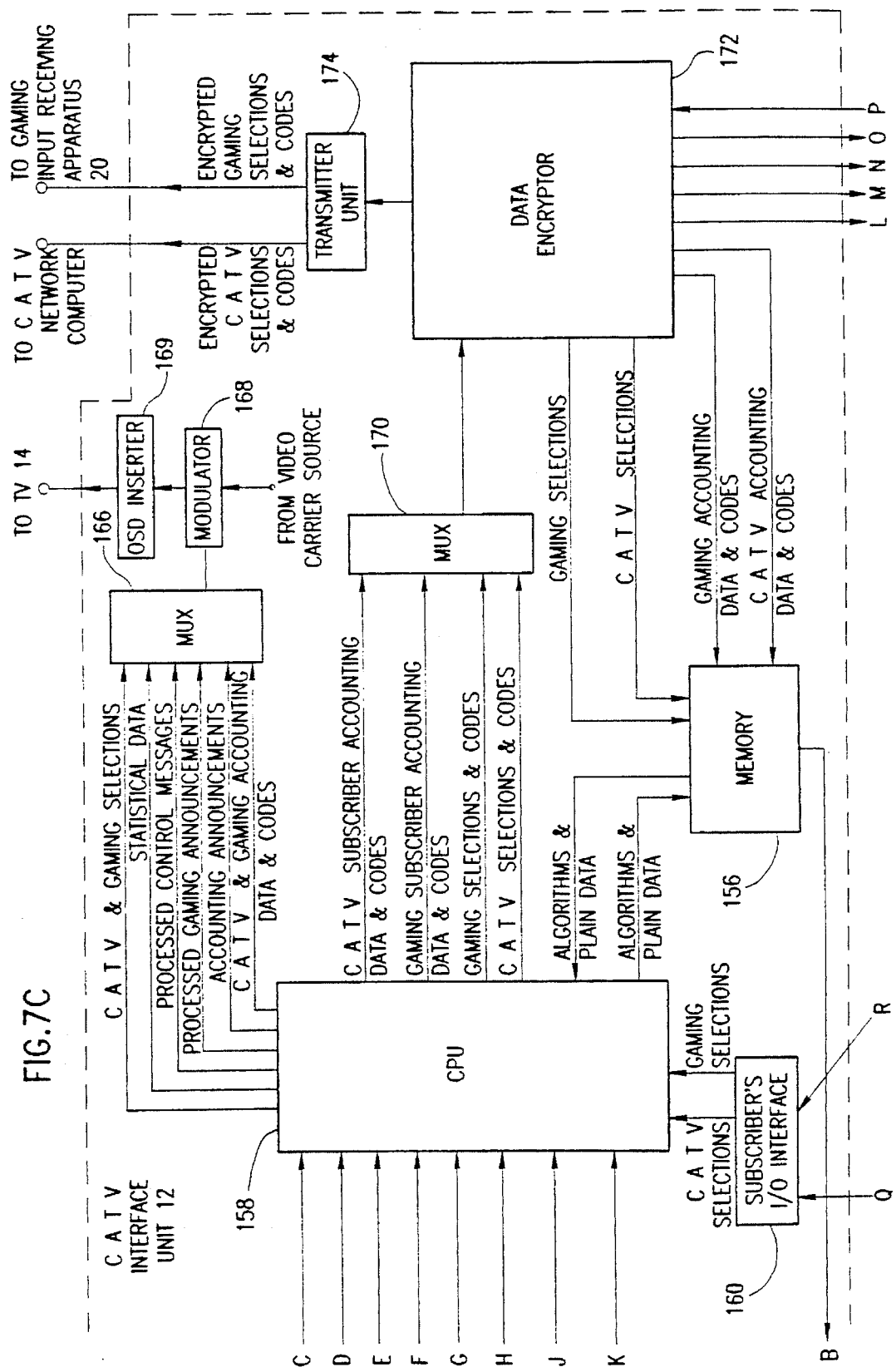

Reference is now made to FIGS. 7A–7C which together illustrate a preferred embodiment of a pay television interface which may be employed as interface unit 16 and input unit 18 in the embodiment of FIG. 1. Each subscriber receives at interface unit 16 a plurality of different scrambled inputs from transmission apparatus 26 and from regular program transmitters. These inputs may include video programming, gaming programming, control messages, gaming announcements, access control data packets, statistical data and codes, pay television subscriber accounting data and codes, gaming subscriber accounting data and codes, accounting announcements, and a video carrier signal on which the above-mentioned inputs are carried.

Preferably the inputs from transmission apparatus 26 are received at a receiver 150 which may perform necessary demodulation and provides an output to a decrypter 152 which decodes the inputs. Alternatively, the inputs may not be scrambled and the decrypter may be eliminated. As a further alternative, only some of the inputs may be scrambled. The receiver 150 may be a conventional receiver useful with encrypted pay television systems.

The decrypter also receives one or more of the following additional inputs: seeds, keys, stored subscriber selections, algorithms and accounting data from a smart card unit 154 or from a memory 156. Most of these additional inputs are employed for decrypting the output of receiver 150 or a portion thereof.

The decrypter provides video programming and gaming programming output signals to a television 14 (FIG. 1) and also provides the following outputs to a CPU 158:

control messages, gaming announcements, access control data packets, statistical data and codes, pay television subscriber accounting data and codes, gaming subscriber accounting data and codes, accounting announcements and stored subscriber selections.

CPU 158 also receives gaming inputs via a subscriber input data receiver 160, such as a conventional I/O interface, which may be actuated either by a keyboard 162 connected thereto or remotely by a remote control device 164 which forms part of the input unit 18. CPU 158 also receives algorithms and plain data from memory 156.

CPU 158 provides the following outputs via a multiplexer 166, a modulator 168 and an on-screen display (OSD) inserter 169 to television 14 (FIG. 1):

pay television & gaming selections, statistical data, processed control messages, processed gaming announcements, accounting announcements, pay television & gaming accounting data & codes.

CPU 158 also provides the following outputs via a multiplexer 170 and a data encryptor 172:

pay television subscriber accounting data & codes, gaming subscriber accounting data & codes, gaming selections & codes, pay television selections & codes.

Data encryptor 172 receives seeds, keys and algorithms from smart card unit 154 and provides, via a transmitter unit 174, encrypted pay television selections and encrypted gaming selections to the pay television network computer and to gaming input receiving apparatus 20 (FIG. 1), respectively. The data encryptor 172 preferably also provides the following encrypted outputs to one or both of the memory 156 and the smart card device 154:

gaming subscriber accounting data and codes, gaming selections, pay television subscriber accounting data and codes and pay television selections.

The smart card unit 154 is preferably operative in accordance with the teachings of applicant's published European Patent Application 90310131.9. It is appreciated that according to an embodiment of the invention, either the memory 156 or the smart card unit 154 may be eliminated.

Figure 8:
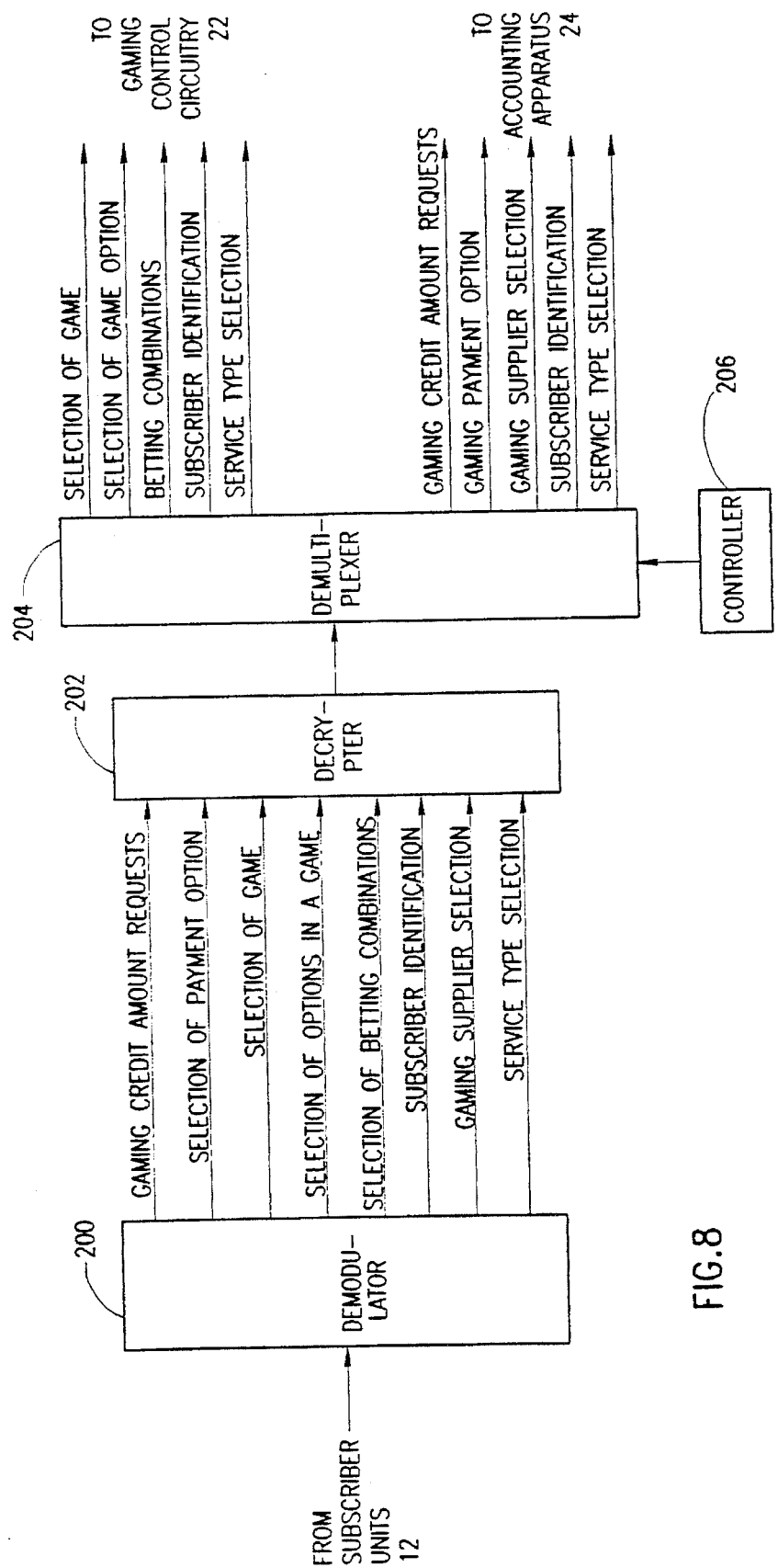
FIG. 8 constitutes a simplified block diagram illustration of gaming input receiving apparatus forming part of the apparatus of FIG. 1.

Reference is now made to FIG. 8 which illustrates the structure and functionality of the gaming input receiving apparatus 20 which forms part of the apparatus of FIG. 1. A demodulator 200, receives and demodulates the following inputs from subscriber units 12 via interfaces 16:

Selection of payment option
Gaming credit amount requests
Selection of game
Selection of options in game
Selection of betting combinations
Subscriber identification
Gaming supplier selection
Service type selection Optionally, the gaming input receiving apparatus 20 may also receive pay television programming selections and other pay television related subscriber selections.

In accordance with an embodiment of the invention, the inputs to demodulator 200 are received in encrypted form. In such a case, a suitable decrypter 202 is provided for receiving the output of demodulator 200.

The output of decrypter 202, or, in the absence of a decrypter, the output of demodulator 200 is preferably supplied to a demultiplexer 204, which separates the various inputs into inputs destined for gaming control circuitry 22 and inputs destined for accounting apparatus 24. Demultiplexer 204 assigns inputs in accordance with instructions received from a controller 206.

The following inputs are directed to accounting apparatus 24:

gaming credit amount requests;
gaming payment option;
gaming supplier selection;
subscriber identification;
service type selection.

The following inputs are directed to gaming control circuitry 22:

selection of game;
selection of game option;
betting combinations;
subscriber identification;
service type selection.

It is noted that preferably all of the inputs to demodulator 200, as well as other information employed in the system, are normally in coded form. A diagram of a typical code configuration appears in FIGS. 23–26, described in detail hereinbelow.

Figure 9A:
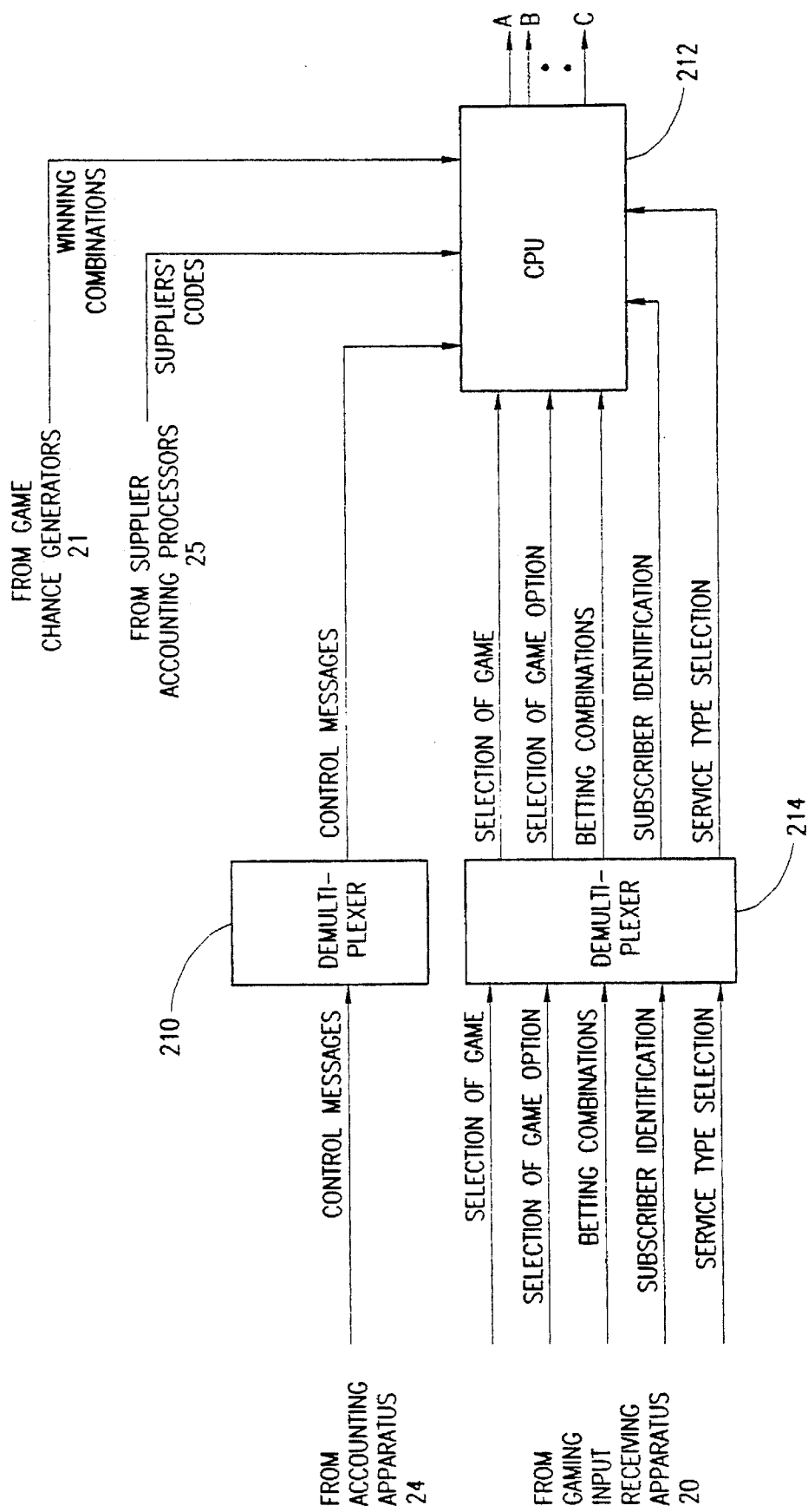
FIGS. 9A and 9B together constitute a simplified block diagram illustration of gaming control circuitry forming part of the apparatus of FIG. 1.
Figure 9B:
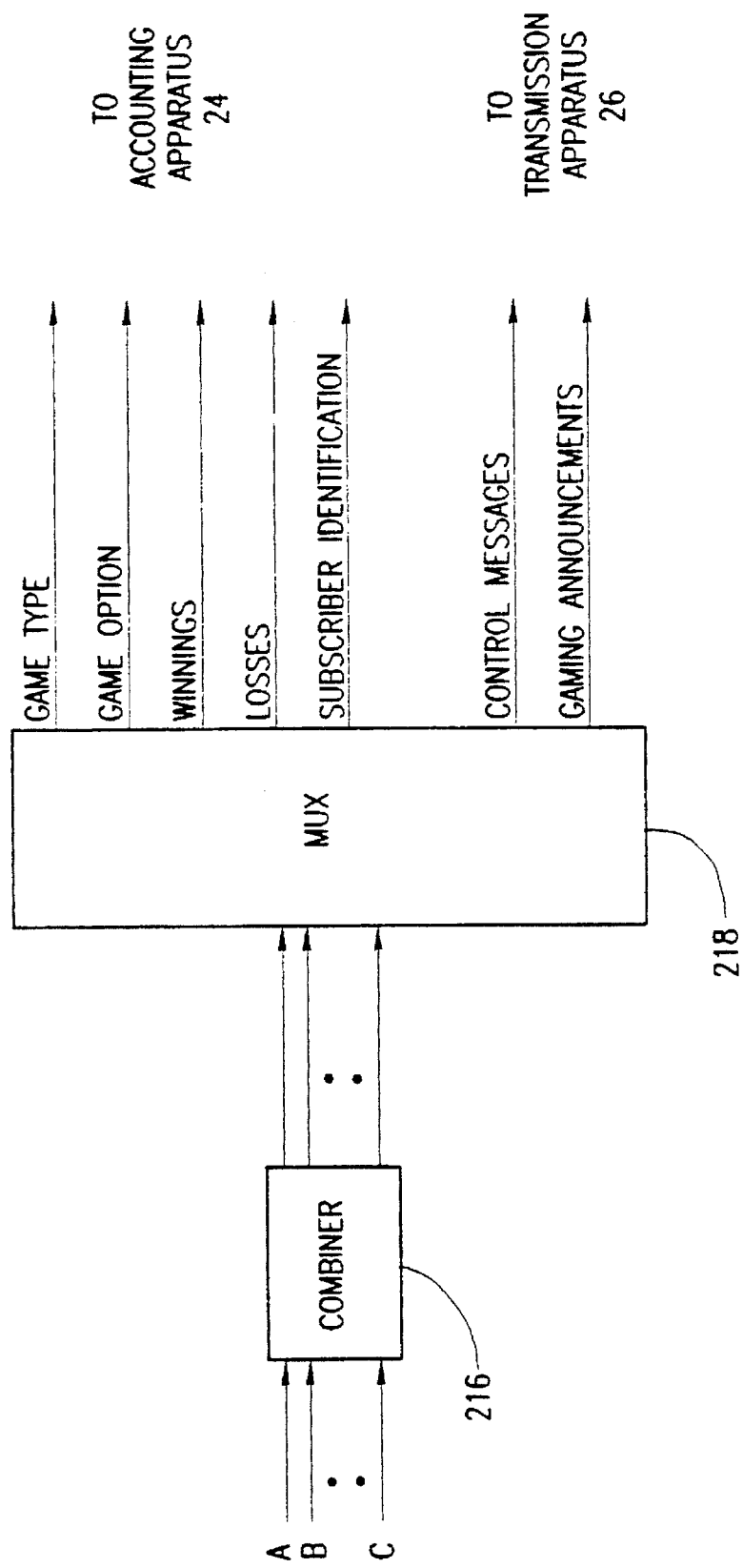

Reference is now made to FIGS. 9A and 9B which together illustrate gaming control circuitry 22 of FIG. 1. The gaming control circuitry 22 of FIG. 1 comprises a demultiplexer 210 which receives control messages from accounting apparatus 24 (FIG. 1) and provides demultiplexed control messages to a CPU 212.

A second demultiplexer 214 receives the following inputs from gaming input receiving apparatus 20:

selection of game;
selection of game option;
betting combinations;
subscriber identification;
service type selection.

The demultiplexer 214 separates the inputs and directs them to CPU 212. CPU 212 processes these inputs, together with inputs received from game chance generators 21, which determine winning combinations, and from supplier accounting processors 25 which provide supplier codes.

The outputs of CPU 212 are typically combined in a combiner 216 which outputs to a multiplexer 218. Multiplexer 218 provides the following outputs to accounting apparatus 24:

game type;
game option;
winnings;
losses;
subscriber identification.

Multiplexer 218 also provides control messages and gaming announcements to transmission apparatus 26 for transmission to the appropriate subscribers.

Figure 10A:
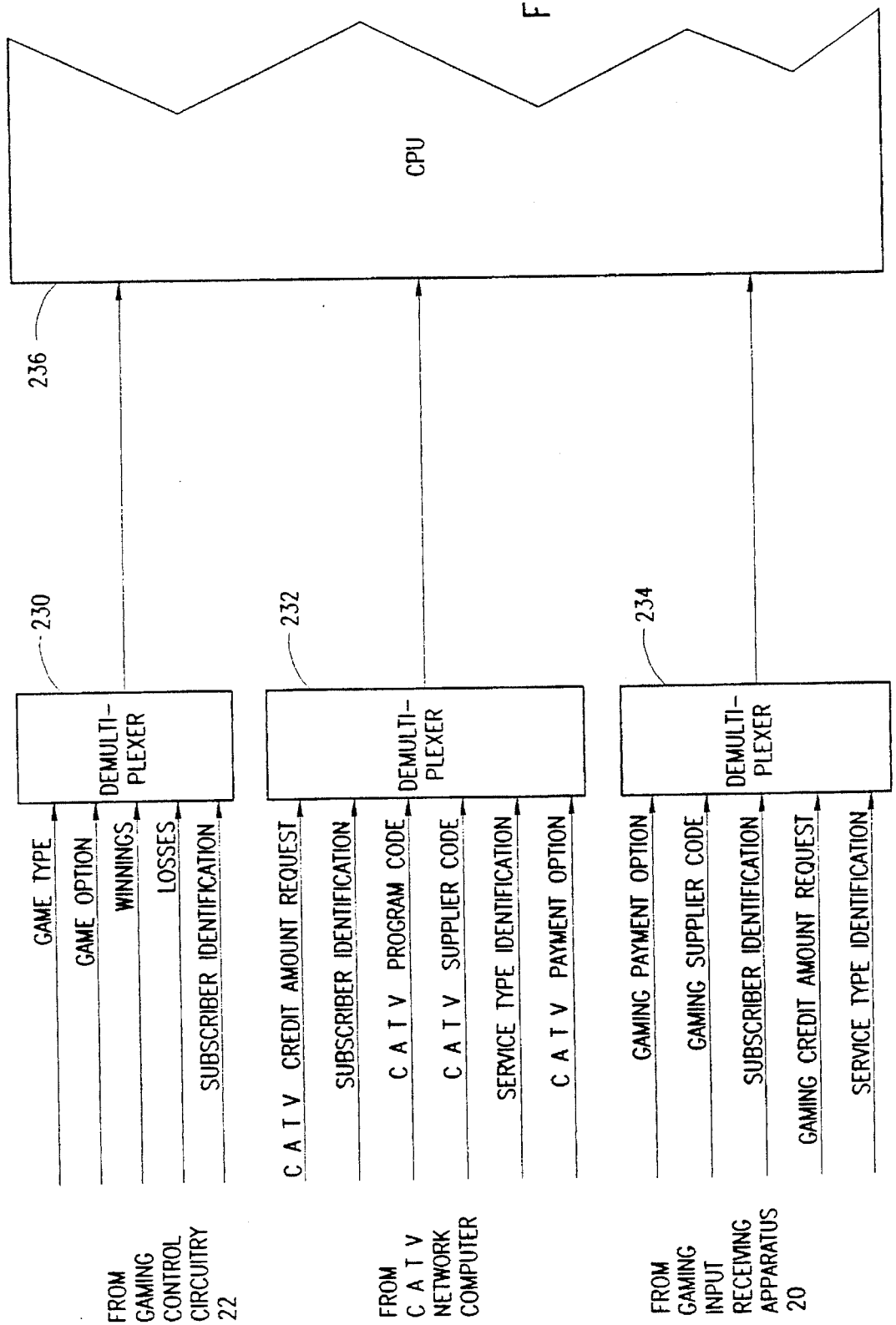

Reference is now made to FIGS. 10A and 10B, which together illustrate the accounting apparatus 24 of FIG. 1.

A first demultiplexer 230 receives the following inputs from gaming control circuitry 22:

game type;
game option;
winnings;
losses;
subscriber identification.

A second demultiplexer 232 receives the following inputs from the pay television network computer:

pay television credit amount request;
subscriber identification;
pay television program code;
pay television supplier code;
Service type identification;
pay television payment option.

A third demultiplexer 234 receives the following inputs from gaming input receiving apparatus 20:

gaming credit amount request;
gaming payment option;
gaming supplier code;
subscriber identification;
service type identification.

The outputs of demultiplexers 230, 232 and 234 are all supplied to a CPU 236, whose operational functionality will be described hereinbelow in connection with the flow chart appearing in FIGS. 27A–27C.

CPU 236 provides the following outputs to a combiner 238:

pay television credits & codes;
pay television debits & codes;
pay television balances & codes;
Gaming credits & codes;
Gaming debits & codes;
Gaming balances & codes;
Statistical data & codes.

The combiner 238 combines these outputs and supplies them in combined form to a multiplexer 240 which provides the following outputs on a subscriber-by-subscriber basis:
  Control messages to gaming control circuitry 22;
  The following outputs to transmission apparatus 26:

statistical data and codes;
accounting announcements;
pay television subscriber accounting data & codes;
Gaming subscriber accounting data & codes;

The following outputs to supplier accounting processors 25:

pay television supplier accounting data;
gaming supplier accounting data.

Combiner 238 also supplies accounting and statistical data and codes to a memory controller 242 which also receives general applications data from CPU 236 and updates a memory bank 244 including the following registers:

pay television balance register;
statistics register;
announcements register;
general applications memory;
gaming debit register;
gaming credit register;
gaming balance register;
pay television debit register;
pay television credit register.

Memory bank 244 may also be accessed by CPU 236 via memory controller 242 for transfer of general applications data.

Figure 11:
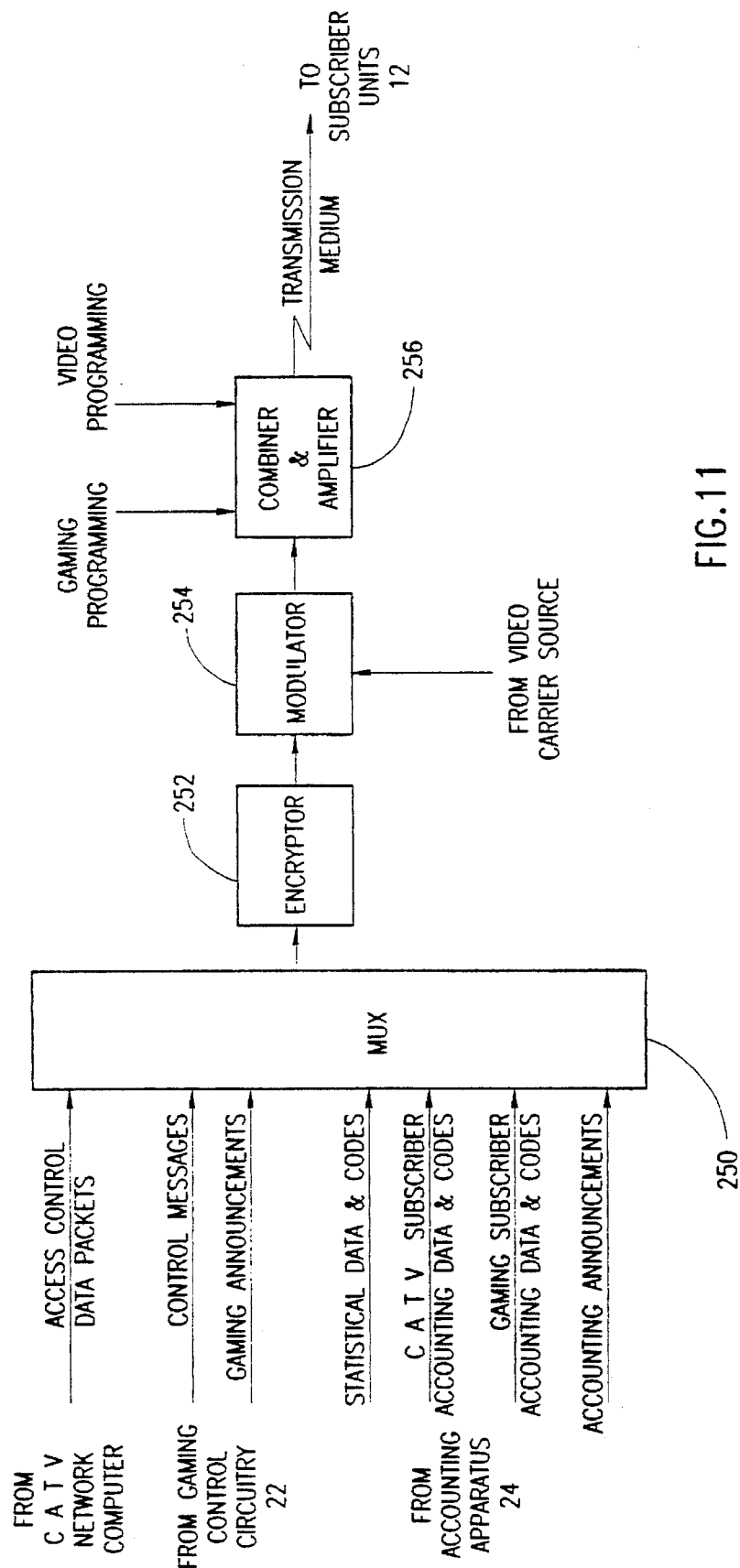
FIG. 11 is a simplified block diagram illustration of transmission apparatus forming part of the apparatus of FIG. 1.

Reference is now made to FIG. 11 which illustrates transmission apparatus 26 of FIG. 1. The transmission apparatus comprises a multiplexer 250 which receives access control data packets from the pay television network computer as well as control messages and gaming announcements from gaming control circuitry 22. The multiplexer also receives the following inputs from the accounting apparatus 24:

statistical data and codes;
accounting announcements;
pay television subscriber accounting data & codes;
Gaming subscriber accounting data & codes.

The output of multiplexer 250 is supplied via an encryptor 252 to a modulator 254, which operates on a video carrier signal received from a video carrier source and provides a modulated output to a combiner and amplifier unit 256 which receives gaming and video programming from appropriate sources and provides a video output to the subscriber units 12.

Figure 12B:
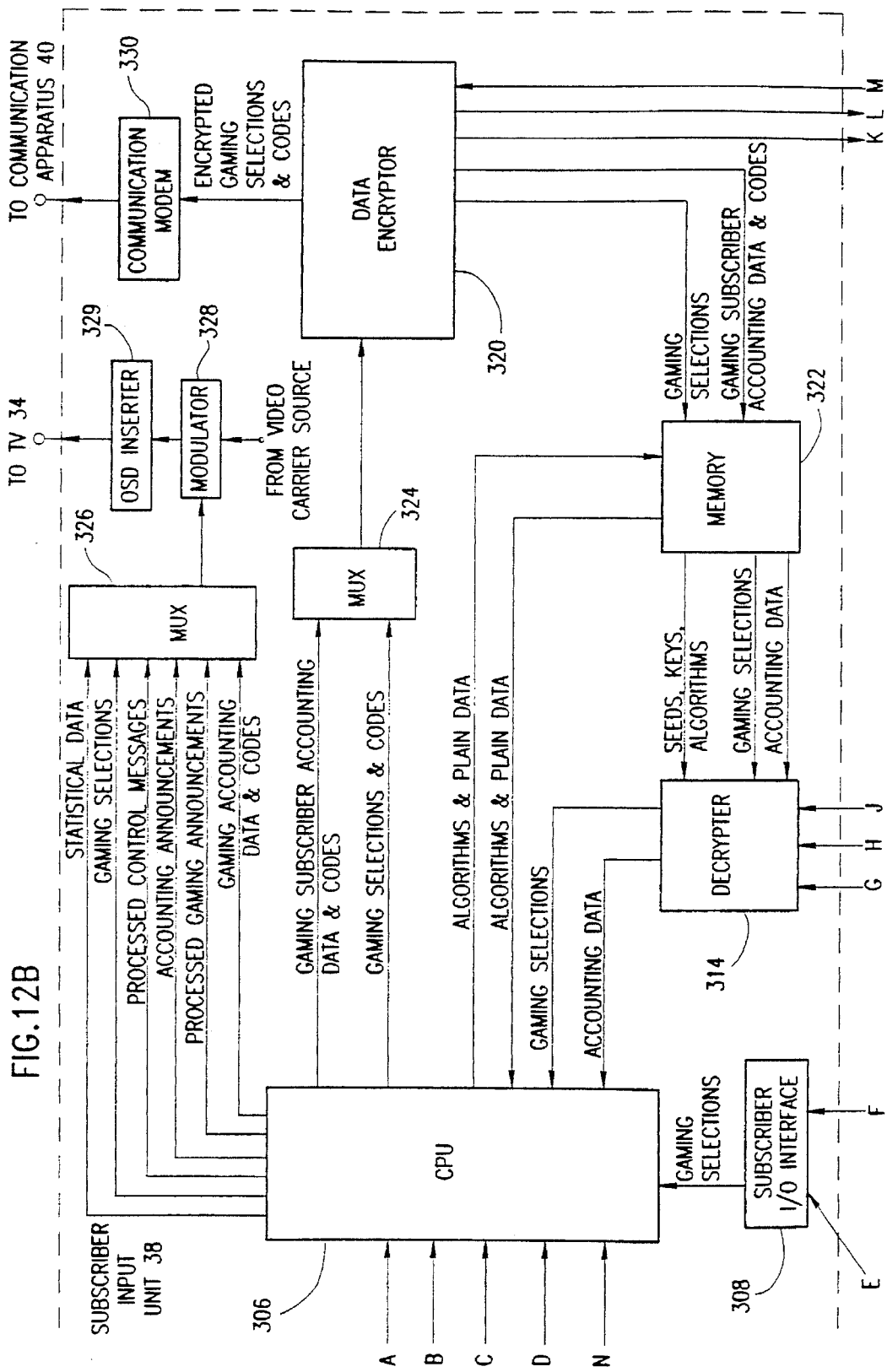

Reference is now made to FIGS. 12A and 12B which together illustrate a preferred embodiment of an interface which may be employed as subscriber input unit 38 in the embodiment of FIG. 2. Each subscriber receives at subscriber input unit 38 via an antenna 35 broadcast television inputs from the TV transmission apparatus forming part of the television broadcast network 30. Each subscriber input unit 38 may also receive a plurality of inputs from supplemental transmission apparatus 39. These inputs may include video programming, gaming programming, control messages, gaming announcements, gaming subscriber accounting data and codes, accounting announcements and statistical data and codes. These inputs are carried on a video carrier signal.

Preferably the inputs to subscriber input unit 38 are received at a receiver 300 which may provide TV programming and gaming programming directly to television 34. The remaining information is provided to a demodulator 302 and thence to a demultiplexer 304. The output of demultiplexer 304 is supplied to a CPU 306 and preferably includes accounting announcements, gaming announcements, control messages, gaming subscriber accounting data and statistical data & codes.

The CPU receives gaming selections via a subscriber I/O interface 308 from a wire-connected keyboard 310 or from a remote control unit 312. The CPU also receives a decrypted input of gaming selections and accounting data from a decrypter 314 which receives seeds, keys and algorithms as well as gaming selections, and accounting data in encrypted form from a smart card unit 316, which reads a smart card 318 or from a memory 322.

Smart card unit 316 is also operative to insert into the smart card encrypted gaming selections and encrypted gaming subscriber accounting data and codes provided by a data encryptor 320.

Memory 322 may also serve as an external memory for the CPU 306 and may store algorithms and plain data for use by the CPU 306. Data encryptor 320 provides encrypted gaming selections and gaming subscriber accounting data and codes to memory 322. Data encryptor 320 also receives seeds, keys and algorithms from smart card unit 316.

CPU 306 provides gaming subscriber accounting and gaming selections & codes to a multiplexer 324, which supplies them to data encryptor 320.

CPU 306 provides the following outputs via a multiplexer 326, a modulator 328 and an on-screen display inserter 329 to television 34 (FIG. 2):
  statistical data, gaming selections, processed control messages, processed gaming announcements, accounting announcements, gaming accounting data & codes.

Data encryptor 320 also provides, via a communication modem 330, encrypted gaming selections to communication apparatus 40.

Figure 13:
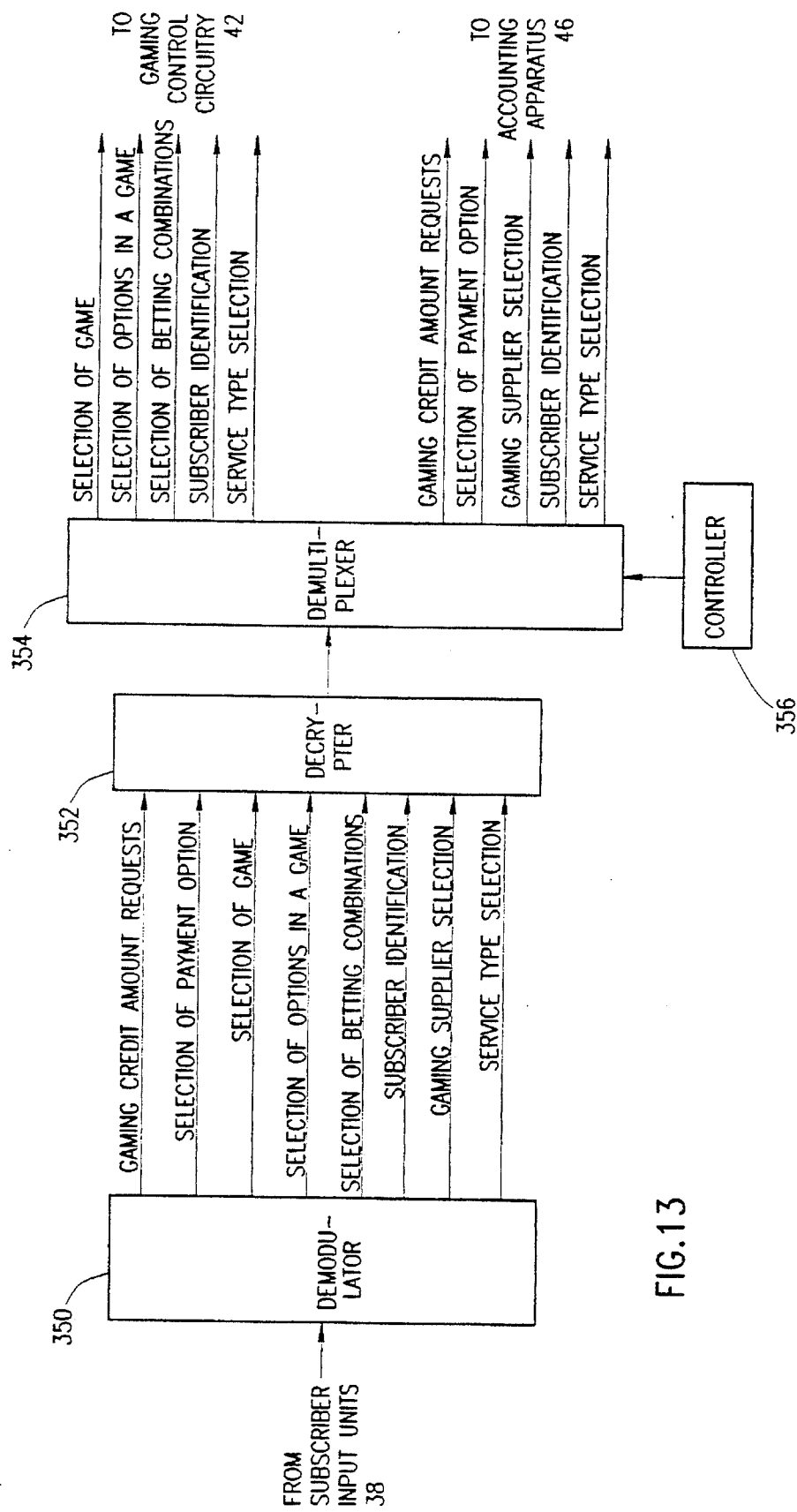
FIG. 13 constitutes a simplified block diagram illustration of communication apparatus forming part of the apparatus of FIG. 2.
Figure 14A:
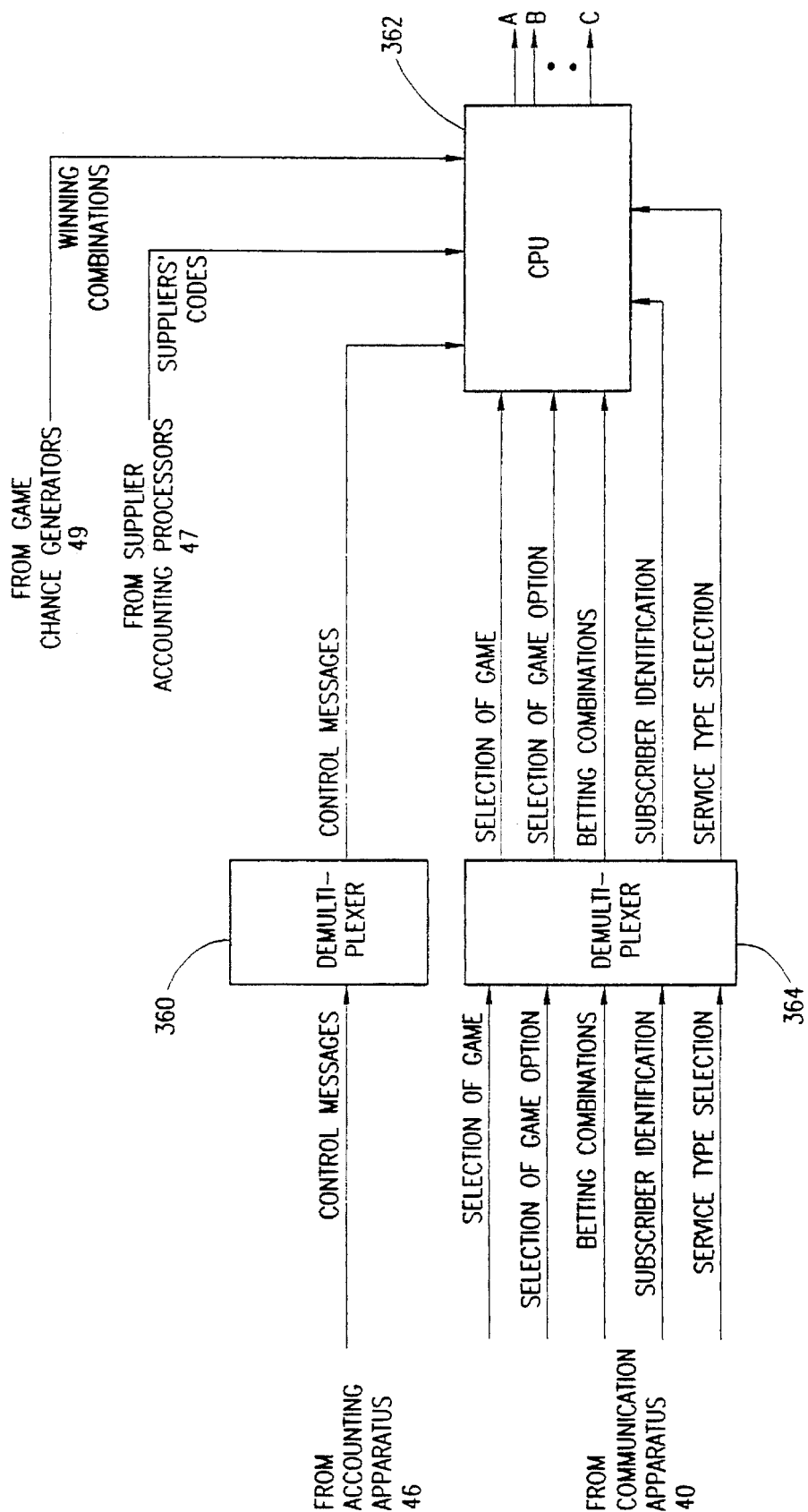
FIGS. 14A and 14B together constitute a simplified block diagram illustration of gaming control circuitry forming part of the apparatus of FIG. 2.
Figure 14B:
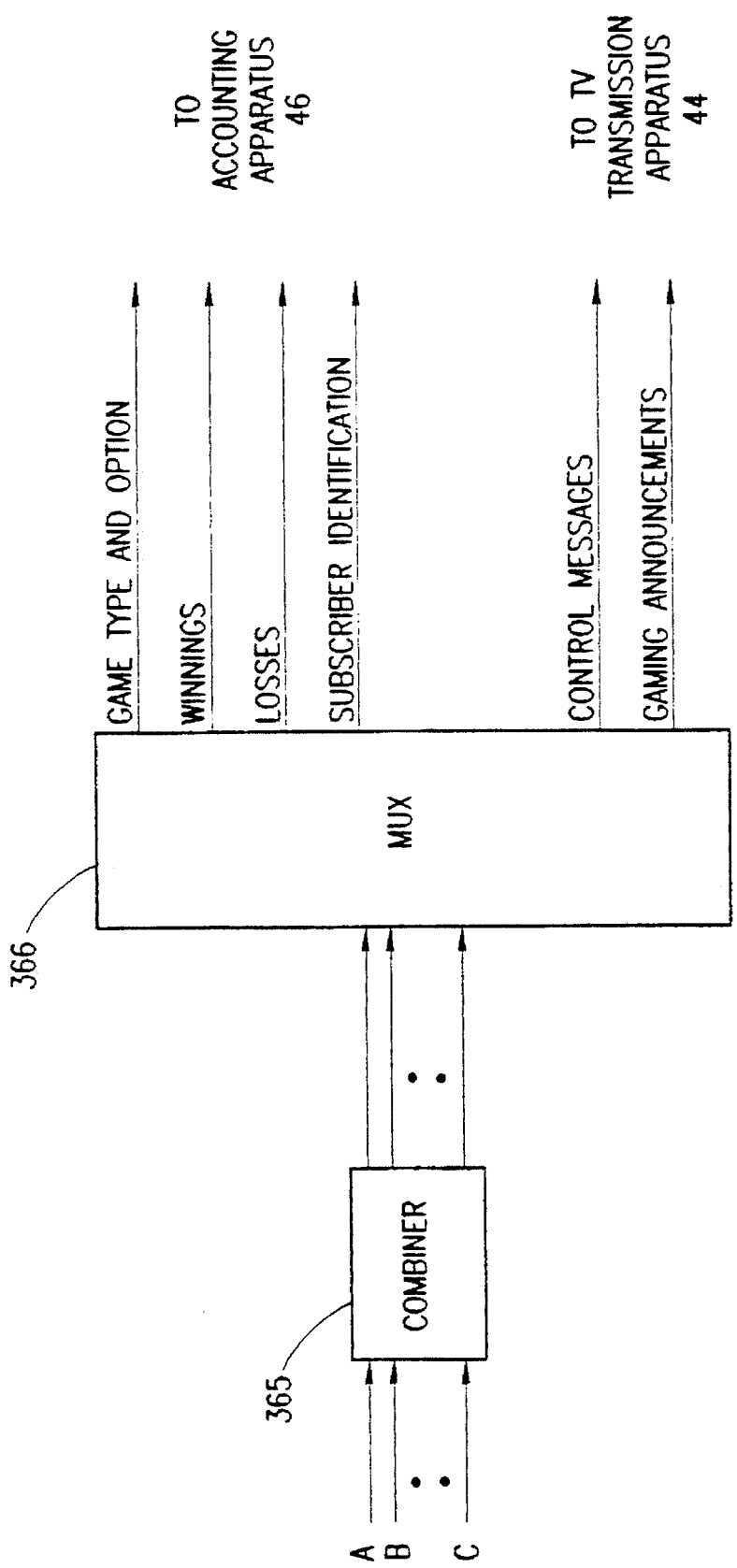

Reference is now made to FIG. 13 which illustrates the communication apparatus 40 forming part of the apparatus of FIG. 2. The communication apparatus 40 includes a demodulator 350 which receives inputs from a plurality of subscriber input units 38. The demodulator 350 preferably provides the following outputs to a decrypter 352:

Gaming credit amount requests
Selection of payment option
Selection of game
Selection of options in a game
Selection of betting combinations
Subscriber identification
Gaming supplier selection
Service type selection The decrypter 352 provides a decrypted output to a demultiplexer 354 which receives control signals from a controller 356 and in accordance therewith preferably provides the following outputs to gaming control circuitry 42 (FIG. 2):

Selection of game
Selection of options in a game
Selection of betting combinations
Subscriber identification
Service type selection Demultiplexer 354 also preferably provides the following outputs to accounting apparatus 46 (FIG. 2):

Gaming credit amount requests
Selection of payment option
Subscriber identification
Gaming supplier selection
Service type selection Reference is now made to FIGS. 14A and 14B which together constitute a simplified block diagram illustration of gaming control circuitry 42 forming part of the apparatus of FIG. 2. The gaming control circuitry 42 comprises a demultiplexer 360 which receives control messages from accounting apparatus 46 (FIG. 2) and which provides corresponding control messages to a CPU 362.

The gaming control circuitry 42 also comprises a demultiplexer 364 which receives the following inputs from communication apparatus 40 and provides corresponding inputs to CPU 362:

Selection of game
Selection of game option
Selection of betting combinations
Subscriber identification
Service type selection CPU 362 also receives supplier codes from suppliers accounting processors 47 and winning combinations from game chance generators 49. CPU 362 provides the following outputs via a combiner 365 and a multiplexer 366 to accounting apparatus 46:

Game type and option
Winnings
Losses
Subscriber identification

CPU 362 also provides the following outputs via combiner 365 and multiplexer 366 to TV transmission apparatus 44 (FIG. 2):

Control messages
Gaming announcements.

Reference is now made to FIGS. 15A and 15B which together constitute a simplified block diagram illustration of accounting apparatus 46 forming part of the apparatus of FIG. 2. The accounting apparatus 46 includes a first demultiplexer 370 which receives the following inputs from gaming control circuitry 42:

Game type and option
Winnings
Losses
Subscriber identification

The accounting apparatus 46 also includes a second demultiplexer 372 which receives the following inputs from communication apparatus 40:

Gaming credit amount request
Selection of payment option
Subscriber identification
Gaming supplier selection
Service type selection The outputs of demultiplexers 370 and 372 are supplied to a CPU 374 which receives general applications data from a memory controller 376 which accesses a memory 378 preferably containing at least the following memory units:

Gaming balance register
Announcements register
Statistics register
Gaming debit register
Gaming credit register
General applications memory The CPU 374 outputs the following information via a combiner 380 to a multiplexer 382 and to memory 378 via controller 376:

Gaming credits & codes
Gaming debits & codes
Gaming balances & codes
Statistical data & codes The CPU also outputs control messages via combiner 380 to multiplexer 382.

The multiplexer 382 provides control messages to gaming control circuitry 42, gaming supplier accounting data to supplier accounting processors 47 and the following outputs to TV transmission apparatus 44:

Statistical data & codes
Accounting announcements
Gaming subscriber accounting data & codes.

Figure 16:
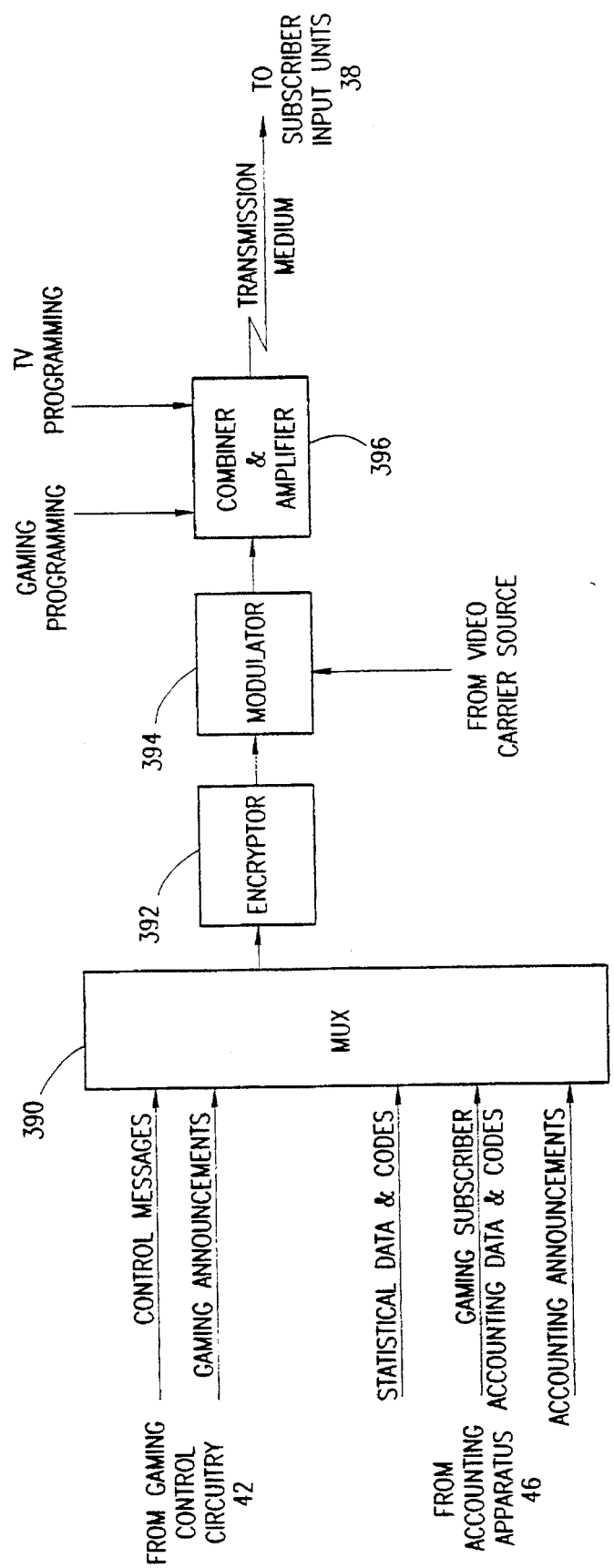
FIG. 16 is a simplified block diagram illustration of transmission apparatus forming part of the apparatus of FIG. 2.

Reference is now made to FIG. 16 which is a simplified block diagram illustration of TV transmission apparatus 44 forming part of the apparatus of FIG. 2. A multiplexer 390, forming part of apparatus 44, receives control messages and gaming announcements from gaming control circuitry 42 and receives the following inputs from accounting apparatus 46:

Statistical data & codes

Accounting announcements
Gaming subscriber accounting data & codes.

Multiplexer 390 provides an output via an encryptor 392 to a modulator 394 which receives a video carrier signal from a video carrier source. The modulated output of modulator 394 is supplied to a combiner & amplifier 396 which receives gaming programming and TV programming inputs from suitable sources and is operative to provide a TV broadcast to subscriber input units 38.

Figure 17A:
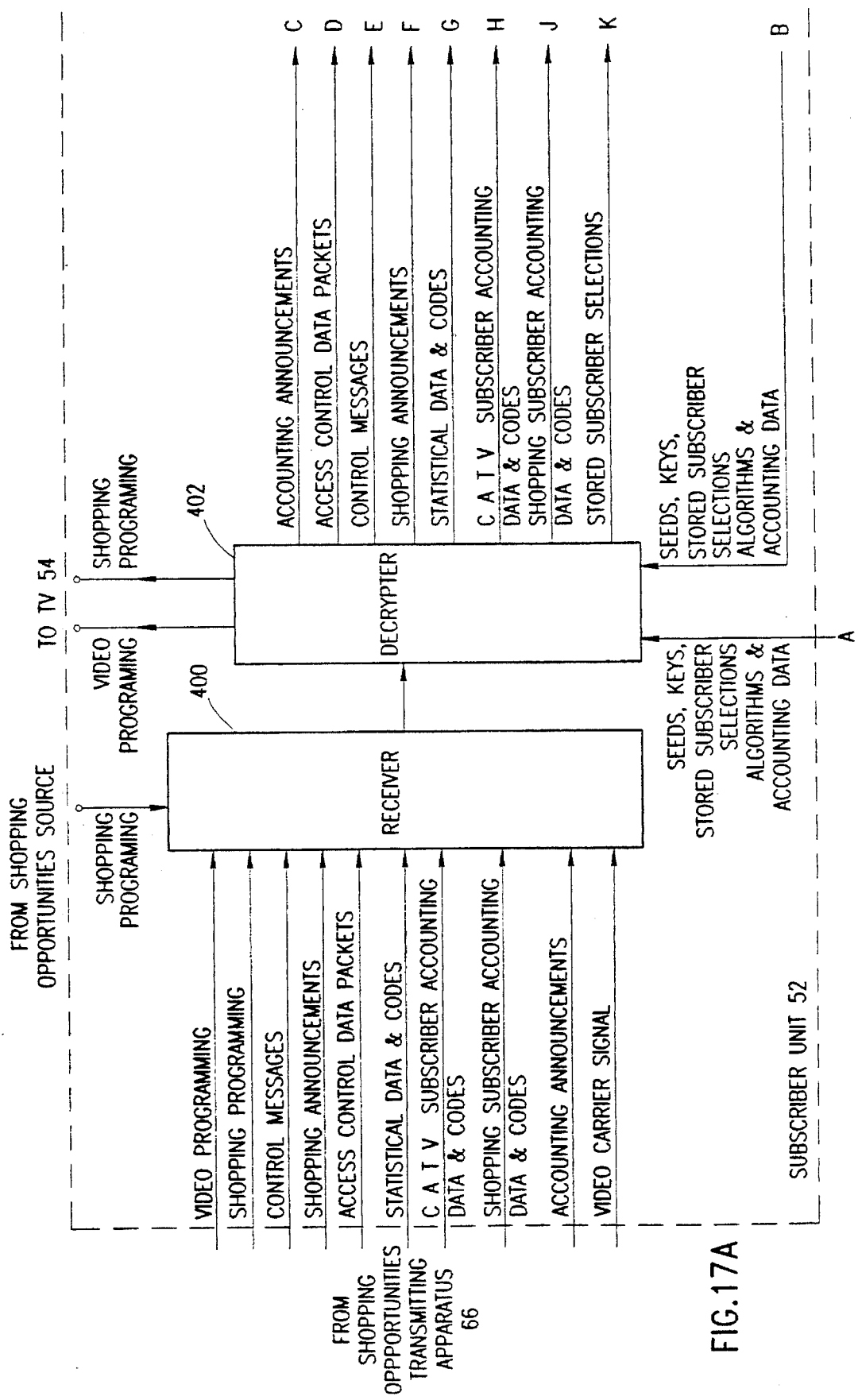
FIGS. 17A, 17B and 17C together constitute a simplified block diagram illustration of part of the apparatus of FIG. 3.
Figure 17B:
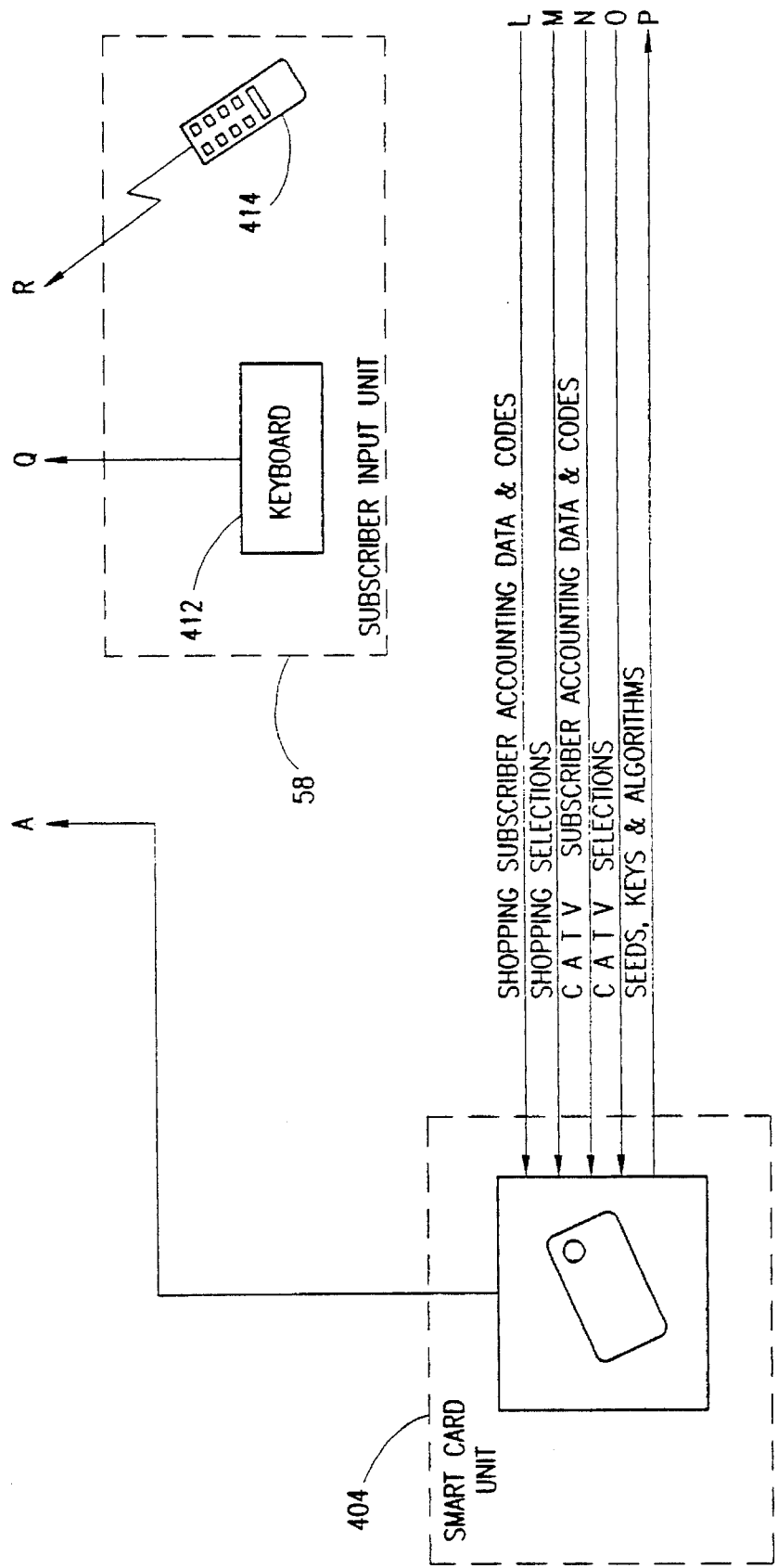
Figure 17C:
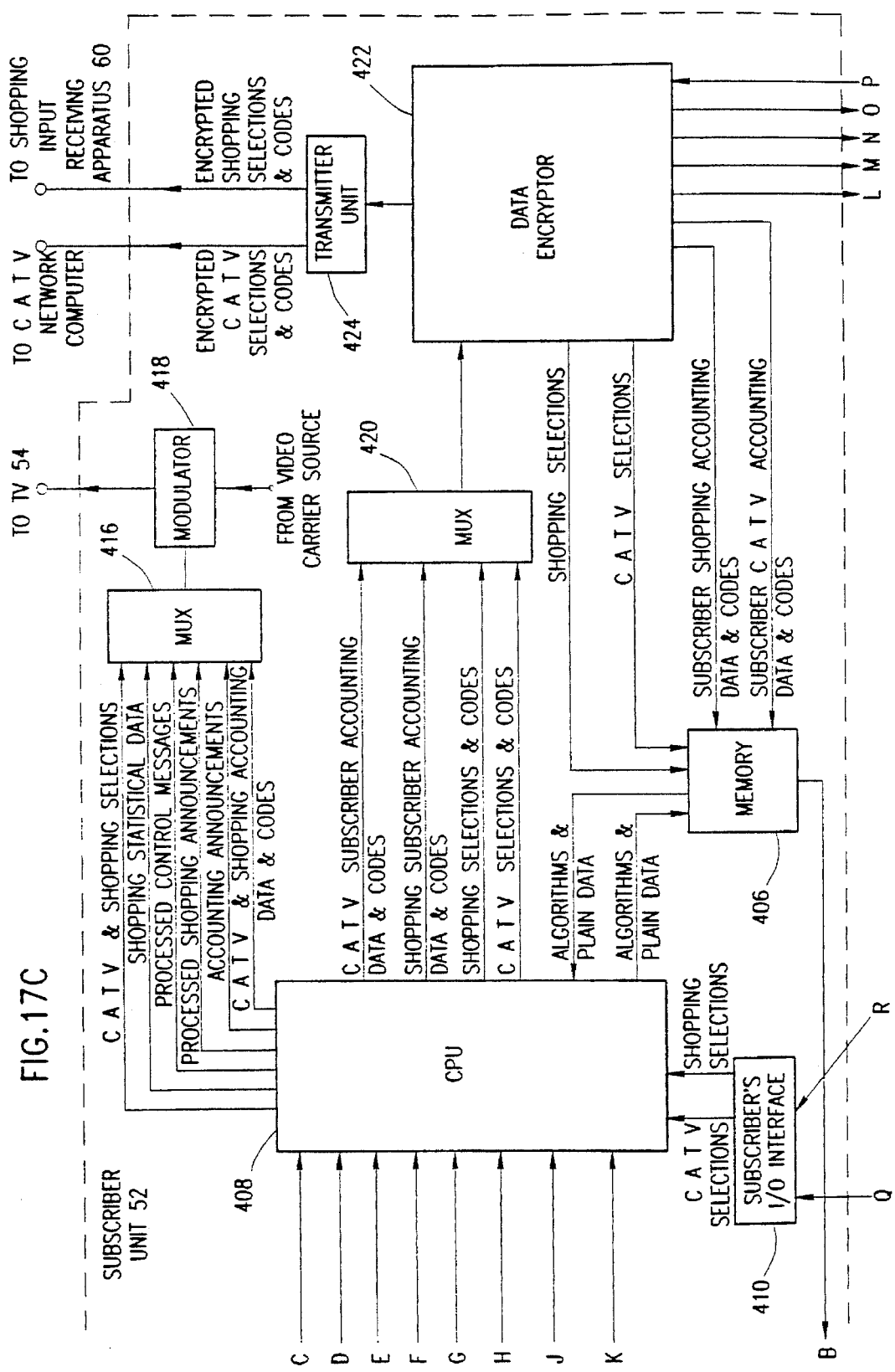

Reference is now made to FIGS. 17A–17C which together illustrate a preferred embodiment of a pay television interface which may be employed as interface unit 56 and subscriber input unit 58, forming part of the apparatus of FIG. 3. Each subscriber receives at interface unit 56 a plurality of different scrambled inputs from transmission apparatus 66. These inputs may include video programming, shopping programming, control messages, shopping announcements, access control data packets, statistical data and codes, pay television subscriber accounting data and codes, shopping subscriber accounting data and codes, accounting announcements, and a video carrier signal on which the above-mentioned inputs are carried.

Preferably the inputs from transmission apparatus 66 are received at a receiver 400 which may perform necessary demodulation and provides an output to a decrypter 402 which decodes the inputs. Alternatively, the inputs may not be scrambled and the decrypter may be eliminated. As a further alternative, only some of the inputs may be scrambled. The receiver 400 may be a conventional receiver useful with encrypted pay television systems.

The decrypter also receives one or more of the following additional inputs: seeds, keys, stored subscriber selections, algorithms and accounting data from a smart card unit 404 or from a memory 406. Most of these additional inputs are employed for decrypting the output of receiver 400 or a portion thereof. Receiver 400 also may receive shopping programs from a shopping opportunities source.

The decrypter provides video programming and shopping programming output signals to a television 54 (FIG. 3) and also provides the following outputs to a CPU 408:

control messages, shopping announcements, access control data packets, statistical data and codes, pay television subscriber accounting data and codes, shopping subscriber accounting data and codes, accounting announcements and stored subscriber selections.

CPU 408 also receives shopping inputs via a subscriber input data interface 410, such as a conventional I/O interface, which may be actuated either by a keyboard 412 connected thereto or remotely by a remote control device 414 which form part of the subscriber input unit 58.

CPU 408 provides the following outputs via a multiplexer 416 and a modulator 418 to television 54 (FIG. 3):

pay television & shopping selections, statistical data, processed control messages, processed shopping announcements, accounting announcements, pay television & shopping accounting data & codes.

CPU 408 also provides the following outputs via a multiplexer 420 and a data encryptor 422:

pay television subscriber accounting data & codes, shopping subscriber accounting data & codes, shopping selections & codes, pay television selections & codes.

Data encryptor 422 receives seeds, keys and algorithms from smart card unit 404 and provides, via a transmitter unit 424, encrypted pay television selections and encrypted shopping selections to the pay television network computer and to shopping input receiving apparatus 60 (FIG. 3) respectively.

The data encryptor 422 preferably also provides the following encrypted outputs to one or both of the memory 406 and the smart card unit 404:

shopping subscriber accounting data and codes, shopping selections, pay television subscriber accounting data and codes and pay television selections.

The smart card unit 404 is preferably operative in accordance with the teachings of applicant's published European Patent 90310131.9. It is appreciated that according to an embodiment of the invention, either the memory 406 or the smart card unit 404 may be eliminated.

Figure 18:
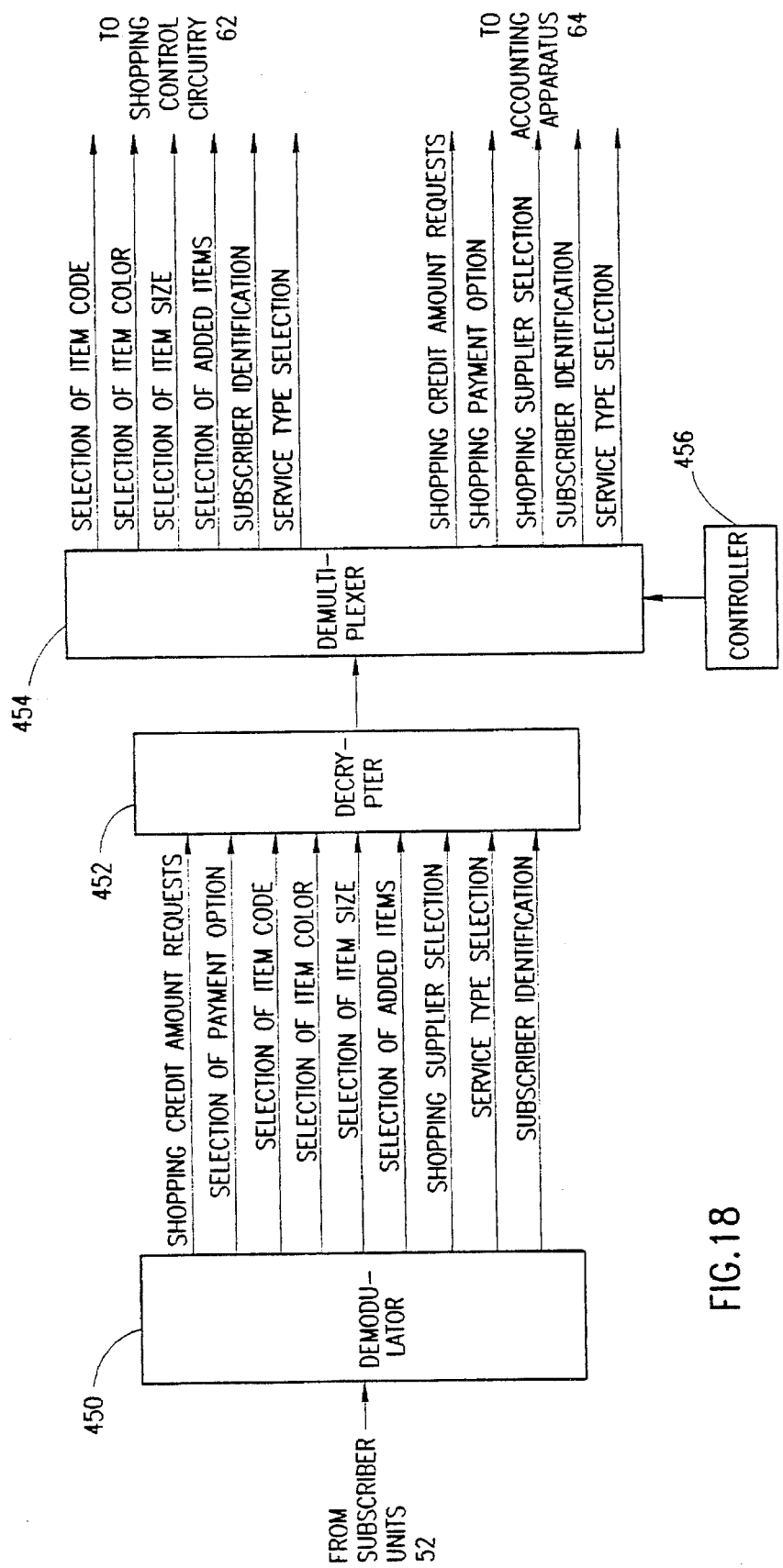
FIG. 18 is a simplified block diagram illustration of shopping input receiving apparatus forming part of the apparatus of FIG. 3.

Reference is now made to FIG. 18 which illustrates the structure and functionality of the shopping input receiving apparatus 60 which forms part of the apparatus of FIG. 3. A demodulator 450, receives and demodulates the following inputs from subscriber units 52 via interfaces 56:

Selection of payment option
Shopping credit amount requests
Selection of item, color, size
Selection of added items
Subscriber identification
Shopping supplier selection
Service type selection Optionally, the shopping input receiving apparatus 60 may also receive pay television programming selections and other pay television related subscriber selections.

In accordance with an embodiment of the invention, the inputs to demodulator 450 are received in encrypted form. In such a case, a suitable decrypter 452 is provided for receiving the output of demodulator 450.

The output of decrypter 452, or, in the absence of a decrypter, the output of demodulator 450 is preferably supplied to a demultiplexer 454, which separates the various inputs into inputs destined for shopping control circuitry 62 and inputs destined for accounting apparatus 64. Demultiplexer 454 assigns inputs in accordance with instructions received from a controller 456.

The following inputs are directed to accounting apparatus 64:

shopping credit amount requests;
shopping payment option;
shopping supplier selection;
subscriber identification;
service type selection.

The following inputs are directed to-shopping control circuitry 62:

selection of item, color, size
selection of added items;
subscriber identification;
service type selection.

It is noted that preferably all of the inputs to demodulator 450, as well as other information employed in the system, are normally in coded form. Diagrams of a typical code configuration appear in FIGS. 23–26, which are self explanatory.

Figure 19A:
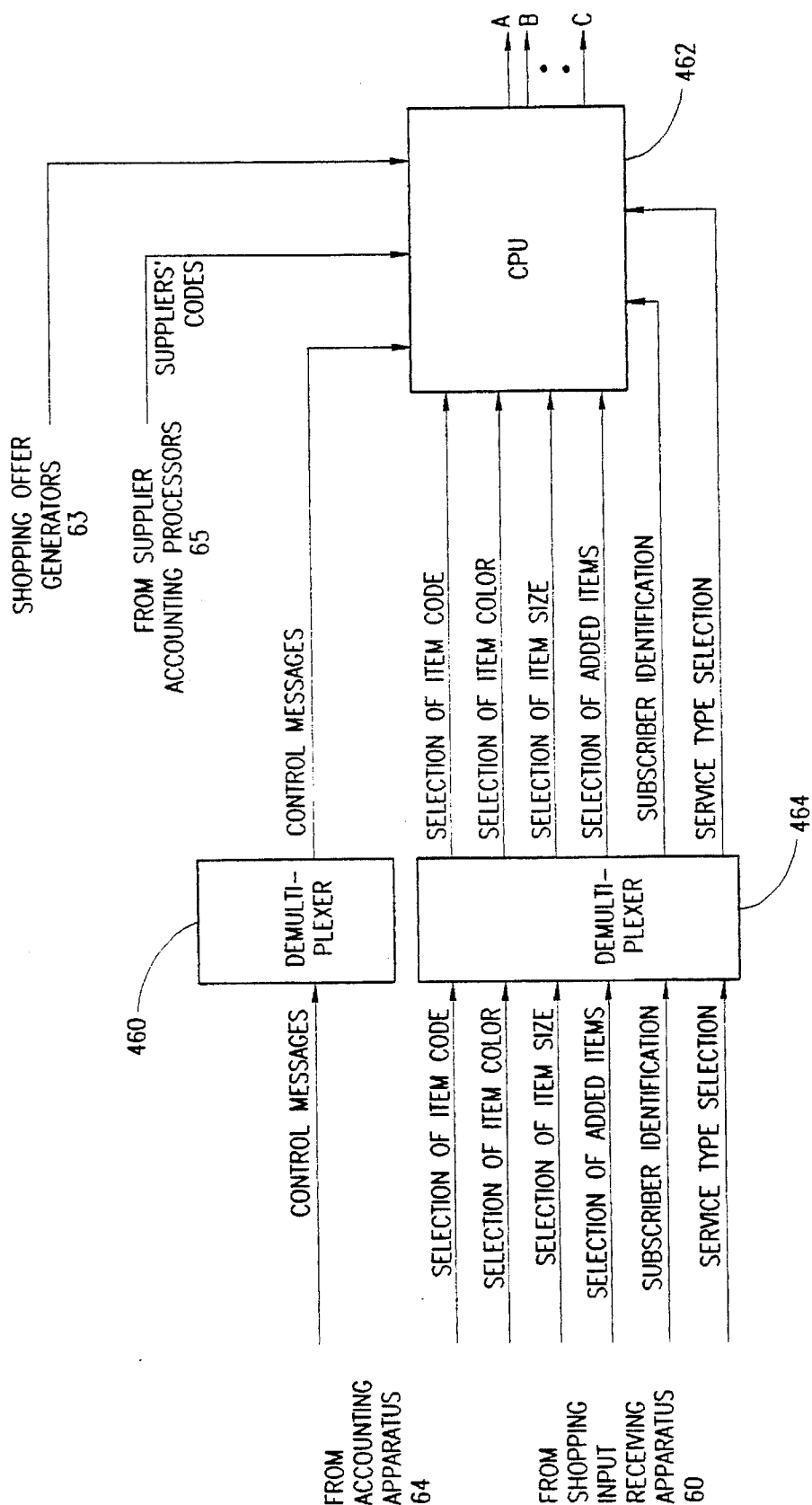
FIGS. 19A and 19B together constitute a simplified block diagram illustration of shopping control circuitry forming part of the apparatus of FIG. 1.
Figure 19B:
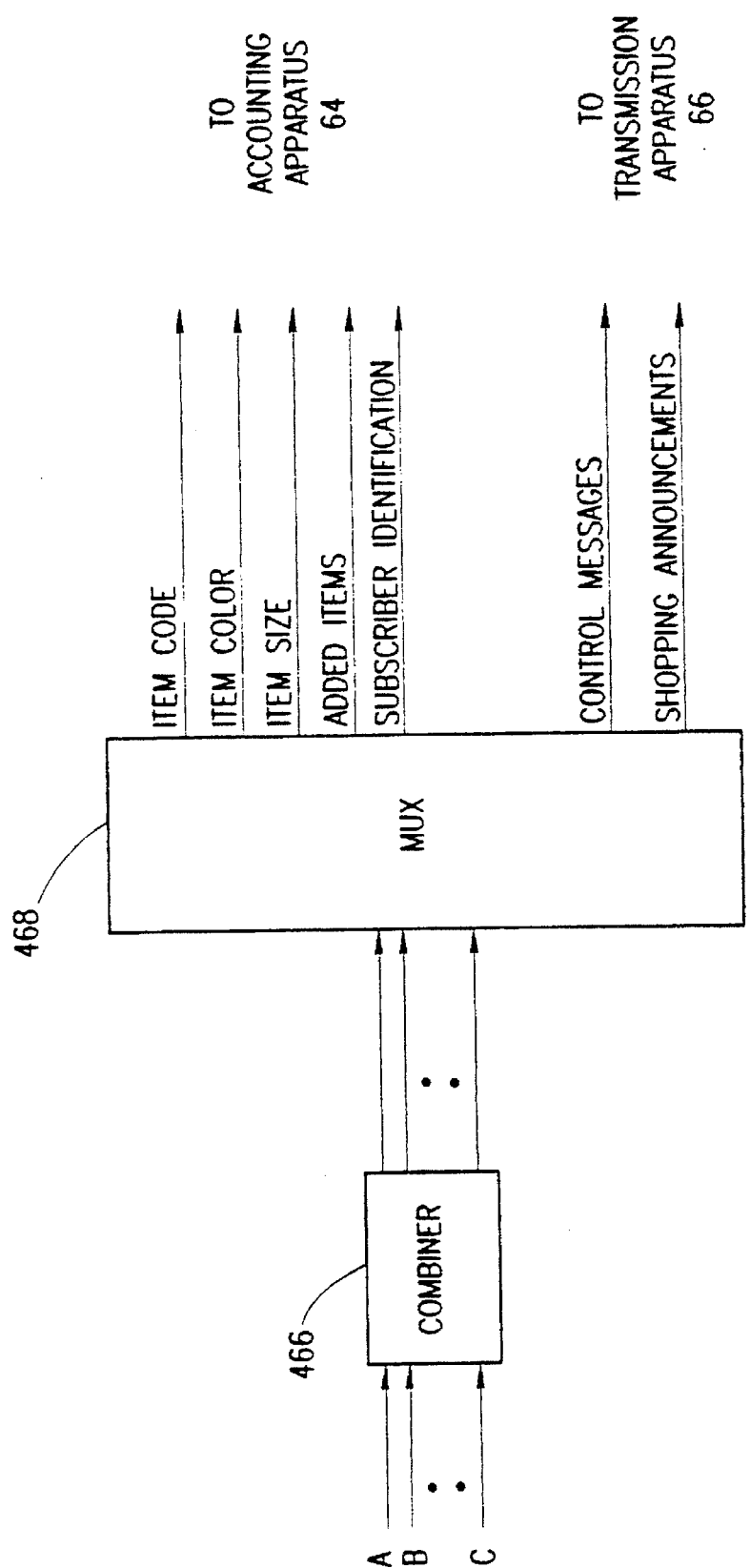

Reference is now made to FIGS. 19A and 19B which together illustrate shopping control circuitry 62 of FIG. 3. The shopping control circuitry 62 of FIG. 3 comprises a demultiplexer which receives control messages from accounting apparatus 64 (FIG. 3) and provides demultiplexed control messages to a CPU 462.

A second demultiplexer 464 receives the following inputs from shopping input receiving apparatus 60:

selection of item, color, size
selection of added items;
subscriber identification;
service type selection.

The demultiplexer 464 separates the inputs and directs them to CPU 462. CPU 462 processes these inputs, together with inputs received from shopping offer generators 63 (FIG. 3), which determine shopping availability, and from supplier accounting processors 65 (FIG. 3) which provide suppliers' codes, in accordance with the functionality set forth in a flow chart appearing in FIGS. 30A–30C, which will be described hereinbelow.

The outputs of CPU 462 are typically combined in a combiner 466 which outputs to a multiplexer 468. Multiplexer 468 provides the following outputs to accounting apparatus 64:

item, color, size;
added items;
subscriber identification;

Multiplexer 468 also provides control messages and shopping announcements to transmission apparatus 66 for transmission to the appropriate subscribers.

Reference is now made to FIGS. 20A and 20B, which together illustrate the accounting apparatus 64 of FIG. 3.

A first demultiplexer 480 receives the following inputs from shopping control circuitry 62:

item, color, size;
added items;
subscriber identification;

A second demultiplexer 482 receives the following inputs from the pay television network computer:

pay television credit amount requests;
subscriber identification;
pay television program code;
pay television supplier code;
Service type identification;
pay television payment option, A third demultiplexer 484 receives the following inputs from shopping input receiving apparatus 60:

shopping credit amount requests;
shopping payment option;
shopping supplier code;
subscriber identification;
service type identification.

The outputs of demultiplexers 480, 482 and 484 are all supplied to a CPU 486, whose operational functionality will be described hereinbelow in connection with the flow chart appearing in FIGS. 30A–30C.

CPU 486 provides the following outputs to a combiner 488:

pay television credits & codes;
pay television debits & codes;
pay television balances & codes;
Shopping credits & codes
Shopping debits & codes;
Shopping balances & codes;
Statistical data & codes;
Control messages.

The combiner 488 combines these outputs and supplies them in combined form to a multiplexer 490 which provides the following outputs on a subscriber-by-subscriber basis:
Control messages to shopping control circuitry 62;
The following outputs to transmission apparatus 66:

statistical data and codes;
accounting announcements;
pay television subscriber accounting data & codes;
shopping subscriber accounting data & codes.

The following outputs to supplier accounting processors (FIG. 3):

pay television supplier accounting data;
shopping supplier accounting data.

Combiner 488 also supplies accounting and statistical data and codes to a memory controller 492 which also receives general applications data from CPU 486 and updates a memory bank 494 including the following registers:

statistics register;
announcements register;
general applications resisters;
shopping debit register;
shopping credit register;
shopping balance register;
pay television debit register;
pay television credit register;
pay television balance register.

Memory bank 494 may also be accessed by CPU 486 via memory controller 492.

Reference is now made to FIG. 21 which illustrates transmission apparatus 66 of FIG. 3. The transmission apparatus comprises a multiplexer 500 which receives access control data packets from the pay television network computer as well as control messages and shopping announcements from shopping control circuitry 62. The multiplexer also receives the following inputs from the accounting apparatus 64:

Statistical data and codes;
Accounting announcements;
pay television subscriber accounting data & codes;
Shopping subscriber accounting data & codes.

The output of multiplexer 500 is supplied via an encryptor 502 to a modulator 504, which operates on a video carrier signal received from a video carrier source and provides a modulated output to a combiner and amplifier unit 506 which receives shopping and video programming from appropriate sources and provides a video output to the subscriber units 52.

Figure 22A:
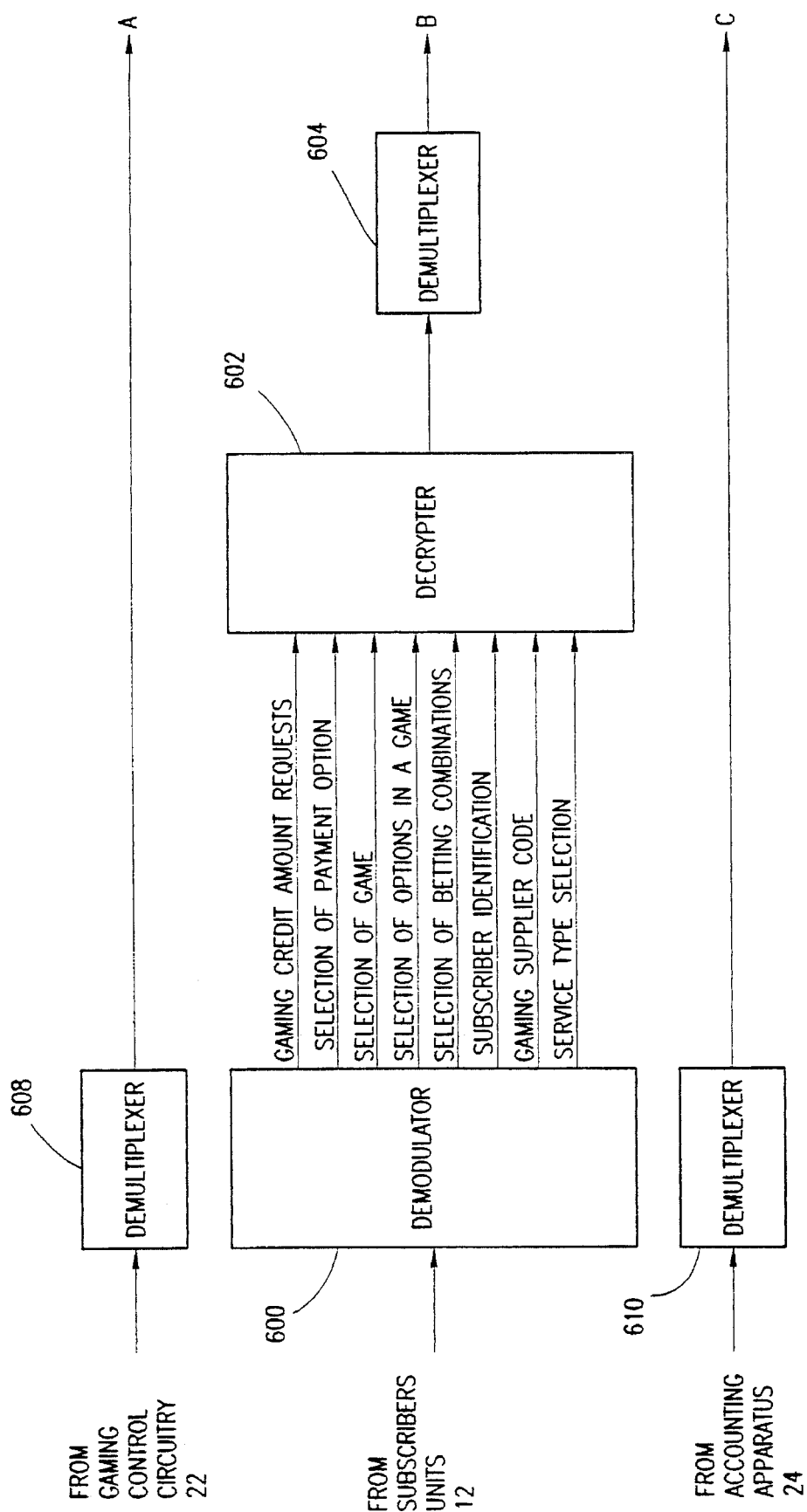
FIGS. 22A and 22B are simplified block diagram illustrations of apparatus for limiting gaming activity forming part of the apparatus of FIG. 5.
Figure 22B:
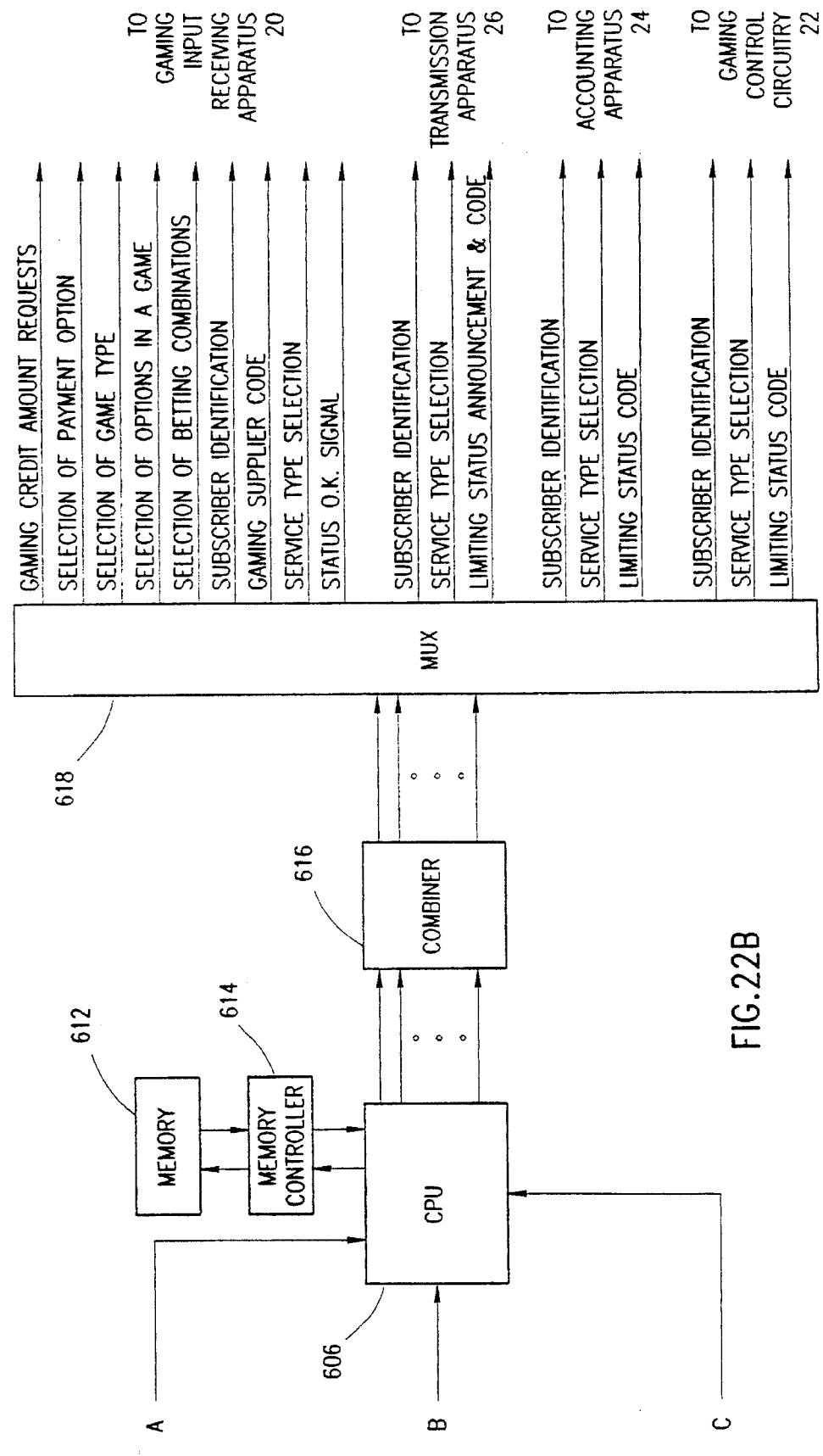

Reference is now made to FIGS. 22A and 22B which illustrate the structure and functionality of apparatus for limiting gaming activity 100 which forms part of the apparatus of FIG. 5. A demodulator 600, receives and demodulates the following inputs from subscriber units 12 via interfaces 16:

Selection of payment option
Gaming credit amount requests
Selection of game
Selection of options in game
Selection of betting combinations
Subscriber identification
Gaming supplier code
Service type selection Optionally, apparatus 100 may also receive pay television programming selections and other pay television related subscriber selections.

In accordance with an embodiment of the invention, the inputs to demodulator 600 are received in encrypted form. In such a case, a suitable decrypter 602 is provided for receiving the output of demodulator 600.

The output of decrypter 602, or, in the absence of a decrypter, the output of demodulator 600 is preferably supplied to a demultiplexer 604, which supplies the various inputs to a CPU 606. The CPU 606 also receives inputs from gaming control circuitry 22 via a demultiplexer 608 and from accounting apparatus 24 via a demultiplexer 610.

CPU 606 communicates with a memory 612 via a memory controller 614 and provides limitations on gaming activity. Outputs from the CPU 606 are provided via a combiner 616 and a multiplexer 618 as follows:

To gaming input receiving apparatus 20:

Selection of payment option
Gaming credit amount requests
Selection of game
Selection of options in game
Selection of betting combinations
Subscriber identification
Gaming supplier code
Service type selection
Status OK signal.

To transmission apparatus 26:

Subscriber identification
Service type selection
Limiting status announcement and code To accounting apparatus 24:

Subscriber identification
Service type selection
Limiting status code

To gaming control circuitry 22:

Subscriber identification
Service type selection
Limiting status code

Reference is now made to FIGS. 23–26 which together constitute an illustration of the configuration of typical codes for information utilized in the systems of the present invention. In order to maintain separate accounts for different services, such as pay television programs, shopping and gaming, identification codes are employed to distinguish between different services. Identification codes are also employed to distinguish between various suppliers, subscribers, etc.

In a preferred embodiment of the invention each identification code is arranged as a group of digits that may be enciphered and transmitted, in either an analog or a digital form, compressed or non-compressed, as part of a communication signal. At a receiving end the codes are stripped from the signal, decrypted and converted to analog form as necessary, and processed.

In FIG. 23 strings of credit identification codes are illustrated. In each of the credit identification codes, the first digit, representing an accounting code, has a value of "1" which identifies the accounting code as a credit code. The next digit is a service type code which identifies the service for which the credit is used. "1" denotes credit for pay television, "2" denotes credit for gaming and "3" denotes credit for shopping.

Additional services may be added with other identifying digits.

The next two digits constitute the supplier identification code. A supplier is identified by a two-digit supplier number so that different suppliers can provide the same type of service (pay television, gaming, shopping, etc.) and even the same offers (programs, games, merchandise, etc.).

Credit for pay television and for gaming can be authorized per specific program and per specific game. Therefore, two additional digits are preserved for a program number identifier and game identification code respectively. In a preferred embodiment of the invention, credit for shopping is given without restriction to specific items.

The next six digits constitute a subscriber identification code which relates the credit to a specific subscriber.

Several payment options are possible, as indicated by a two-digit payment identification code which follows the subscriber identification code. The first digit identifies the possible choice of payment options which could be, for example, monthly payment or payment by installments.

In a preferred embodiment of the invention, the second digit is used to enable selection of one of a number of different tariffs applicable to various types of activities and activity timings. Thus, for example, a high rate tariff could be used for data transmission shortly before a game or auction starts, a medium rate tariff for transmission of data an hour or more before the game starts, and low rate tariff for subscribers who have entered their selections a day or more before the beginning of the game or the auction. The opportunity to apply different tariffs in the context of the payment option code, enables the game or auction suppliers to regulate the flow of data and to improve service to the customers.

The next group of digits identifies the amount of credit. In a preferred embodiment of the invention various credit levels can be selected for various service types. Therefore, the number of digits available for the credit amount code can vary for different services. The last group of digits constitutes the credit destination. Thus crediting the smart card has a different code than crediting a credit card account.

Reference is now made to FIG. 24 which illustrates debit identification codes according to a preferred embodiment of the invention. Here, the first four digits have the same purpose as in the credit identification codes illustrated in FIG. 23. "2" identifies the accounting signal as a debit signal. The next two digits are used to specify the program number, game identification number or item identification number in the pay television, gaming or shopping debit identification codes respectively.

In a shopping debit identification code additional digits are provided to specify the merchandise of interest. In a preferred embodiment of the invention, two digits are allocated to item color, five digits are allocated to item size, and four additional digits are used to denote ancillary items which are related to an item ordered (for example colored ribbons that might come with a woman's dress).

The last four groups of digits may be identical to those appearing in the credit identification codes of FIG. 23.

FIG. 25 illustrates balance identification codes which form part of a monetary balance signal which may be communicated between transmission apparatus, such as transmission apparatus 26 (FIG. 1) and a subscriber unit, such as subscriber unit 12 (FIG. 1). The first four digits may have the same purpose as those of the credit and debit identification codes in FIGS. 23 and 24 respectively.

The digit "3" in the first group identifies the accounting signal as a balance signal. The last four groups of digits may have a similar structure and purpose as in the credit and debit identification codes, other than the amount code, which represents the amount of the balance.

Figure 26:
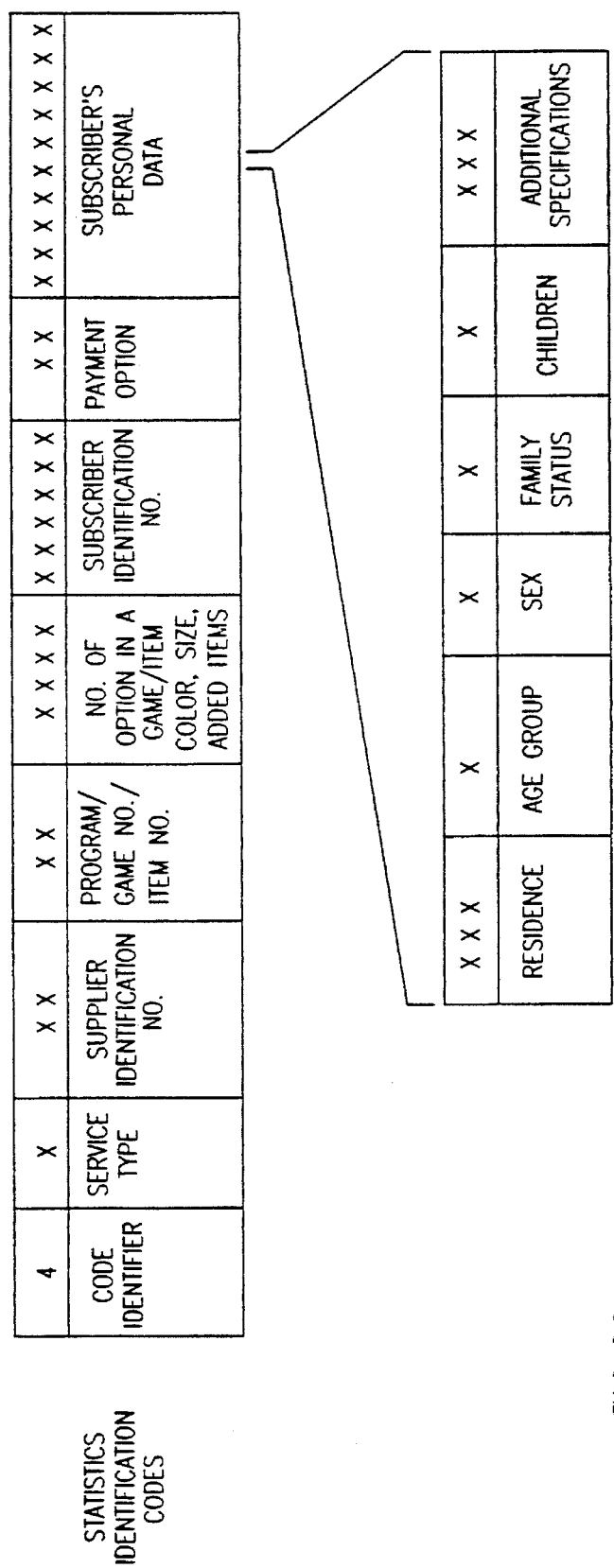

FIG. 26 illustrates a statistics identification code. In a preferred embodiment of the invention the statistics code forms part of a statistics signal that is transmitted by transmission apparatus, such as transmission apparatus 26 (FIG. 1) to a subscriber unit, such as subscriber unit 12 (FIG. 1) in order to assist subscribers in the selection of possible winning numbers or as an inducement to encourage them to purchase specific merchandise.

In a preferred embodiment of the invention the first digit of the statistics code, which has the value of "4", identifies the signal as a statistics signal. The next digit identifies the service for which statistics are given. The following two digits form the supplier identification code. Two additional digits are used to specify the program, the game, or the item according to the service type. Four additional digits are used to specify either the option in a game or certain shopping specifications such as item color, item size or ancillary items that are added to the main item.

The next six digits are used for the subscriber identification number and the following two digits are used for the payment option code as described hereinabove in connection with the credit identification codes.

The last group of ten digits constitutes the subscriber personal data code. In a preferred embodiment of the invention this code comprises three digits for the residence code, one digit for the age group code, one digit each for sex, family status and number of children respectively, and three last digits for specific additional information such as personal preferences.

Figure 27A:
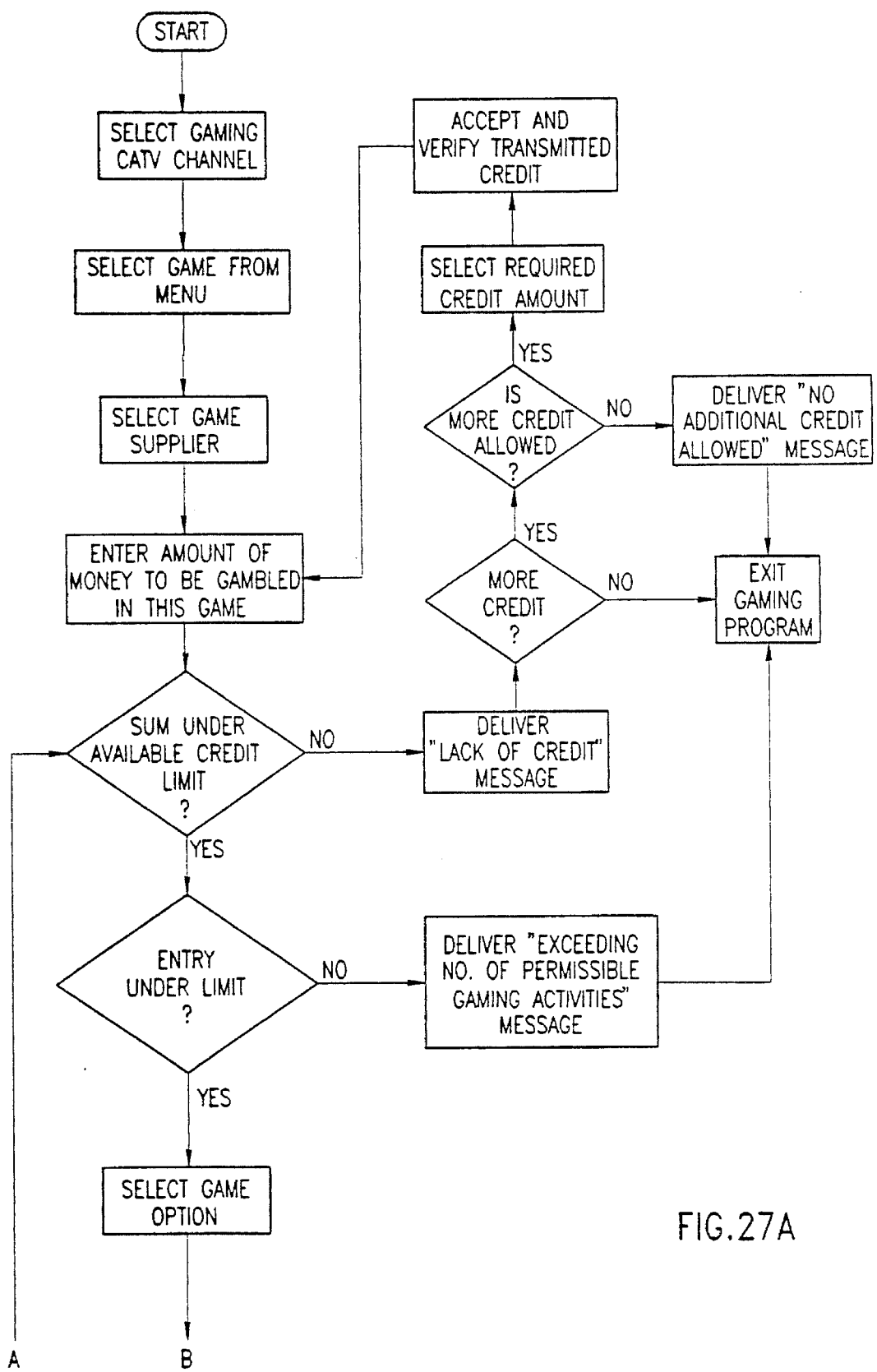
FIGS. 27A, 27B and 27C together constitute a flow chart illustrating the operation of the gaming apparatus of FIGS. 1 and 2.
Figure 27B:
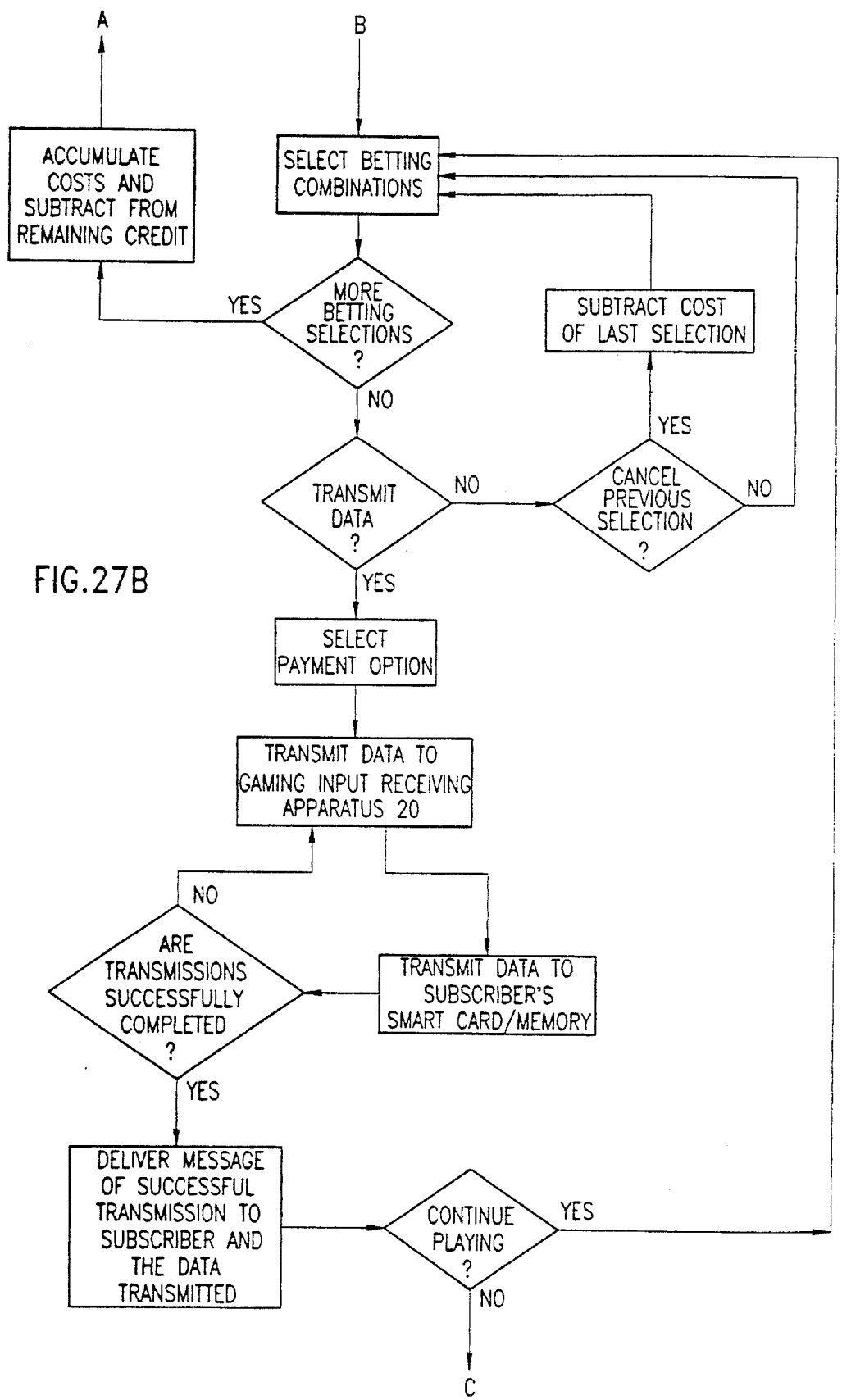
Figure 27C:
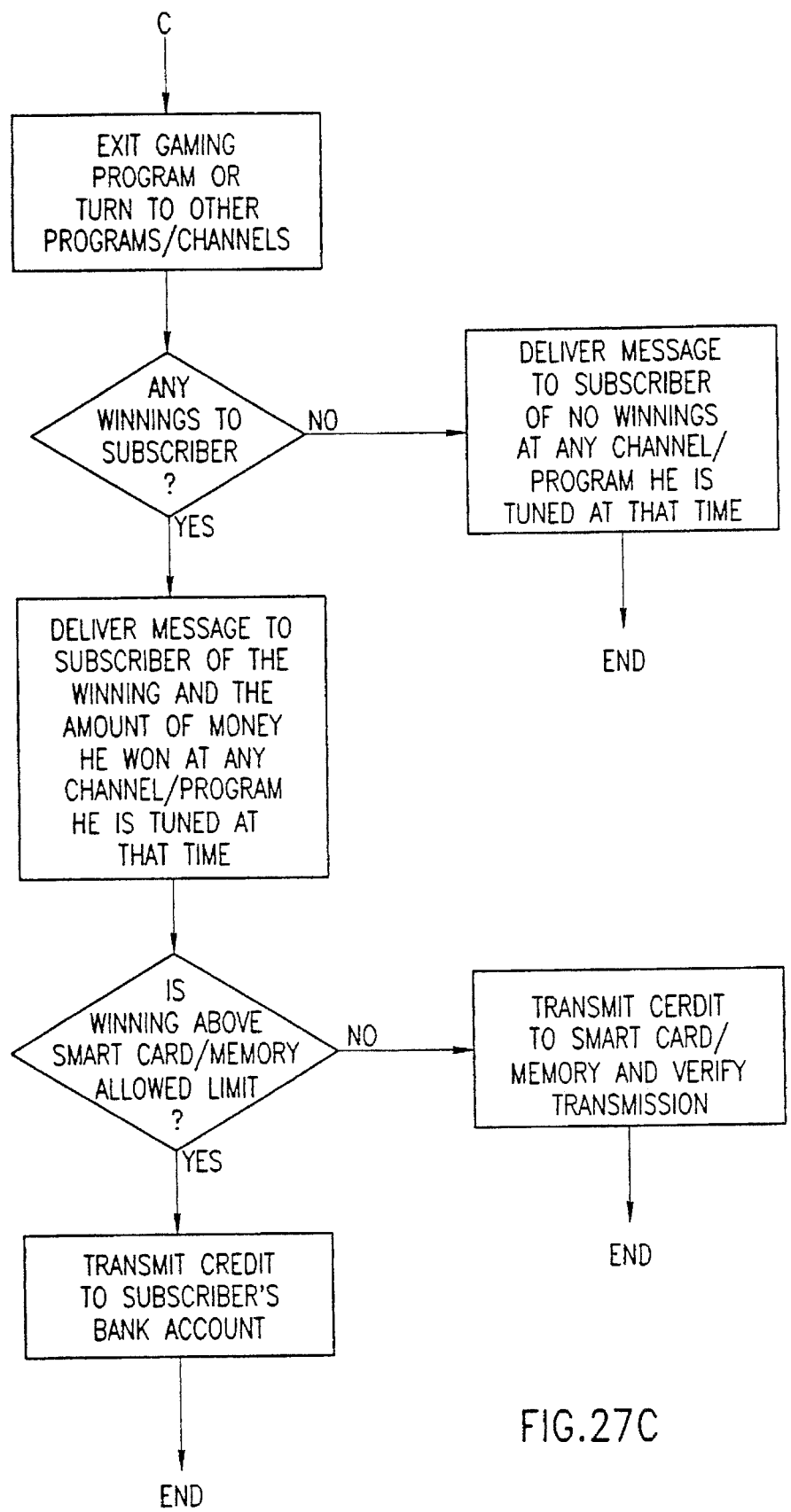

Reference is now made to FIGS. 27A–27C which together constitute a flowchart that describes operations in a gaming system in accordance with FIG. 1.

To start, a subscriber who wishes to participate in a game is requested to make the following sequential selections:

The gaming pay television channel;
A game from a menu;
A supplier from a menu;
The sum of money to be gambled.

If the sum of money is under an allowed credit limit, the system checks if the number of gambling activities is under a maximum limit.

The credit limit and number of gambling activities limit may be carried out by the apparatus of FIGS. 22A and 22B and is intended to prevent gambling addiction by limiting available credit and the number of times a subscriber is allowed to play per unit of time, such as per day or per month.

If the subscriber lacks sufficient credit to cover the amount he chooses to gamble, the system delivers a lack of credit message. Then the subscriber is asked if he desires more credit. If the answer is "No" the system exits the gaming program. If the answer is "Yes" the system checks if he is entitled to more credit. If he is not allowed to have more credit the system delivers a "no additional credit allowed" message and exits the gaming program.

If the subscriber is authorized to obtain additional credit he is requested to select the required credit amount. The menu does not allow the subscriber to request credits above his entitlements. After the selection of required credit the subscriber approves the credit selection and a request for credit is transmitted. The subscriber then accepts the credit and verifies the reception of the transmitted credit.

Once the subscriber has additional credit to cover his gambling request, he is transferred back to the menu in which he is requested to enter the amount of money he wishes to gamble in this game.

It is noted however that the request of credit can be effected by various means such as a phone call to the gaming credit administrator, which may be a person or an interactive computer system. In such a case the subscriber only receives a message on the screen urging him to make a phone call to the credit administrator and only the credit signal will be sent via the pay television network. Another possibility is that the credit will be updated automatically when it approaches a minimum sum. In that case, the above described limiting procedure may be omitted.

Returning now to the test of number of entries, if the number of times the subscriber has gambled is less than the limit, the subscriber is permitted to select a game option. If the limit is exceeded, the system provides a message to the subscriber announcing that he has exceeded the permitted number of gambling activities and exits the gaming program.

Figure 33:
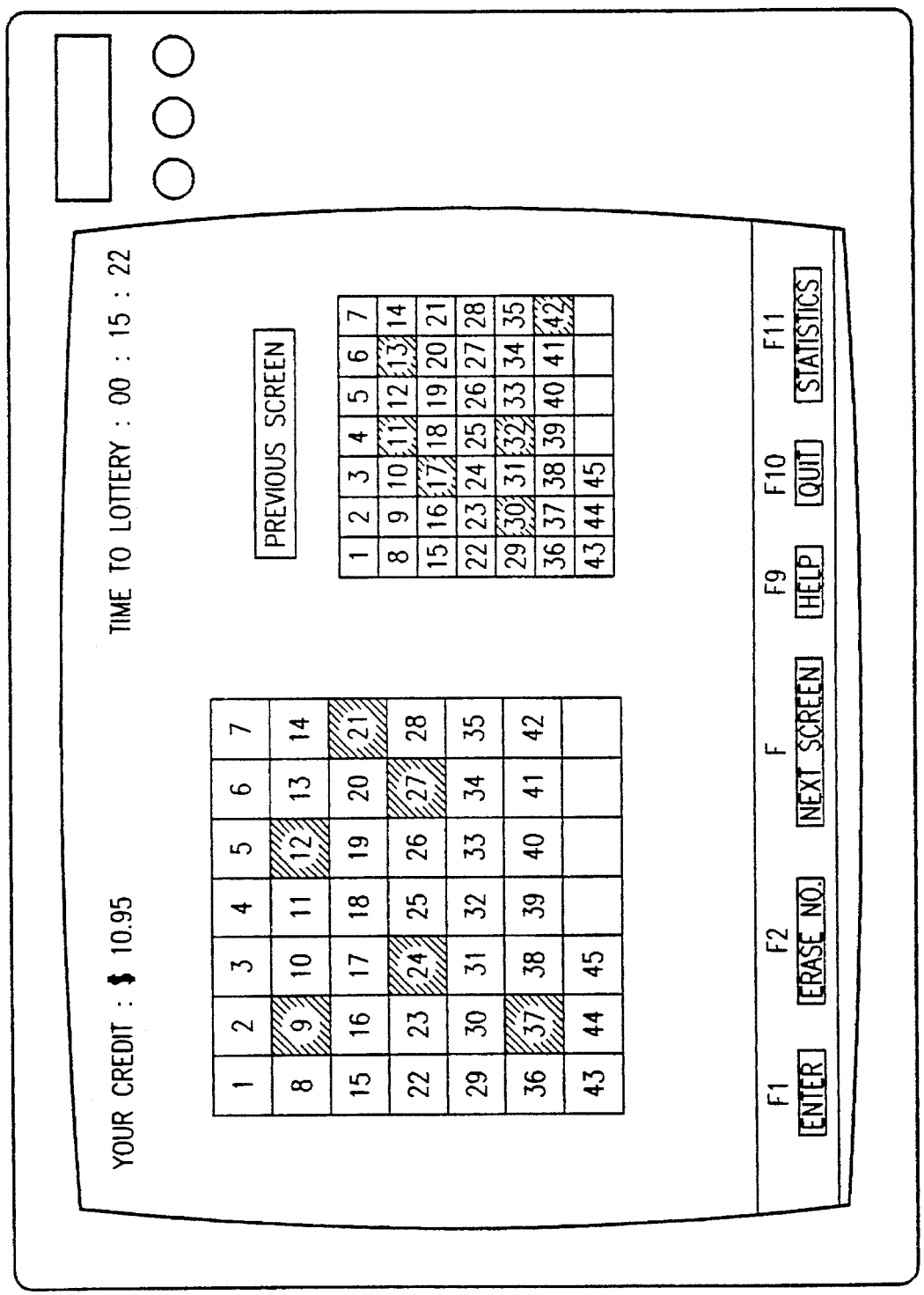

After selection of the game option the subscriber is presented with a screen, such as the screen appearing in FIG. 33 and is requested to select his betting combinations. At the end of each sequence of selections the subscriber is asked if he wishes to make more selections. If the answer is "Yes" the costs of the successive gambling activities are accumulated and subtracted from the remaining credit. The system then returns to the test in which it checks if the sum is under the available credit and proceeds accordingly.

It is noted that the screen of FIG. 33 includes a display of "Time to Lottery" or the equivalent, which continuously indicates to the subscriber, the amount of time remaining for betting before the game begins.

When the subscriber completes his gambling selections he is asked whether he wishes to transmit the data. If the answer is "No" the subscriber is further asked if he wishes to cancel his previous selection. If the answer is "No" the subscriber is transferred back to the selection of betting combinations menu. If the answer is "Yes" the system cancels the last selection and subtracts the cost of the last selection. Then, it again transfers the subscriber back to the selection of betting combinations menu.

The possibility of elimination of previous selections enables corrections of data entered by the subscriber in case he either changes his mind or makes errors during the data entry.

If the subscriber approves the transmission of data he is then requested to select the payment option. Available payment options are described hereinbelow with reference to FIG. 28.

After selection of the payment option the data entered by the subscriber is transmitted to gaming input receiving apparatus 20.

In a preferred embodiment of the invention, the same data is transmitted to the subscriber smart card or to the internal memory of the pay television interface unit 16.

The system then checks if the transmissions were successfully completed. If not, the system repeats the transmissions until all data is successfully transferred. Then, the system delivers an O.K. message to inform the subscriber of the communication result, and displays the transmitted data on the television screen for reference, after which the subscriber is asked if he wishes to continue gambling.

At this point, if the subscriber wishes to proceed with more gambling, the entire loop is repeated starting with the menu of selections of betting combinations. Otherwise, the system exits the gaming program or turns to other programs or channels.

At the end of the game, if there are no winnings to the subscriber, the system informs the subscriber of the game results on whatever channel he is currently watching. If the subscriber has won in the game, the system delivers a message of the winning to the subscriber on whatever channel he is currently watching, and checks if the winning is above an instant distribution limit. If the prize is under this limit, the amount is transmitted to the smart card or to the internal memory of the pay television interface unit 16. If the prize is above the limit the credit is transmitted to the subscriber bank account or credit card account.

Figure 28:
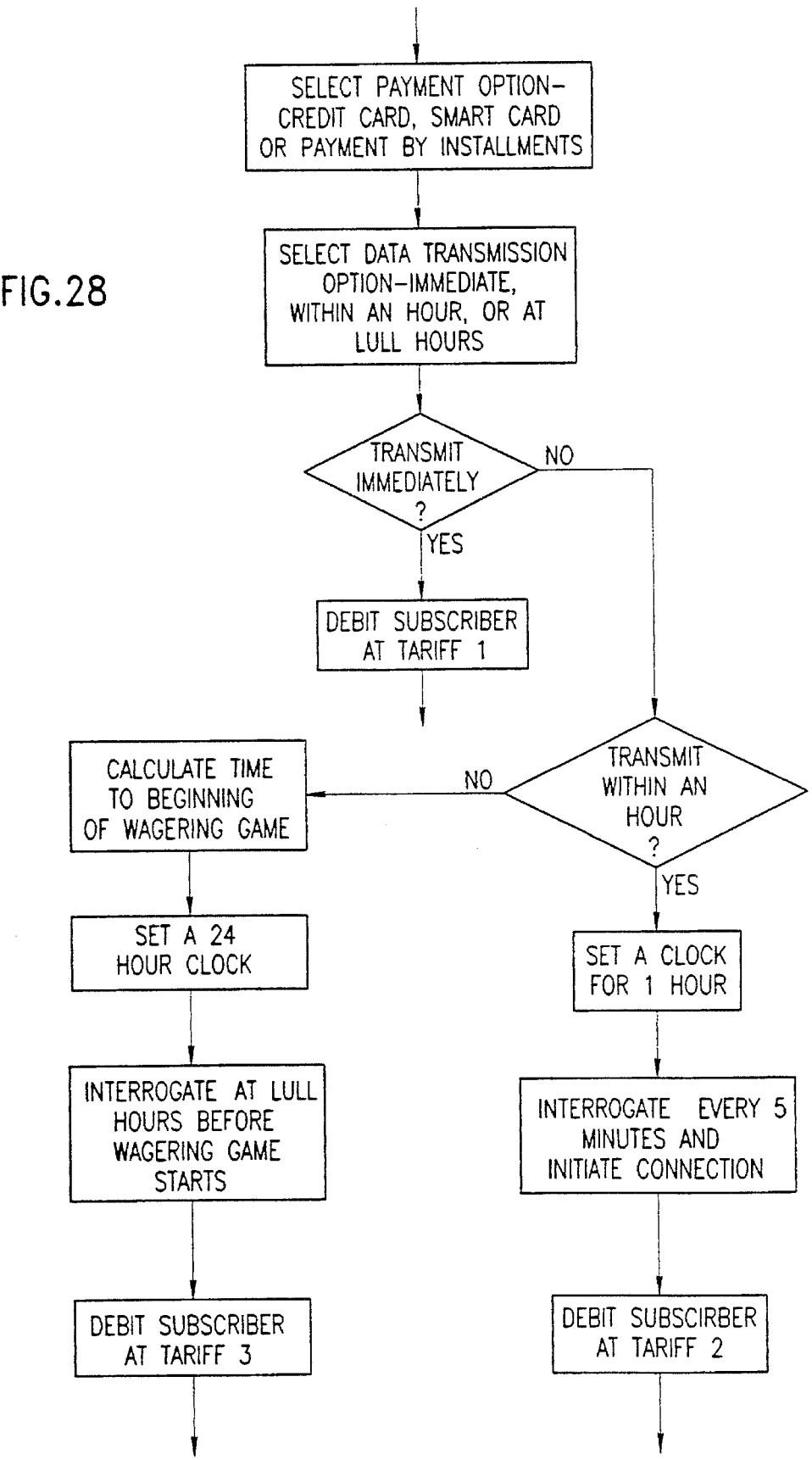
FIG. 28 is a flow chart illustrating selection of the payment option in the apparatus of FIGS. 1–3.

Reference is now made to FIG. 28 which constitutes a flow chart that describes the available choices and operations in the selection of the payment option procedure.

When the subscriber enters the menu for selection of payment option, he is required to select one of the available payment modes, which are typically credit card, smart card and payment by installments. Then the subscriber is required to select one of the available data transmission options, typically immediate transmission, transmission within an hour, and transmission at off-peak hours.

If the subscriber chooses to transmit data immediately the subscriber is debited at the highest rate—tariff 1. If, however he prefers to transmit the data within an hour, the system sets a one-hour clock and then interrogates the gaming input receiving apparatus 20 every five minutes to initiate connection. When communication is established by the gaming input receiving apparatus, at a time convenient with respect to its workload, the data is transferred and the subscriber is debited at a medium rate—tariff 2.

If the gambling is to begin in a day or more, the subscriber may choose to transmit the data at off-peak hours. In that case the system calculates the time left to the beginning of the selected game, sets a 24 hour clock, and interrogates the gaming input receiving apparatus 20 at off-peak times which might be, for example, late at night or early in the morning. The subscriber is then billed at the lowest rate—tariff 3.

Figure 29:
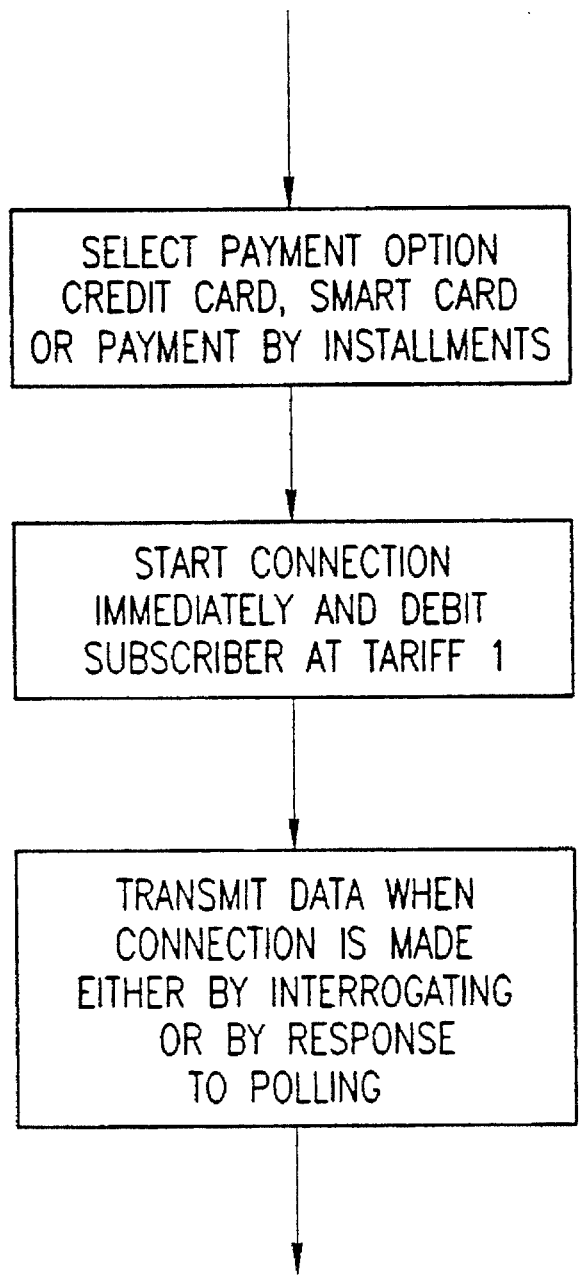
FIG. 29 is a flow chart illustrating selection of the payment option in the apparatus of FIG. 4.

Reference is now made to FIG. 29 which constitutes a flow chart that describes the operations related to the selection of payment option in the interactive gaming system of FIG. 4.

When the subscriber enters the menu for selection of payment option, he is required to select one of the available payment modes, which are typically credit card, smart card and payment by installments. Since the game is interactive there is no potential selection of data transmission option and connection with the gaming input receiving apparatus is initiated immediately after the subscriber has completed entry of the data.

Figure 30A:
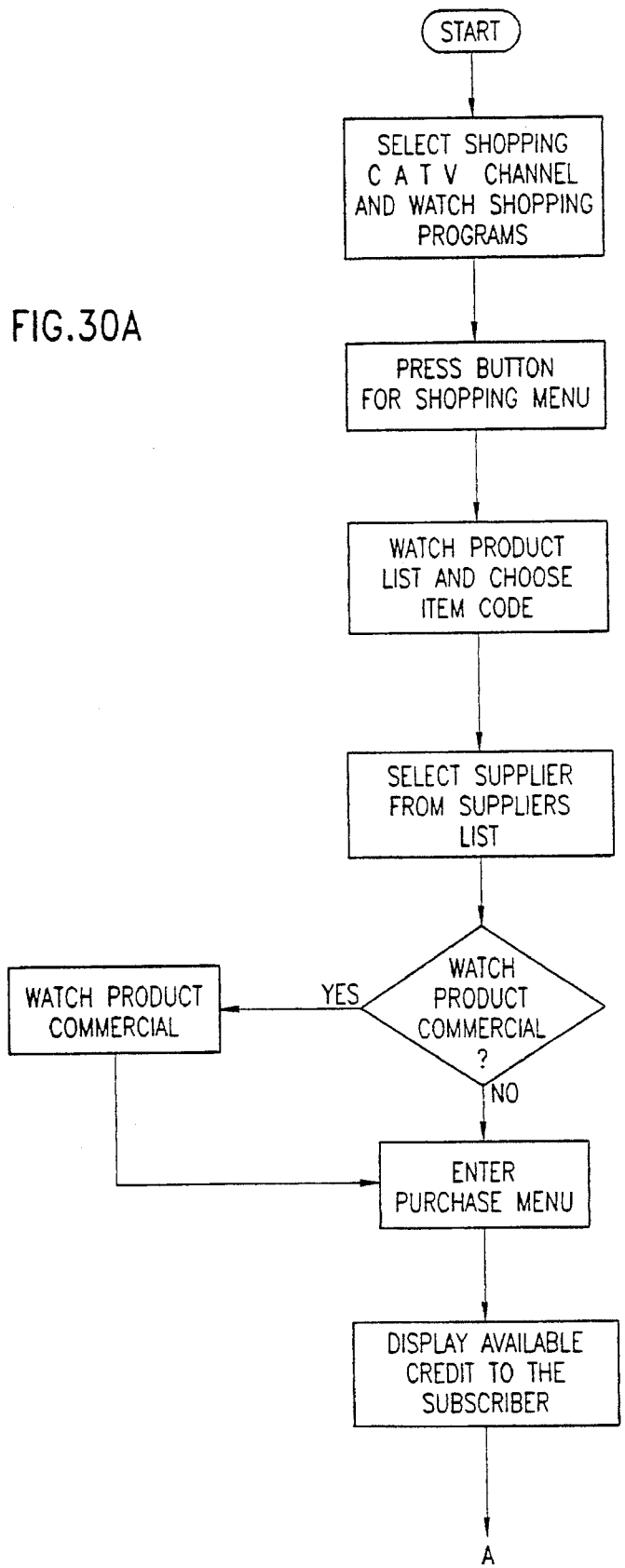
FIGS. 30A, 30B and 30C together constitute a flow chart illustrating the operation of the shopping apparatus of FIG. 3.
Figure 30B:
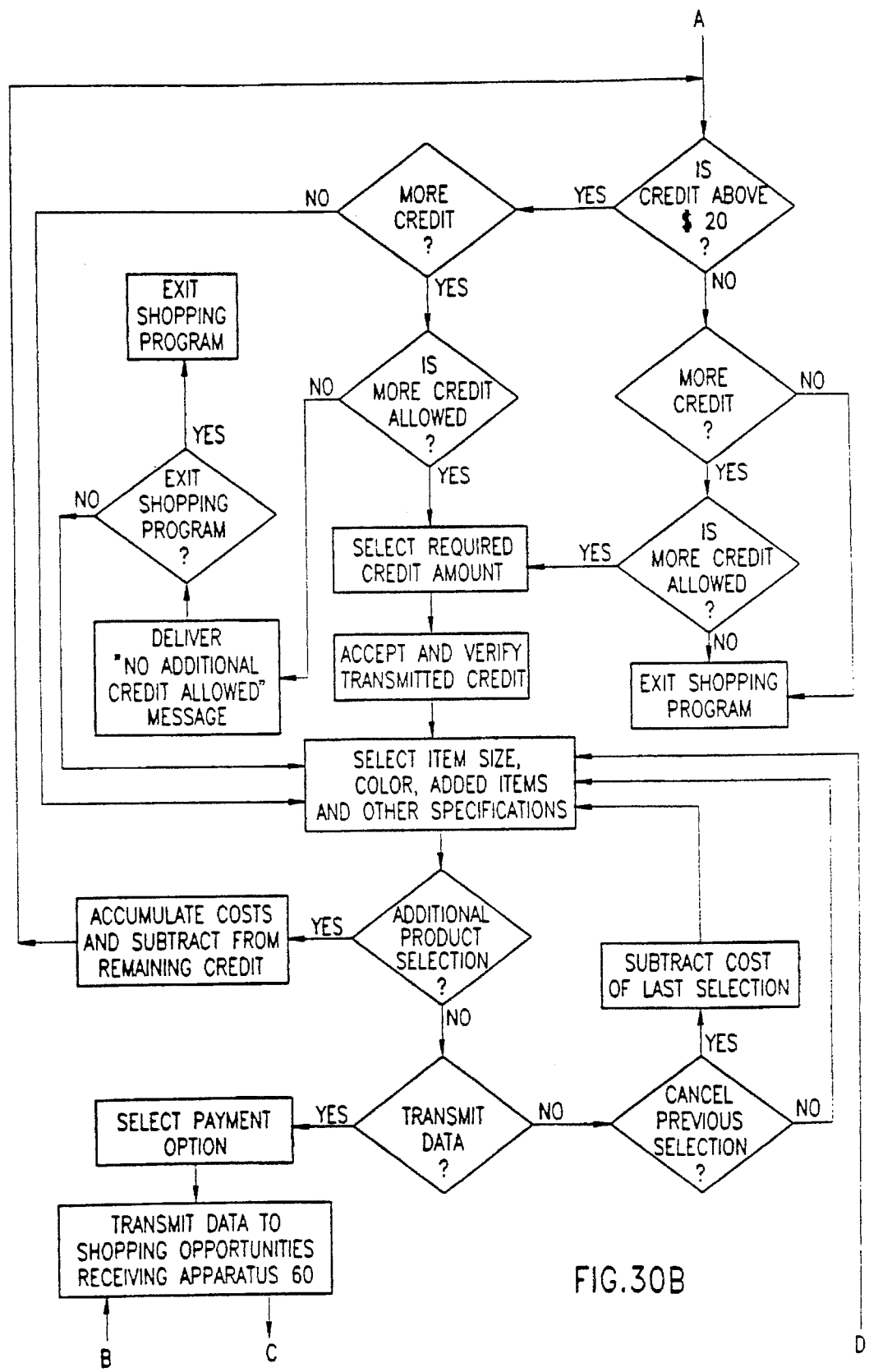
Figure 30C:
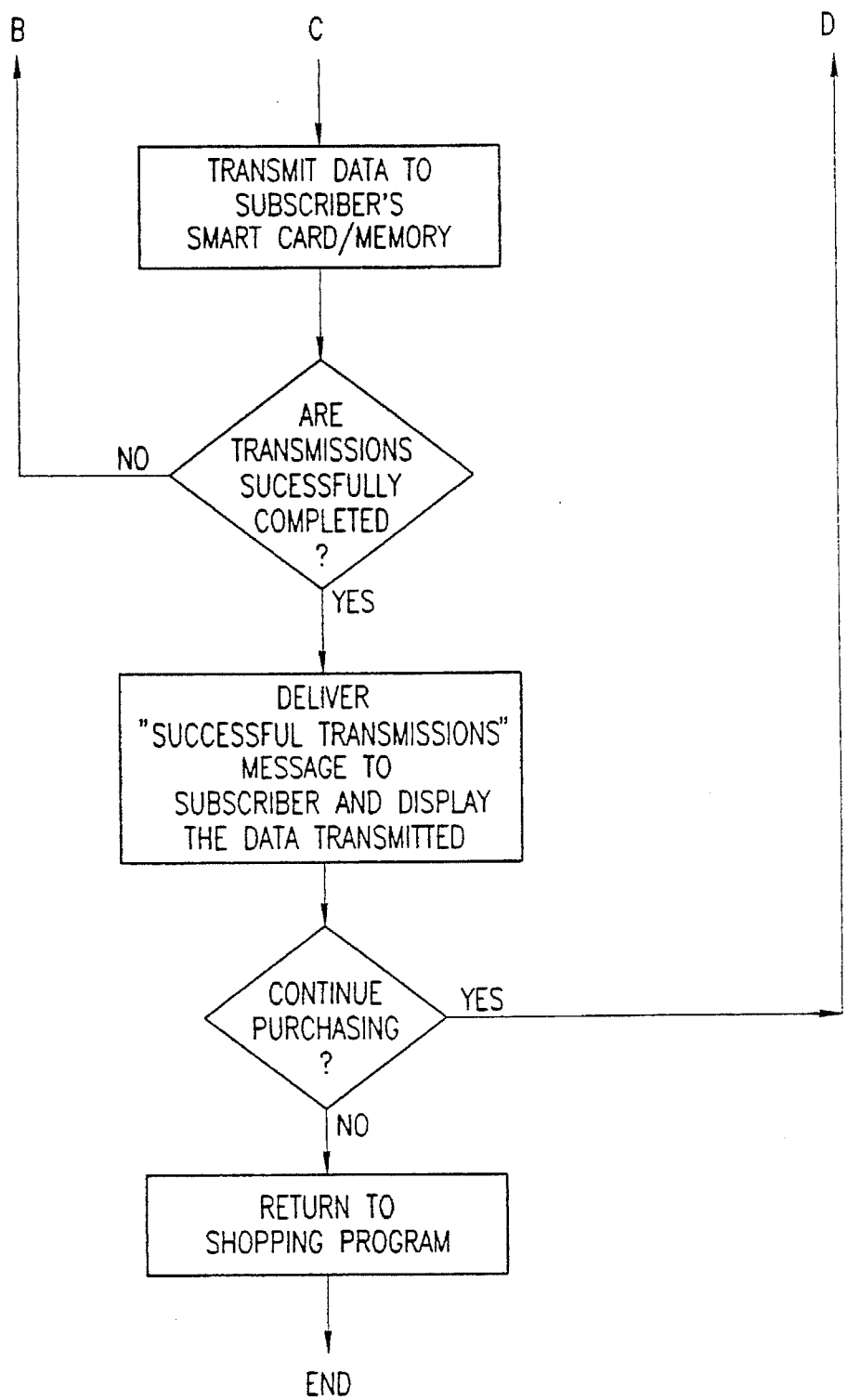

Reference is now made to FIGS. 30A–30C which together constitute a flow chart that describes the operations in a shopping system according to FIG. 3.

To start, a subscriber who wishes to purchase goods or to participate in an auction is presented with a screen, such as the screen shown in FIG. 34 and is requested to make the following sequential selections:

A shopping pay television channel;
A shopping menu;
An item code;
A supplier.

The subscriber is then asked whether he wants to watch a product commercial.

A continuous indication of the time remaining until termination of sale pricing or an auction may be provided on the screen, as shown in FIG. 34.

If the answer is "Yes" the commercial is shown on the TV screen. At the end of the commercial, the system displays a purchase menu and presents a display of the subscriber available credit.

If the answer is "No", the system immediately turns to the purchase menu and presents the available credit to the subscriber.

If the available credit is above a minimum threshold, typically of the order of $20, the subscriber is asked if he prefers to increase his credit. If the answer is "No" the subscriber is passed to an item selection menu in which he selects the item size, color, ancillary items and other specifications if available.

If the subscriber wishes to increase his credit, the system checks if he is entitled to more credit. If the increased credit is approved, the subscriber is requested to select the required credit amount. The menu does not allow the subscriber to request credits above his entitlement. After the selection of required credit the subscriber approves the credit selection and a request for credit is transmitted. The subscriber then accepts the credit and verifies the reception of the transmitted credit. Afterwards, he is transferred to the item selection menu.

If the subscriber is not entitled to more credit but he still has credit above the threshold the system delivers a "No additional credit allowed" message, and the subscriber is asked if he wishes to exit the shopping program. If he does, the system exits the shopping program. If the subscriber prefers to continue shopping he is passed to the item selection menu.

If subscriber initial credit is less than the threshold the subscriber is asked if he wants more credit. If the answer is "No" the system exits the shopping program. If the answer is "Yes" the system checks whether the subscriber is entitled to more credit, and if he is not the system exits the shopping program. If the subscriber is entitled to obtain more credit he is requested to select the required credit amount. After his approval, a request for credit is transmitted. The subscriber then accepts the credit and verifies the reception of the transmitted credit.

Once the subscriber has additional credit to cover his future purchases he is passed to the item selection menu which was previously described.

After the selection of each different item the subscriber is asked if he wants to select more products. If he does the system accumulates the costs of the products and subtracts the accumulated sum from the remaining credit. Then, the system passes back to the test in which it checks if the subscriber credit is above the threshold.

When the subscriber has completed his purchases, he is asked if he wishes to transmit the data. If he chooses not to transmit the data then he is asked whether to cancel the previous selection. If he wishes to cancel the selection, its cost is credited to his account and the subscriber is passed back to the item selection menu. If the previous selection is not canceled the subscriber is passed directly to the item selection menu.

If the subscriber approves the transmission of data, he is requested to initiate selection of the payment option, as described above with reference to FIG. 28. The data is then transmitted to the shopping opportunities receiving apparatus 60.

The data is also transmitted to the subscriber smart card or to the internal memory of the pay television interface unit 56. The system then checks if the transmissions are successfully completed.

If they are not then the transmission sequence is again initiated until all transmissions are successfully completed. A status O.K. is delivered to the subscriber if the transmissions are successfully terminated and the data transmitted is displayed on the TV screen. Then the subscriber is asked if he wishes to continue purchasing, and if he does, he is transferred back to the item selection menu. If the subscriber prefers to stop purchasing the system returns to the shopping program.

Figure 31A:
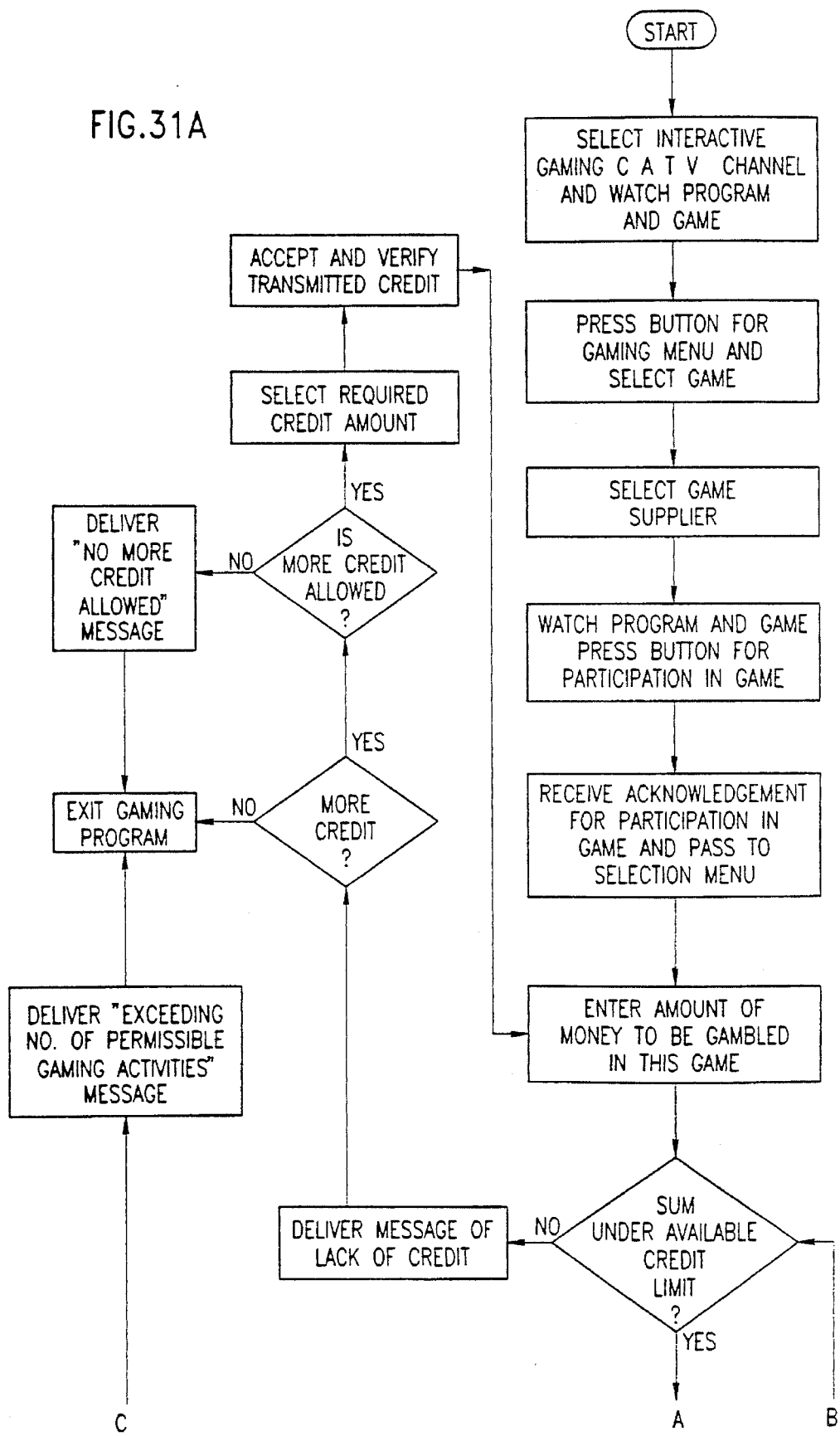
FIGS. 31A, 31B and 31C together constitute a flow chart illustrating the operation of the interactive gaming apparatus of FIG. 4.
Figure 31B:
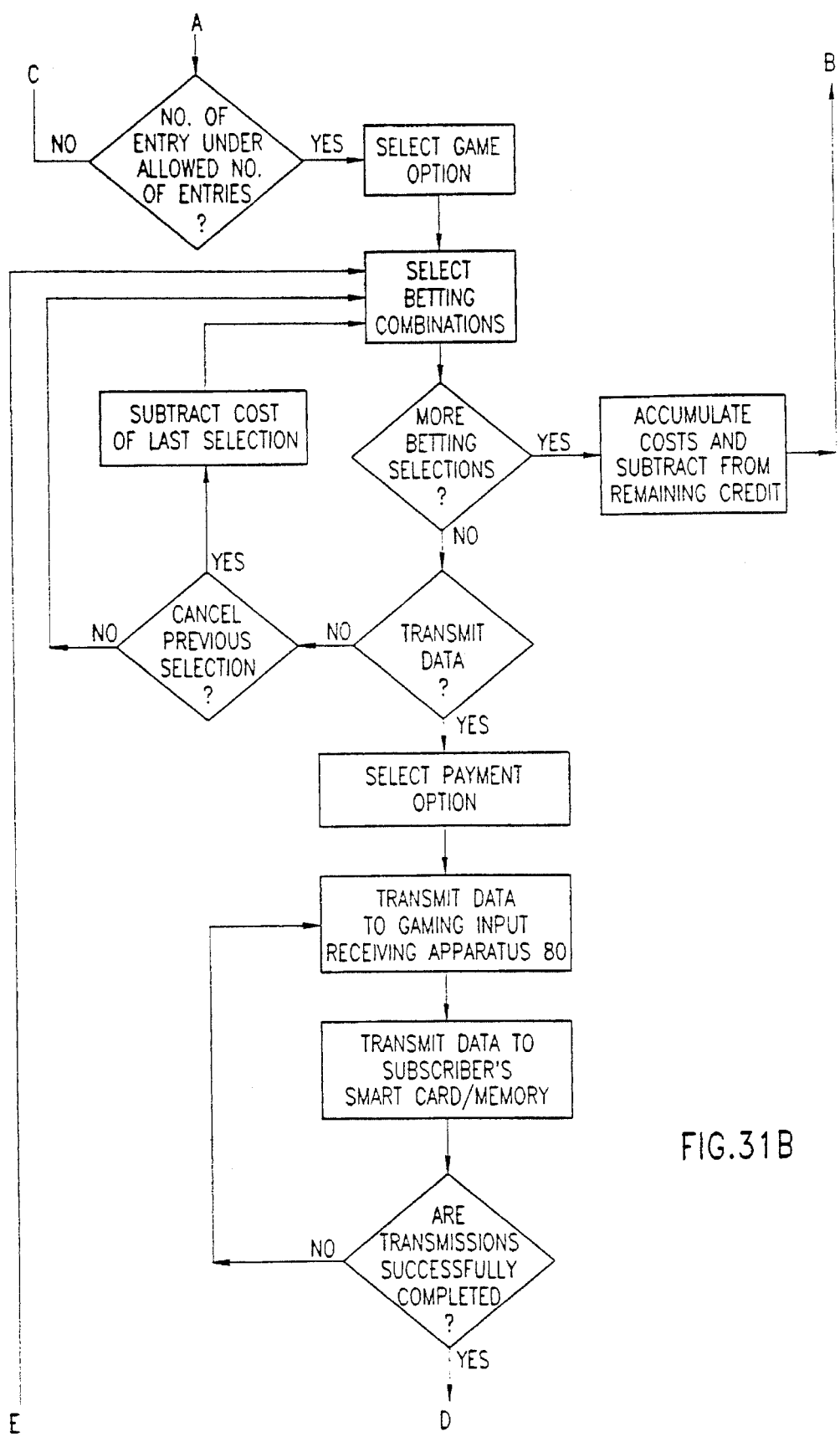
Figure 31C:
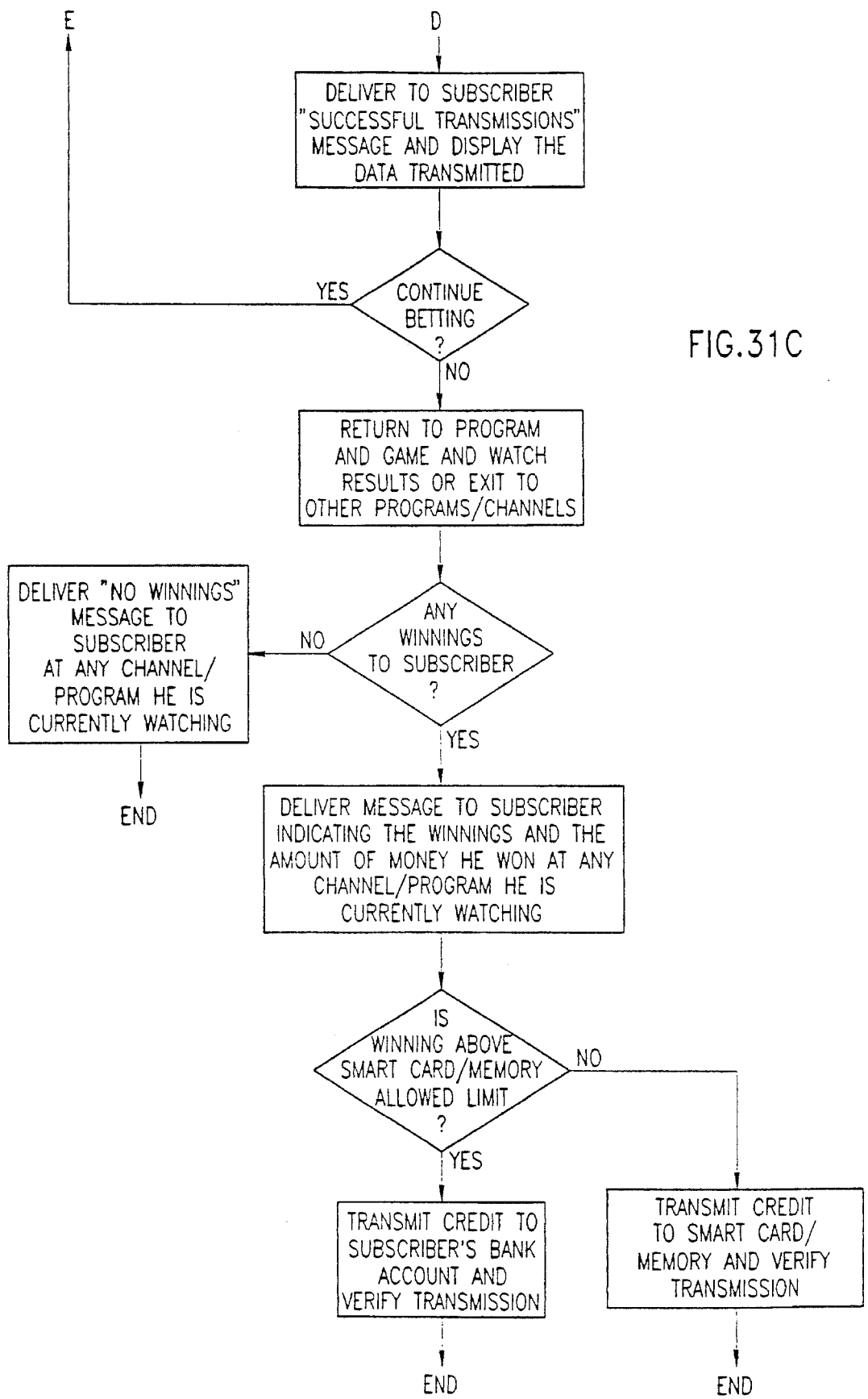

Reference is now made to FIGS. 31A–31C which together constitute a flow chart that describes the operations of an interactive gaming system of the type illustrated in FIG. 4.

Figure 35:
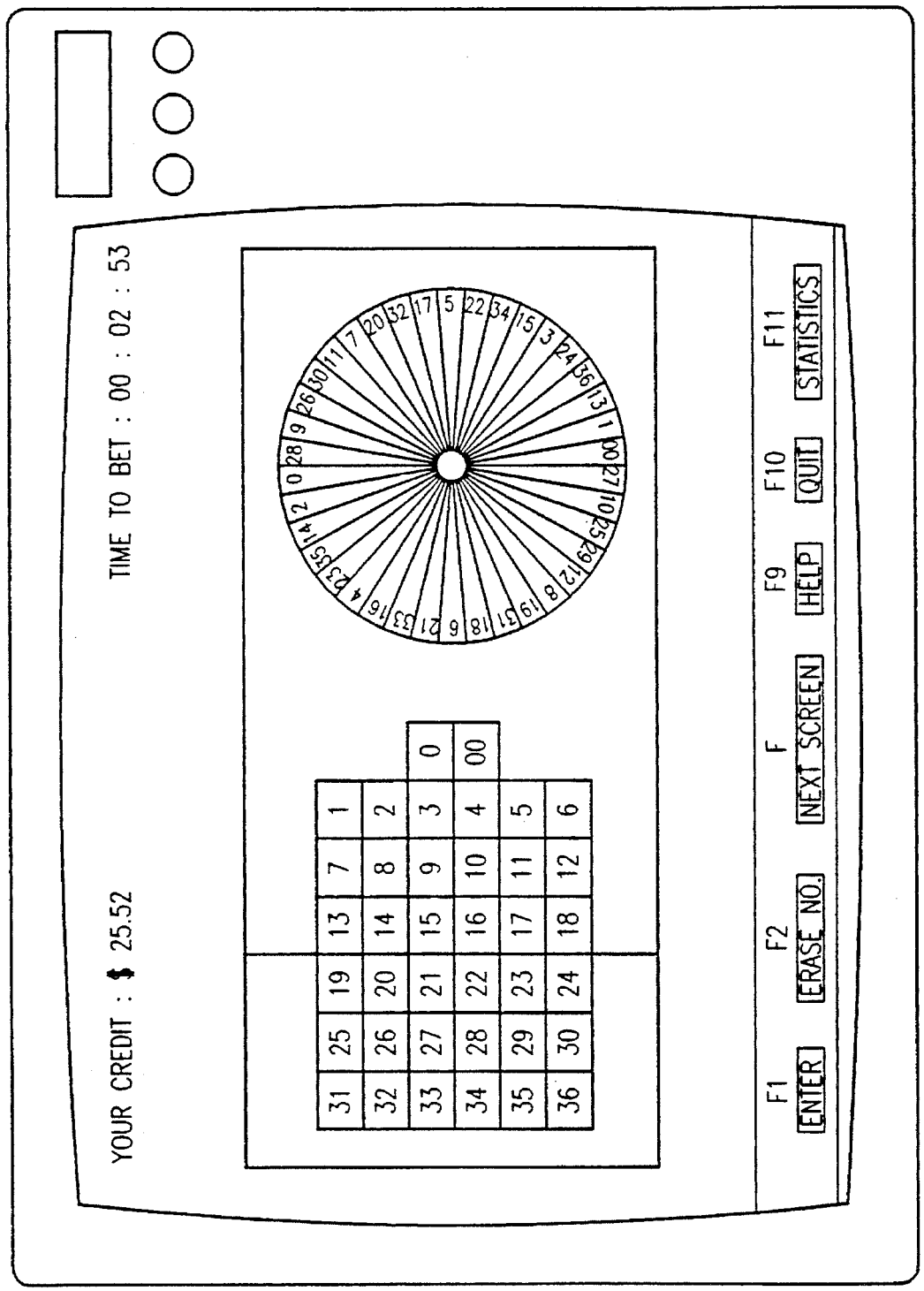

To start, a subscriber who wishes to participate in an interactive game is presented with a screen which may be of the type illustrated in FIG. 35 and is requested to make the following sequential selections:

An interactive gaming pay television channel;

A gaming menu;
A supplier from a menu.

The subscriber can then watch a selected interactive gaming program. If he chooses to participate in the game he may so indicate by pressing an appropriate button on a pay television remote control unit. He then receives acknowledgement of his participation in the game and is referred to a selection menu in which he is requested to select the amount of money to be gambled in the game. The system then checks if the sum is under the available credit limit.

If the sum is above the available credit the system delivers a "lack of credit" message. The subscriber is then asked whether he wants to increase his credit. If the answer is "No" the system exits the gaming program. If the answer is "Yes" the system checks if an increase in credit is authorized.

If the subscriber is not entitled to obtain more credit the system delivers a "No more credit allowed" message and exits the gaming program. If the subscriber is allowed to increase his credit he is passed to a menu in which he is requested to select the required credit amount. After his selection and approval, a request for credit is transmitted. The subscriber then accepts the credit and verifies the reception of the transmitted credit.

Afterwards, the subscriber is transferred back to a menu in which he is requested to enter the amount of money to be gambled.

The subscriber enters the amount of money to be gambled and the system checks if the subscriber has not exceeded a permissible number of gaming activities. If the number of gaming activities is exceeded the system delivers a message indicating the exceedance of the permitted number gaming activities and exits the gaming program.

If the permitted number of gaming activities is not exceeded, the subscriber is requested to select an option in the game. Then he may start selecting betting inputs.

After each sequence of betting selections the subscriber is asked if he wants to select additional betting inputs.

If the answer is "Yes" the system accumulates the costs of the additional selections, subtracts them from the remaining credit, and returns to the procedure in which it checks if the gambled sums are under the available credit.

If the answer is "No" the subscriber is asked if he wants to transmit the data gathered.

If the subscriber does not want to transmit the data at this time, he is asked whether to cancel the previous selection. If the answer is "Yes" the cost of the last selection is credited to his account and the subscriber is transferred back to the selection of betting inputs menu. If the answer is "No" the subscriber is transferred directly to the selection of betting inputs menu.

If the subscriber approves the transmission of data he is requested to select the payment option according to the procedure described hereinabove with reference to FIG. 29. Then the system transmits the data to gaming input receiving apparatus 80 (FIG. 4).

In a preferred embodiment of the invention, the same data is transmitted to the subscriber smart card or to the internal memory of the pay television interface unit 16. The system then checks if the transmissions were successfully completed. If not, the system repeats the transmissions until all data is successfully transferred. Subsequently, the system delivers an O.K. message to inform the subscriber of the communication result, and displays the transmitted data on the TV screen for reference, after which the subscriber is asked if he wishes to continue betting.

At this point, if the subscriber wishes to proceed with gambling, the entire procedure is repeated starting with the selection of betting combinations menu. Otherwise, the system returns to the program or turns to other programs or channels.

At the end of the game, if there are no winnings to be credited to the subscriber, the system informs the subscriber of the game results on whatever channel he is currently watching.

If the subscriber has won in the game, the system delivers a message reporting the winning to the subscriber on whatever channel he is currently watching, and checks if the prize is above an instant distribution limit. If the prize is under this limit, the amount is transmitted to the smart card or to the internal memory of the pay television interface unit 16. If the prize is above the limit the credit is transmitted to the subscriber bank account or credit card account.

Figure 32:
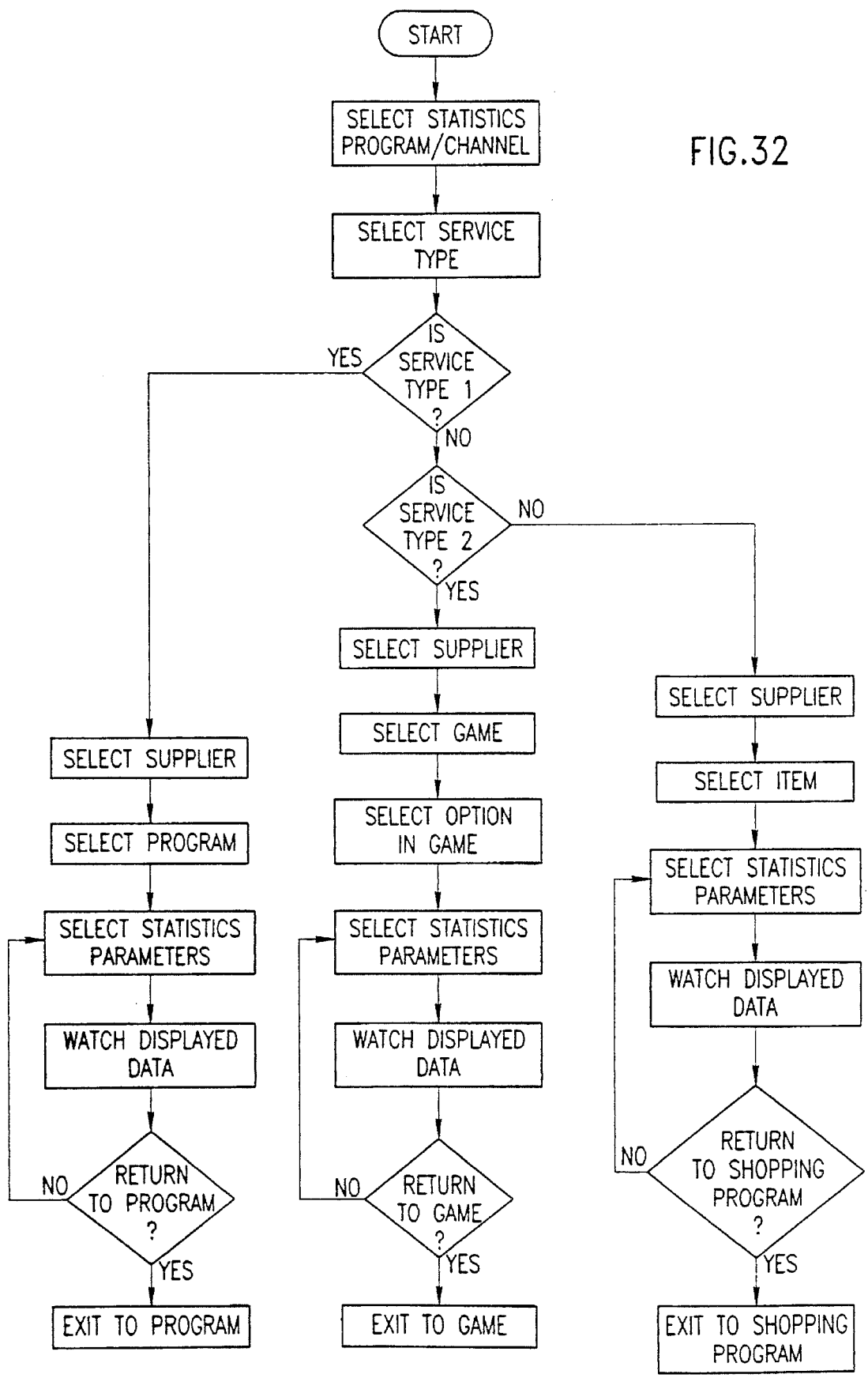
FIG. 32 is a flow chart illustrating the operation of statistics compilation and distribution facilities forming part of the apparatus constructed and operative in accordance with a preferred embodiment of the present invention.

Reference is now made to FIG. 32 which is a flow chart that describes the available choices and operations in the selection of a procedure for obtaining statistical data for each of the services available in the systems described hereinabove with reference to FIGS. 1–4.

A subscriber who wishes to receive statistics information is required to select a statistics program or channel and a service type.

If the statistical information is required for pay television, the subscriber is requested to select a supplier code and a program number.

To receive statistical information relating to the program the subscriber has to select several statistical parameters. In a preferred embodiment of the invention such parameters indicate the period for which the statistical data is required, the number of programs distributed by the supplier, the producers of the program, actors, etc.

Once the statistical data has been displayed and analyzed by the subscriber the subscriber is asked if he prefers to return to the program. If he does the system exits to the program. Otherwise, the system enables the subscriber to return to the statistical parameters selection menu.

If the statistics are required for gaming, the subscriber is requested to select the supplier code, a game, and an option in the game.

Figure 36:
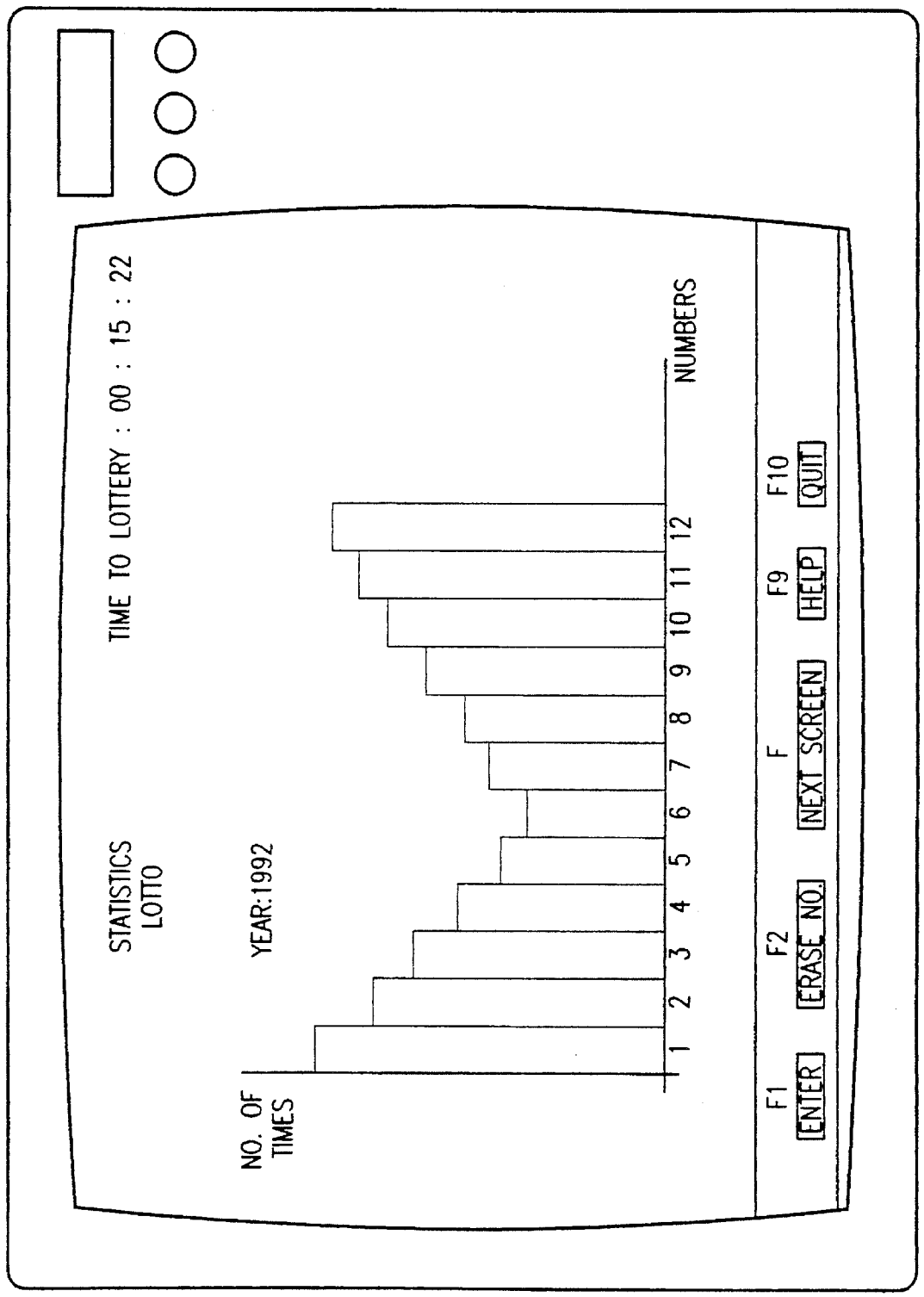
FIG. 36 illustrates a typical statistics screen display appearing in the course of operation of the apparatus of the invention.

To receive statistical information relating to a game the subscriber has to select several statistical parameters. In a preferred embodiment of the invention such parameters indicate the period for which the statistical data is required, gambling sums and winnings, number of participants, statistical distributions, etc. A typical statistics output display appears in FIG. 36.

Once the statistical data has been obtained and analyzed by the subscriber he is asked if he prefers to return to the program. If he does the system exits to the program, otherwise, the system enables the subscriber to return to the statistical parameters selection menu.

If the statistics are required for shopping, the subscriber is requested to select the supplier code and the item for which the statistics are needed.

To receive statistical information relating to an item the subscriber has to select several statistical parameters. In a preferred embodiment of the invention such parameters indicate the period for which the statistical data is required, colors and sizes of the items, previous models, etc.

Once the statistical data has been obtained and analyzed by the subscriber he is asked if he prefers to return to the shopping program. If he does the system exits to the shopping program. Otherwise, the system enables the subscriber to return to the statistical parameters selection menu.

It will be appreciated by persons skilled in the art that the present invention is not limited by what has been particularly shown and described hereinabove. Rather the scope of the present invention is defined only by the claims which follow:

What is claimed is:

1. A pay television gaming system comprising:

a pay television network having a multiplicity of subscriber units each including a television;

receiving apparatus for receiving gaming inputs from the multiplicity of subscriber units;

accounting apparatus for maintaining separate accounts for pay television and for gaming, the accounting apparatus including apparatus for employing separate accounting identification codes for pay television and for gaming; and transmitting apparatus for transmitting to the multiplicity of subscriber units information relating to gaming results and said separate accounting identification codes for pay television and for gaming for settling at least one of gaming debts and gaming winnings via the pay television network.

2. A television gaming system comprising:

a television network;

a multiplicity of subscriber units each including a television;

communications apparatus for receiving gaming inputs from the multiplicity of subscriber units;

accounting apparatus for maintaining separate accounts for television and for gaming, the accounting apparatus including apparatus for employing separate accounting identification codes for television and for gaming; and transmitting apparatus for transmitting to the multiplicity of subscriber units information relating to gaming results and said separate accounting identification codes for television and for gaming for settling at least one of gaming debts and gaming winnings via the communications apparatus.

3. A pay television shopping system comprising:

a pay television network including a central control station and a multiplicity of subscriber units each including a television;

apparatus for transmitting via the pay television network to the multiplicity of subscriber units information relating to shopping opportunities and separate accounting identification codes for pay television and for shopping for settling at least one of shopping debts and shopping credits via the pay television network;

receiving apparatus for receiving shopping inputs from the multiplicity of subscriber units; and accounting apparatus for maintaining separate accounts for pay television and for shopping, the accounting apparatus including apparatus for employing said separate accounting identification codes for pay television and for shopping.

4. A pay television gaming system comprising:

a pay television network having a central control station and a multiplicity of subscriber units each including a television;

receiving apparatus for receiving gaming inputs from the multiplicity of subscriber units;

accounting apparatus for maintaining separate accounts for pay television and for gaming, the accounting apparatus including apparatus for employing separate accounting identification codes for pay television and for gaming; and transmitting apparatus for transmitting live to the multiplicity of subscriber units information relating to gaming results and said separate accounting identification codes for pay television and for gaming for settling at least one of gaming debts and gaming winnings via the pay television network.

5. A pay television gaming method including the steps of:

providing a pay television network having a central control station and a multiplicity of subscriber units each including a television;

receiving gaming inputs from the multiplicity of subscriber units;

maintaining separate accounts for pay television and for gaming, including employing separate accounting identification codes for pay television and for gaming;

transmitting to the multiplicity of subscriber units information relating to gaming results and said separate accounting identification codes for pay television and for gaming; and settling gaming debts and winnings via the pay television network by employing said separate accounting identification codes.

6. A television gaming method including the steps of:

providing a television network having a central control station and a multiplicity of subscriber units each including a television;

receiving gaming inputs from the multiplicity of subscriber units;

maintaining separate accounts for television and for gaming, including employing separate accounting identification codes for television and for gaming;

transmitting to the multiplicity of subscriber units information relating to gaming results and said separate accounting identification codes for television and for gaming; and settling gaming debts and winnings via communications apparatus by employing said separate accounting identification codes.

7. A pay television shopping method including the steps of:
   providing a pay television network including a central control station and a multiplicity of subscriber units each including a television;
   providing via the pay television network to the multiplicity of subscriber units information relating to shopping opportunities and separate accounting identification codes for pay television and for shopping;
   receiving shopping inputs from the multiplicity of subscriber units;
   maintaining separate accounts for pay television and for shopping, including employing said separate accounting identification codes for pay television and for shopping; and
   settling at least one of shopping debts and shopping credits via the pay television network by employing said separate accounting identification codes.

8. A pay television gaming method including the steps of:
   providing a pay television network having a central control station and a multiplicity of subscriber units each including a television;
   receiving gaming inputs from the multiplicity of subscriber units;
   maintaining separate accounts for pay television and for gaming, including employing separate accounting identification codes for pay television and for gaming;
   transmitting live to the multiplicity of subscriber units via said pay television network information relating to gaming results and said separate accounting identification codes for pay television and for gaming; and
   settling gaming debts and winnings via the pay television network by employing said separate accounting identification codes for pay television and for gaming transmitted to said subscriber units.

9. A method according to claim 5 and being operable without requiring any voice interaction between the subscriber and an operator.

10. A pay television gaming method according to claim 5 and further comprising the steps of:
    providing a menu of available statistical data relating to previous games and to participants in games; and
    receiving from subscribers selections of desired statistical data.

11. A method according to claim 5 and wherein gaming programs may be received by the subscribers from a source other than a television network, such as a computer or video cassette.

12. A system according to claim 3 wherein said apparatus for transmitting includes a transmitter for transmission of separate identification codes for at least one of credit, debit and balance.

13. A method according to claim 5 and wherein said settling step comprises transmission of profit distribution codes which direct credit to a credit maintaining facility.

14. A pay television gaming method according to claim 5 and wherein said providing step also comprises the step of providing information to said multiplicity of subscriber units which continuously indicates the time remaining for gambling in a game.

15. A pay television gaming method according to claim 5 and wherein said receiving step includes communication of gambling selections to a gaming management facility along communication facilities by employing communication identification codes which initiate communication at preselected times.

16. A pay television gaming method according to claim 15 and wherein said communication identification codes are selected by a user and are associated with differing tariff rates.

17. A pay television gaming method according to claim 5 and also comprising the steps of:
    providing a menu of available gaming suppliers; and
    receiving from subscribers selections of desired gaming suppliers.

18. A pay television gaming method according to claim 17 wherein said selections of gaming suppliers are obtained by employing supplier identification codes which are used to distinguish between different suppliers.

19. A pay television gaming method according to claim 5 and also comprising the steps of:
    providing a menu of available payment options; and
    receiving from subscribers selections of desired payment options.

20. A pay television gaming method according to claim 19 wherein said selections of payment options are obtained by employing payment option identification codes which are used to distinguish between at least one of different options of payment and different tariffs.

21. A pay television gaming system according to claim 1 and wherein said subscriber units further comprise:
    processor for processing subscriber CATV and gaming accounting data and selections; and
    memory for storing at least one of accounting data and subscriber selections.

22. A pay television gaming system according to claim 19 wherein said memory further comprise a smart card.

23. A pay television gaming system according to claim 1 wherein said separate accounting identification codes comprise at least one of separate credit identification codes, separate debit identification codes and separate balance identification codes.

24. A pay television gaming system according to claim 1 and wherein at least part of said multiplicity of subscriber units comprise a transmitter for transmitting said separate accounting identification codes for pay television and for gaming to an accounting facility for settling gaming debts and winnings via the pay television network.

25. A pay television gaming system according to claim 3 and wherein at least part of said multiplicity of subscriber units comprise a transmitter for transmitting said separate accounting identification codes for pay television and for shopping to an accounting facility for settling shopping debts and credits via said pay television network.

* * * * *